(12) United States Patent
Haberman et al.

(10) Patent No.: US 7,900,227 B2
(45) Date of Patent: *Mar. 1, 2011

(54) SYSTEMS AND METHODS FOR MANAGING AND DISTRIBUTING MEDIA CONTENT

(75) Inventors: Seth Haberman, New York, NY (US); Gerrit Niemeijer, Maplewood, NJ (US); David Weite, Woodcliff Lake, NJ (US)

(73) Assignee: Visible World, Inc., New York, NY (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/656,837

(22) Filed: Jan. 23, 2007

(65) Prior Publication Data

US 2007/0198349 A1 Aug. 23, 2007

Related U.S. Application Data

(63) Continuation-in-part of application No. 09/545,524, filed on Apr. 7, 2000, which is a continuation-in-part of application No. 11/449,299, filed on Jun. 8, 2006.

(60) Provisional application No. 60/761,553, filed on Jan. 23, 2006, provisional application No. 60/801,891, filed on May 19, 2006, provisional application No. 60/688,612, filed on Jun. 8, 2005.

(51) Int. Cl.
*H04N 7/10* (2006.01)
*G06F 17/00* (2006.01)

(52) U.S. Cl. .............................. 725/35; 725/32; 715/201

(58) Field of Classification Search ............. 725/32–36; 715/201–204, 781, 723, 762, 866; 345/629, 345/619, 620, 634, 638, 636, 637; 705/1, 705/14, 26, 27; 348/552

See application file for complete search history.

(56) References Cited

U.S. PATENT DOCUMENTS

| | | | |
|---|---|---|---|
| 3,366,731 A | 1/1968 | Wallerstein |
| 3,639,686 A | 2/1972 | Walker et al. |
| 4,331,974 A | 5/1982 | Cogswell et al. |
| 4,475,123 A | 10/1984 | Dumbauld et al. |
| 4,573,072 A | 2/1986 | Freeman |
| 4,602,279 A | 7/1986 | Freeman |
| 4,625,235 A | 11/1986 | Watson |
| 4,638,359 A | 1/1987 | Watson |
| 4,703,423 A | 10/1987 | Bado et al. |
| 4,716,410 A | 12/1987 | Nozaki |
| 4,789,235 A | 12/1988 | Borah et al. |
| 4,814,883 A | 3/1989 | Perine et al. |
| 4,847,698 A | 7/1989 | Freeman |
| 4,847,699 A | 7/1989 | Freeman |

(Continued)

OTHER PUBLICATIONS

International Search Report for PCT International Patent Application No. PCT/US2006/022308.

(Continued)

*Primary Examiner*—Igor Borissov
(74) *Attorney, Agent, or Firm*—K&L Gates LLP

(57) ABSTRACT

In accordance with the present invention, a media content management application that allows a user to customize, assemble, distribute, and track one or more versions of media content based on semantic criteria is provided.

13 Claims, 94 Drawing Sheets

U.S. PATENT DOCUMENTS

| | | |
|---|---|---|
| 4,847,700 A | 7/1989 | Freeman |
| 4,850,007 A | 7/1989 | Marino et al. |
| 4,918,516 A | 4/1990 | Freeman |
| 5,099,422 A | 3/1992 | Foresman et al. |
| 5,105,184 A | 4/1992 | Pirani et al. |
| 5,155,591 A | 10/1992 | Wachob |
| 5,173,900 A | 12/1992 | Miller et al. |
| 5,220,501 A | 6/1993 | Lawlor et al. |
| 5,231,494 A | 7/1993 | Wachob |
| RE34,340 E | 8/1993 | Freeman |
| 5,253,940 A | 10/1993 | Abecassis |
| 5,260,778 A | 11/1993 | Kauffman et al. |
| 5,291,395 A | 3/1994 | Abecassis |
| 5,305,195 A | 4/1994 | Murphy |
| 5,343,239 A | 8/1994 | Lappington et al. |
| 5,347,632 A | 9/1994 | Filepp et al. |
| 5,356,151 A | 10/1994 | Abecassis |
| 5,361,393 A | 11/1994 | Rossillo |
| 5,377,354 A | 12/1994 | Scannell et al. |
| 5,414,455 A | 5/1995 | Hooper et al. |
| 5,422,468 A | 6/1995 | Abecassis |
| 5,424,770 A | 6/1995 | Schmelzer et al. |
| 5,434,678 A | 7/1995 | Abecassis |
| 5,442,390 A | 8/1995 | Hooper et al. |
| 5,442,771 A | 8/1995 | Filepp et al. |
| 5,446,919 A | 8/1995 | Wilkins |
| 5,448,568 A | 9/1995 | Delpuch et al. |
| 5,499,046 A | 3/1996 | Schiller et al. |
| 5,515,098 A | 5/1996 | Carles |
| 5,515,270 A | 5/1996 | Weinblatt |
| 5,519,433 A | 5/1996 | Lappington et al. |
| 5,526,035 A | 6/1996 | Lappington et al. |
| 5,537,141 A | 7/1996 | Harper et al. |
| 5,548,532 A | 8/1996 | Menand et al. |
| 5,550,735 A | 8/1996 | Slade et al. |
| 5,566,353 A | 10/1996 | Cho et al. |
| 5,584,025 A | 12/1996 | Keithley et al. |
| 5,585,838 A | 12/1996 | Lawler et al. |
| 5,585,858 A | 12/1996 | Harper et al. |
| 5,594,910 A | 1/1997 | Filepp et al. |
| 5,610,653 A | 3/1997 | Abecassis |
| 5,617,142 A | 4/1997 | Hamilton |
| 5,632,007 A | 5/1997 | Freeman |
| 5,636,346 A | 6/1997 | Saxe |
| 5,638,113 A | 6/1997 | Lappington et al. |
| 5,652,615 A | 7/1997 | Bryant et al. |
| 5,671,225 A | 9/1997 | Hooper et al. |
| 5,682,196 A | 10/1997 | Freeman |
| 5,684,918 A | 11/1997 | Abecassis |
| 5,696,869 A | 12/1997 | Abecassis |
| 5,717,814 A | 2/1998 | Abecassis |
| 5,717,923 A | 2/1998 | Dedrick |
| 5,724,091 A | 3/1998 | Freeman et al. |
| 5,724,472 A | 3/1998 | Abecassis |
| 5,724,521 A | 3/1998 | Dedrick |
| 5,734,413 A | 3/1998 | Lappington et al. |
| 5,740,388 A | 4/1998 | Hunt |
| 5,740,549 A | 4/1998 | Reilly et al. |
| 5,754,939 A | 5/1998 | Herz et al. |
| 5,758,259 A | 5/1998 | Lawler |
| 5,761,601 A | 6/1998 | Nemirofsky et al. |
| 5,764,275 A | 6/1998 | Lappington et al. |
| 5,768,521 A | 6/1998 | Dedrick |
| 5,774,170 A | 6/1998 | Hite et al. |
| 5,774,664 A | 6/1998 | Hidary et al. |
| 5,778,181 A | 7/1998 | Hidary et al. |
| 5,784,095 A | 7/1998 | Robbins et al. |
| 5,784,528 A | 7/1998 | Yamane et al. |
| 5,796,945 A | 8/1998 | Tarabella |
| 5,802,314 A | 9/1998 | Tullis et al. |
| 5,805,974 A | 9/1998 | Hite et al. |
| 5,825,884 A | 10/1998 | Zdepski et al. |
| 5,835,087 A | 11/1998 | Herz et al. |
| 5,859,660 A | 1/1999 | Perkins et al. |
| 5,861,881 A | 1/1999 | Freeman et al. |
| 5,867,208 A | 2/1999 | McLaren |
| 5,873,068 A | 2/1999 | Beaumont et al. |
| 5,884,305 A | 3/1999 | Kleinberg et al. |
| 5,887,243 A | 3/1999 | Harvey et al. |
| 5,903,263 A | 5/1999 | Emura et al. |
| 5,907,837 A | 5/1999 | Ferrel et al. |
| 5,913,031 A | 6/1999 | Blanchard et al. |
| 5,917,830 A | 6/1999 | Chen et al. |
| 5,926,205 A | 7/1999 | Krause et al. |
| 5,929,850 A | 7/1999 | Broadwin et al. |
| 5,930,446 A | 7/1999 | Kanda et al. |
| 5,931,901 A | 8/1999 | Wolfe et al. |
| 5,937,331 A | 8/1999 | Kalluri et al. |
| 5,978,799 A | 11/1999 | Hirsch |
| 5,986,692 A | 11/1999 | Logan et al. |
| 5,991,735 A | 11/1999 | Gerace |
| 6,002,393 A | 12/1999 | Hite et al. |
| 6,018,768 A | 1/2000 | Ullman et al. |
| 6,026,368 A | 2/2000 | Brown et al. |
| 6,029,045 A | 2/2000 | Picco et al. |
| 6,038,000 A | 3/2000 | Hurst, Jr. |
| 6,038,367 A | 3/2000 | Abecassis |
| 6,049,569 A | 4/2000 | Radha et al. |
| 6,067,348 A | 5/2000 | Hibbeler |
| 6,075,551 A | 6/2000 | Berezowski et al. |
| 6,084,581 A | 7/2000 | Hunt |
| 6,108,486 A | 8/2000 | Sawabe et al. |
| 6,119,098 A | 9/2000 | Guyot et al. |
| 6,134,380 A | 10/2000 | Kushizaki et al. |
| 6,137,834 A | 10/2000 | Wine et al. |
| 6,141,358 A | 10/2000 | Hurst, Jr. et al. |
| 6,160,570 A | 12/2000 | Sitnik |
| 6,204,840 B1 | 3/2001 | Petelycky et al. |
| 6,304,852 B1 | 10/2001 | Loncteaux |
| 6,310,915 B1 | 10/2001 | Wells et al. |
| 6,327,574 B1 | 12/2001 | Kramer et al. |
| 6,330,286 B1 | 12/2001 | Lyons et al. |
| 6,343,287 B1 | 1/2002 | Kumar et al. |
| 6,345,122 B1 | 2/2002 | Yamato et al. |
| 6,357,042 B2 | 3/2002 | Srinivasan et al. |
| 6,360,234 B2 | 3/2002 | Jain et al. |
| 6,360,368 B1 | 3/2002 | Chawla |
| 6,408,278 B1 | 6/2002 | Carney et al. |
| 6,411,992 B1 | 6/2002 | Srinivasan et al. |
| 6,424,991 B1 | 7/2002 | Gish |
| 6,441,832 B1 | 8/2002 | Tao et al. |
| 6,449,657 B2 | 9/2002 | Stanbach, Jr. et al. |
| 6,452,612 B1 | 9/2002 | Holtz et al. |
| 6,457,010 B1 | 9/2002 | Eldering et al. |
| 6,463,444 B1 | 10/2002 | Jain et al. |
| 6,463,585 B1 | 10/2002 | Hendricks et al. |
| 6,466,975 B1 | 10/2002 | Sterling et al. |
| 6,502,076 B1 | 12/2002 | Smith |
| 6,529,550 B2 | 3/2003 | Tahara et al. |
| 6,567,980 B1 | 5/2003 | Jain et al. |
| 6,574,793 B1 | 6/2003 | Ngo et al. |
| 6,588,013 B1 | 7/2003 | Lumley et al. |
| 6,601,237 B1 | 7/2003 | Ten Kate et al. |
| 6,611,624 B1 | 8/2003 | Zhang et al. |
| 6,671,880 B2 | 12/2003 | Shah-Nazaroff et al. |
| 6,678,332 B1 | 1/2004 | Gardere et al. |
| 6,681,395 B1 | 1/2004 | Nishi et al. |
| 6,694,482 B1 | 2/2004 | Arellano et al. |
| 6,698,020 B1 | 2/2004 | Zigmond et al. |
| 6,735,628 B2 | 5/2004 | Eyal |
| 6,785,289 B1 | 8/2004 | Ward et al. |
| 6,806,909 B1 | 10/2004 | Radha et al. |
| 6,850,252 B1 | 2/2005 | Hoffberg |
| 6,857,024 B1 | 2/2005 | Chen et al. |

| | | |
|---|---|---|
| 6,877,134 B1 | 4/2005 | Fuller et al. |
| 7,079,176 B1 | 7/2006 | Freeman et al. |
| 2001/0013124 A1 | 8/2001 | Klosterman et al. |
| 2002/0023165 A1 | 2/2002 | Lahr |
| 2002/0026359 A1 | 2/2002 | Long et al. |
| 2002/0056093 A1 | 5/2002 | Kunkel et al. |
| 2002/0057336 A1 | 5/2002 | Gaul et al. |
| 2002/0083443 A1 | 6/2002 | Eldering et al. |
| 2002/0092017 A1 | 7/2002 | Klosterman et al. |
| 2002/0095676 A1 | 7/2002 | Knee et al. |
| 2002/0144283 A1 | 10/2002 | Headings et al. |
| 2003/0028888 A1 | 2/2003 | Hunter et al. |
| 2003/0110500 A1 | 6/2003 | Rodriguez |
| 2003/0177503 A1 | 9/2003 | Sull et al. |
| 2004/0025180 A1 | 2/2004 | Begeja et al. |
| 2004/0103026 A1 | 5/2004 | White |
| 2004/0111742 A1 | 6/2004 | Hendricks et al. |
| 2004/0117257 A1 | 6/2004 | Haberman et al. |
| 2004/0136698 A1 | 7/2004 | Mock |
| 2005/0065844 A1 | 3/2005 | Raj et al. |
| 2005/0086691 A1 | 4/2005 | Dudkiewicz et al. |
| 2005/0086692 A1 | 4/2005 | Dudkiewicz et al. |
| 2005/0166224 A1 | 7/2005 | Ficco |

OTHER PUBLICATIONS

International Search Report and Written Opinion for International Patent Application PCT/US07/01777 mailed Feb. 14, 2008.

FIG. 30

3. Select an Installation Offer $ 9.95 professional installation ▼

4. Select a Pre-Defined Phone Number or Enter a Custom Phone Number

- ● Select a Phone #    1.800.COMCAST ▼
- ○ Or enter a Custom Phone #   _____ (Maximum 14 characters)

sample   sample

5. Enter an Additional Legal Disclaimer Details, if required

ADDITIONAL LINE 1: _____ (Maximum 70 characters)

ADDITIONAL LINE 2: _____ (Maximum 70 characters)

sample   sample

Note: If your market requires legal disclaimer language in addition to the generic disclaimer (see "sample" icon above), you may add 1 or 2 lines of custom text above. You are solely responsible for the accuracy and legality of the text you add.

Finally, Enter a Description for the Customized Ad

Cup - Stacker $29.99/month 3 months ▲▼  ← 3204

◉ preview customized ad    ☞ proceed to Target ⟩ ← 3206 proceed to target

6510 — DETERMINING WHETHER THE LOCAL CONTENT PROVIDER TRANSMITTED THE COMPLETED COMMERCIAL IN ACCORDANCE WITH PLAYBACK RULES (E.G., PLAYBACK ONLY IN THE EVENING, PLAYBACK WITH THE CONSUMER OFFER, ETC.)

6520 — PREVENTING THE LOCAL CONTENT PROVIDER FROM TRANSMITTING THE COMPLETED COMMERCIAL TO AN AUDIENCE IN RESPONSE TO DETERMINING THAT THE LOCAL CONTENT PROVIDER HAS NOT COMPLIED WITH THE PLAYBACK RULES

FIG. 65

Pleasantville – Composite – Collapse by Channel (Tangent)

AutoName: Sports/PleasantVille

Exclude Combinations

| High Wagons Green Card Balance | Medium Wagons Green Card Balance | High SUVs Green Card Balance | Medium SUVs Green Card Balance | MMV Green Card Balance | LS Green Card Balance | LM Green Card Balance |
| High Wagons Gold Card Balance | Medium Wagons Gold Card Balance | High SUVs Gold Card Balance | Medium SUVs Gold Card Balance | MMV G̶o̶l̶d̶ C̶a̶r̶d̶ Balance | LS Gold Card Balance | LM Gold Card Balance |
| High Wagons Gold Card diary | Medium Wagons Gold Card diary | High S̶U̶V̶s̶ G̶o̶l̶d̶ C̶a̶r̶d̶ diary | Medium SUVs Gold Card diary | MMV Gold Card diary | LS Gold Card diary | LM Gold Card diary |
| High Wagons G̶o̶l̶d̶ C̶a̶r̶d̶ 2 Hr | Medium Wagons Gold Card 2 Hr | High SUVs Gold Card 2 Hr | Medium SUVs Gold Card 2 Hr | MMV Gold Card 2 Hr | L̶S̶ G̶o̶l̶d̶ C̶a̶r̶d̶ 2 Hr | LM Gold Card 2 Hr |
| High Wagons Black Card diary | Medium Wagons Black Card diary | High SUVs Black Card diary | Medium SUVs B̶l̶a̶c̶k̶ C̶a̶r̶d̶ diary | MMV Black Card diary | LS Black Card diary | LM Black Card diary |

Iterate / Against Channels

- Change by Different Channel Types

| | | | | | |
|---|---|---|---|---|---|
| High Wagons Green Card Balance | Medium Wagons Green Card Balance | High SUVs Green Card Balance | Medium SUVs Green Card Balance | MMV Green Card Balance | LS Green Card Balance | LM Green Card Balance |
| High Wagons Gold Card Balance | Medium Wagons Gold Card Balance | High SUVs Gold Card Balance | Medium SUVs Gold Card Balance | MMV Gold Card Balance | LS Gold Card Balance | LM Gold Card Balance |
| High Wagons Gold Card diary | Medium Wagons Gold Card diary | High SUVs Gold Card diary | Medium SUVs Gold Card diary | MMV Gold Card diary | LS Gold Card diary | LM Gold Card diary |
| High Wagons Gold Card 2 Hr | Medium Wagons Gold Card 2 Hr | High SUVs Gold Card 2 Hr | Medium SUVs Gold Card 2 Hr | MMV Gold Card 2 Hr | LS Gold Card 2 Hr | LM Gold Card 2 Hr |
| High Wagons Black Card diary | Medium Wagons Black Card diary | High SUVs Black Card diary | Medium SUVs Black Card diary | MMV Black Card diary | LS Black Card diary | LM Black Card diary |

FIG. 93

Results Measure HotMap

| | | | | | |
|---|---|---|---|---|---|
| | Medium Wagons Green Card Balance | High SUVs Green Card Balance | Medium SUVs Green Card Balance | MMV Green Card Balance | LS Green Card Balance | LM Green Card Balance |
| High Wagons Green Card Balance | Medium Wagons Gold Card Balance | High SUVs Gold Card Balance | Medium SUVs Gold Card Balance | MMV Gold Card Balance | LS Gold Card Balance | LM Gold Card Balance |
| High Wagons Gold Card Balance | Medium Wagons Gold Card diary | High SUVs Gold Card diary | Medium SUVs Gold Card diary | MMV Gold Card diary | LS Gold Card diary | LM Gold Card diary |
| High Wagons Gold Card diary | Medium Wagons Gold Card 2 Hr | High SUVs Gold Card 2 Hr | Medium SUVs Gold Card 2 Hr | MMV Gold Card 2 Hr | LS Gold Card 2 Hr | LM Gold Card 2 Hr |
| High Wagons Gold Card 2 Hr | Medium Wagons Black Card diary | High SUVs Black Card diary | Medium SUVs Black Card diary | MMV Black Card diary | LS Black Card diary | LM Black Card diary |
| High Wagons Black Card diary | | | | | | |

FIG. 94

SYSTEMS AND METHODS FOR MANAGING AND DISTRIBUTING MEDIA CONTENT

CROSS-REFERENCE TO RELATED APPLICATIONS

This application claims the benefit of U.S. Provisional Patent Application No. 60/761,553, filed on Jan. 23, 2006 and U.S. Provisional Patent Application No. 60/801,891, filed on May 19, 2006, each of which are hereby incorporated by reference herein in their entireties.

This application is also a continuation-in-part of U.S. patent application Ser. No. 11/449,299, filed on Jun. 8, 2006, which claims the benefit of U.S. Provisional Patent Application No. 60/688,612, filed on Jun. 8, 2005 and is also a continuation-in-part of U.S. patent application Ser. No. 09/545,524, filed on Apr. 7, 2000, which are hereby incorporated by reference herein in their entireties.

FIELD OF THE INVENTION

The present invention relates to the field of the generation, customization, distribution, and/or tracking of commercials and media content.

BACKGROUND OF THE INVENTION

Media content is created with the goal of having the content viewed, listened to, or otherwise received by a target audience. The target audience could be, for example, the entire world, a single nation, a region, a city, a neighborhood, or even a specific individual. However, distributing the desired content and targeting it to the desired audience is a difficult process. It is often difficult to control which consumers receive a specific piece of media content. As a result, a distributor or creator of content might have to provide that content to a larger or smaller area than desired.

For example, marketers and advertisers have come to rely on demographic solutions to establish patterns and trends about the purchasing habits of their target audience. Marketers and advertisers use the derived information to generate observations relating to their markets, target individuals to different types of offerings, and select appropriate media purchases for advertising. In the case of video advertising media—e.g., video tapes that are mailed, Internet video streams, or broadcast or cable advertising, there are only limited means to produce personalized versions of the advertisements or direct marketing information that directly takes advantage of information available about the target audience. As such, even though companies know a tremendous amount of information about their target audience, the ability to leverage this information has been limited by the fundamentals of the broadcast medium, thus requiring that a like message be sent to all customers.

In another example, a marketer and/or advertiser may create a general advertising campaign. When a parent company purchases the general campaign from the marketer and/or advertiser, the company generally provides the campaign to their field offices (e.g., a subsidiary organization) for distribution. Each field office typically hires another advertising agency to modify the advertisement based on, for example, the respective market. This process of modifying the advertisement is not only expensive, but the message that the modified advertisement contains may veer from the general campaign that the parent organization desired. In addition, the changes that are made might be made separately, and thus redundantly by the different field offices. This is an expensive and ineffective method of creating and distributing content.

Accordingly, there exists a need for systems and methods for content management that overcome these and other deficiencies in prior art systems.

SUMMARY OF THE INVENTION

In accordance with the present invention, systems and methods for generating, customizing, and/or distributing media content are provided. In particular, systems and methods that allow users to manage the editing of media content and make decisions relating to the media content based on semantic criteria and other considerations are provided.

Generally speaking, the present invention allows a user (e.g., an advertiser, a marketer, a field office, a subsidiary of a parent company, a cable operator, etc.) to provide semantic criteria that may have associated with it particular metadata characteristics (e.g., male, female, unknown gender, zip code, type of vehicle, age, race, etc.) to the media content management application.

In some embodiments, the media content management application is an end-to-end platform for creating, managing, distributing, and/or tracking media content. Users of the media content management application may include, for example, advertisers, marketers, users at a corporate headquarters, users at a field office, users at a subsidiary of a parent company, a cable operator, a service provider, a content provider, a multiple cable system operator (MSO), etc. For example, an advertiser may upload advertisement campaigns to the media content management application for use or purchase by users at a service provider or users at a MSO. In another example, an advertiser (e.g., Verizon Wireless) may create multiple versions of a commercial (e.g., commercials having different actors, different offers, different music clips, etc.) and allow local cable operators (e.g., CBS-Denver, CBS-New York) to select one of the versions for transmission to their audience. In yet another example, a user at a cable operator (e.g., CNN) may create multiple versions of a commercial and allow each of its affiliates (e.g., local CNN station) to select one of the versions of the commercial.

As described above, the media content management application of the present invention may allow users to generate and customize media content using semantic criteria. For example, the media content management application may provide the user with a list of semantic criteria (e.g., in the form of questions or options) relating to the media content. Using the user's responses to the semantic criteria, the media content management application provides the user with semantic editorial control. For example, the media content management application may provide the user with one or more abstract questions for information relating to gender, affluence, ethnicity, geography, advertisement style, type of offer, etc. Based on the responses to each of the questions, the media content management application may use an editing/assembly software package to determine which media segments are associated with the responses. Each of the media segments has metadata associated with it. The responses are interpreted by the editing/assembly software package and correlated with metadata. Using metadata, the editing/assembly software package retrieves the corresponding media segments and assembles the media content.

In some embodiments, the media content management application provides the user with a preview of the assembled media content. The preview may be presented to the user prior to transmitting the assembled media content to a content provider or other recipient. The preview may also be present to the user prior to providing the user with an opportunity to order the assembled media content. In some embodiments, the preview is transmitted to the user in a media format suitable for transmission over the Internet (e.g., Advanced Streaming Format (ASF), Windows Media Video, etc.), where the assembled media content is transmitted to a recipient in a different format (e.g., CD, DVD, VHS, Betamax, Blu-ray, HD DVD, etc.).

Using the media content management application, the user may also order (e.g., place in a shopping cart) and receive a finished version of the media content. The finished version may be transmitted to a delivery point in any suitable medium (e.g., videotape, DVD, MPEG-2, MPEG-4, standard definition, high definition, downloaded, etc.). That is, in addition to creating and assembling media content, the media content management application allows the user to manage the distribution of the media content. For example, an advertiser may create multiple versions of a commercial and transmit one or more of the versions to local content providers. In another example, the advertiser may create multiple versions of the commercial and allow each content provider to access the media content management application, where each content provider selects one or more versions of the commercial. The local content provider may then transmit the selected version of the commercial to an audience.

The media content management application may also include a feedback mechanism. The feedback mechanism of the media content management application may receive feedback information from, for example, an audience member, a local content provider, a service operator, an advertiser, a multiple cable system operator (MSO), or any other suitable entity, on the responsiveness or effectiveness of a commercial or media content. In response to receiving the feedback, the media content management application may store the feedback. The media content management application may also provide the user with a recommendation, such as a purchasing recommendation. The recommendation may include, for example, a recommended advertising campaign, recommended media segments (e.g., a recommended actor/actress, a recommended voiceover, a recommended background, a recommended music track, etc.), recommended local service providers for transmitting media content, etc.

The media content management application may also be implemented on, for example, a cable headend. For example, the media content management application may automatically generate media content (e.g., commercials) and transmit the media content to an audience through the headend. Upon monitoring the media content and receiving feedback on the media content, the headend may use the media content management application to automatically assemble updated media content (e.g., another version of the commercial) and transmit the media content to the audience.

Thus, there has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description matter in which there is illustrated preferred embodiments of the invention.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIGS. 18-32 are illustrative screens providing semantic criteria relating to an advertisement campaign that may be provided in accordance with some embodiments of the present invention.

FIG. 43 is an illustrative media content description screen that may be provided in accordance with some embodiments of the present invention.

FIGS. 44-54 are illustrative targeting screens for delivering one or more versions of media content that may be provided in accordance with some embodiments of the present invention.

FIGS. 55-57 are illustrative ordering screens for ordering one or more versions of media content that may be provided in accordance with some embodiments of the present invention.

FIGS. 58-61 are illustrative history screens associated with the user of the media content management application that may be provided in accordance with some embodiments of the present invention.

FIG. 65 is a flowchart illustrating the compliance features of the media content management application in accordance with some embodiments of the present invention.

FIGS. 70-94 are illustrative recommendation screens, where the media content management application allows the user to create a prototype city, apply potential offers and products to that prototype city, and compare the prototype city to an actual city in accordance with some embodiments of the present invention.

DETAILED DESCRIPTION OF THE INVENTION

Figure 1:
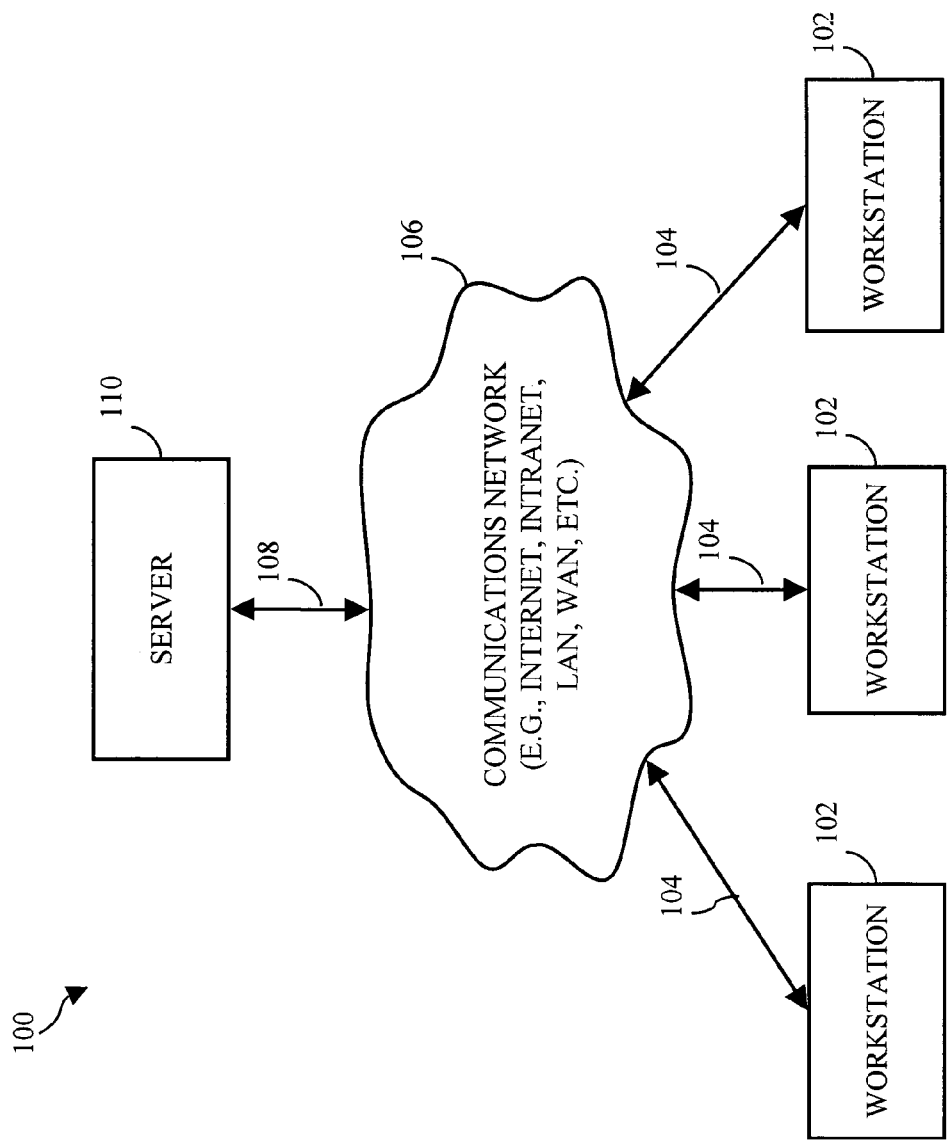
FIG. 1 is a schematic diagram of an illustrative media content management system on which a media content management application may be implemented in accordance with some embodiments of the present invention.

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

In accordance with the present invention, systems and methods for generating, customizing, and/or distributing media content are provided (hereinafter "the media content management application" or "the application"). In particular, systems and methods that allow users to manage the editing of media content and make decisions relating to the media content based on semantic criteria and other considerations are provided.

Generally speaking, the present invention allows a user (e.g., an advertiser, a marketer, a field office, a subsidiary of a parent company, a cable operator, a service provider, etc.) to provide semantic criteria that may have associated with it particular metadata characteristics (e.g., male, female, unknown gender, zip code, type of vehicle, age, race, etc.) to the application. For example, the semantic criteria and/or metadata characteristics may relate to an intended audience for the media content. In response, the application extracts the metadata characteristics and performs the necessary functions to generate one or more versions of media content (e.g., an advertisement). These one or more versions of media content are provided to the user. This may be performed by a user that does not have knowledge of professional editing/assembly software, such as editing software developed by Avid Technology, Inc., Final Cut Pro developed by Apple Computer Inc., intelliSpot or other assembly software developed by Visible World, etc. That is, in response to providing semantic criteria and/or metadata characteristics, the media content management application may use one or more of these professional editing/assembly software or software packages or transmit the information to another user that has knowledge of these professional editing/assembly software or software packages to create one or more versions of the media content that correspond to the metadata characteristics.

Professional editing/assembly software requires that users be familiar with the editing toolsets of the software as well as the details of the media content, such as the editing points, the sequence of the media segments, how audio segments are married to video segments, how a background audio track is married to video segments, which media segments may be customized and/or replaced, and any other suitable detail relating to the media content. In addition, the professional editing/assembly software requires that the user know the database structure called by the editing/assembly software or how and which metadata has been married to the audio segments, video segments, or any other suitable media segments. The media content management application avoids these difficulties of these professional editing/assembly software packages because the user is provided with an abstraction in the form of semantic controls or semantic criteria. In response to the semantic controls, the semantic controls are translated into functions that may be performed by one of these professional editing/assembly software packages. Thus, the users of the media content management application is not required to have knowledge of the professional editing/assembly software packages or have knowledge of how the media content (e.g., an advertisement) is put together. In addition, the user of the media content management application is not required to have knowledge of the structure of the database accessed by the professional editing/assembly software packages or how and which metadata is associated with media segments stored in the database.

In addition, the media content management application allows the user (e.g., an advertiser) to create a version of media content without having knowledge of media planning and placement, dynamic processing, production, and post-production.

It should be noted that the user is not required to input all of the necessary metadata characteristics needed to create the one or more versions of the media content. For example, the user may input that the intended audience resides in the zip code "10020." In response, the media content management application may not require that the user know any other information regarding the intended audience in the zip code "10020." The media content management application may obtain the metadata characteristics that correspond to the intended audience from another entity, a database, or any other suitable source. For example, the media content management application may extract from the inputted zip code of "10020" that the intended audience is 60% male and 40% female, 80% have an income level greater than $100,000, and 60% are Caucasian.

It should also be noted that the user is not required to have a database or a special purpose database that assembles the versions of media content. The media content management application avoids this difficulty by using editing/assembly software to generate the versions of media content with the appropriate media segments (e.g., portions of audio, portions of video, background audio, voiceovers, images, animations, graphics, etc.) and providing it to the user without the need for having and/or maintaining a special purpose database (e.g., an object oriented database with a plurality of media segments, including those media segments not desired by the user). The media segments that relate to the semantic criteria and/or metadata characteristics are used to generate the versions of media content.

Using this application, the user may order and receive a finished version of the media content. The finished version may be transmitted to a delivery point in any suitable medium (e.g., videotape, DVD, MPEG-2, MPEG-4, standard definition, high definition, downloaded, etc.). That is, in addition to assembling media content, the media content management application allows the user to manage the distribution of the media content. For example, an advertiser may create multiple versions of a commercial and transmit one or more of the versions to local content providers. In another example, the advertiser may create multiple versions of the commercial and allow each content provider to access the media content management application, where each content provider selects one or more versions of the commercial. The local content provider may then transmit the selected version of the commercial to an audience.

The media content management application may also include a feedback mechanism. The feedback mechanism of the media content management application may receive feedback information from, for example, an audience member, a local content provider, a service operator, an advertiser, a multi-service operator (MSO), or any other suitable entity, on the responsiveness or effectiveness of a commercial or media content. In response to receiving the feedback, the media content management application may store the feedback. The media content management application may also provide the user with a recommendation, such as a purchasing recommendation. The recommendation may include, for example, a recommended advertising campaign, recommended media segments (e.g., a recommended actor/actress, a recommended voiceover, a recommended background, a recommended music track, etc.), recommended local service providers for transmitting media content, etc.

The media content management application may also be implemented on, for example, a server operated by a service provider or a headend. For example, the media content management application may automatically generate media content (e.g., commercials) and transmit the media content to an audience. Upon monitoring the media content and receiving feedback on the media content, the server may use the media content management application to automatically assemble updated media content (e.g., another version of the commercial) and transmit the media content to the audience.

The following FIGS. 1-94 and their accompanying descriptions provide detailed examples of the implementation of the systems and methods of the present invention.

FIG. 1 is a generalized schematic diagram of an illustrative media content management system 100 on which a media content management application may be implemented in accordance with some embodiments of the present invention. As illustrated, system 100 may include one or more workstations 102. Workstations 102 may be local to each other or remote from each other. Workstations 102 are connected by one or more communications links 104 to a communications network 106 that is linked via a communications link 108 to a server 110.

System 100 may include one or more servers 110. Server 110 may be any suitable server for providing access to the media content management application, such as a processor, a computer, a data processing device, or a combination of such devices. Communications network 106 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 104 and 108 may be any communications links suitable for communicating data between workstations 102 and server 110, such as network links, dial-up links, wireless links, hard-wired links, any other suitable communications links, or a combination of such links. Workstations 102 enable a user to access features of the media content management application. Workstations 102 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. Workstations 102 and server 110 may be located at any suitable location. In one embodiment, workstations 102 and server 110 may be located within an organization. Alternatively, workstations 102 and server 110 may be distributed between multiple organizations.

Figure 2:
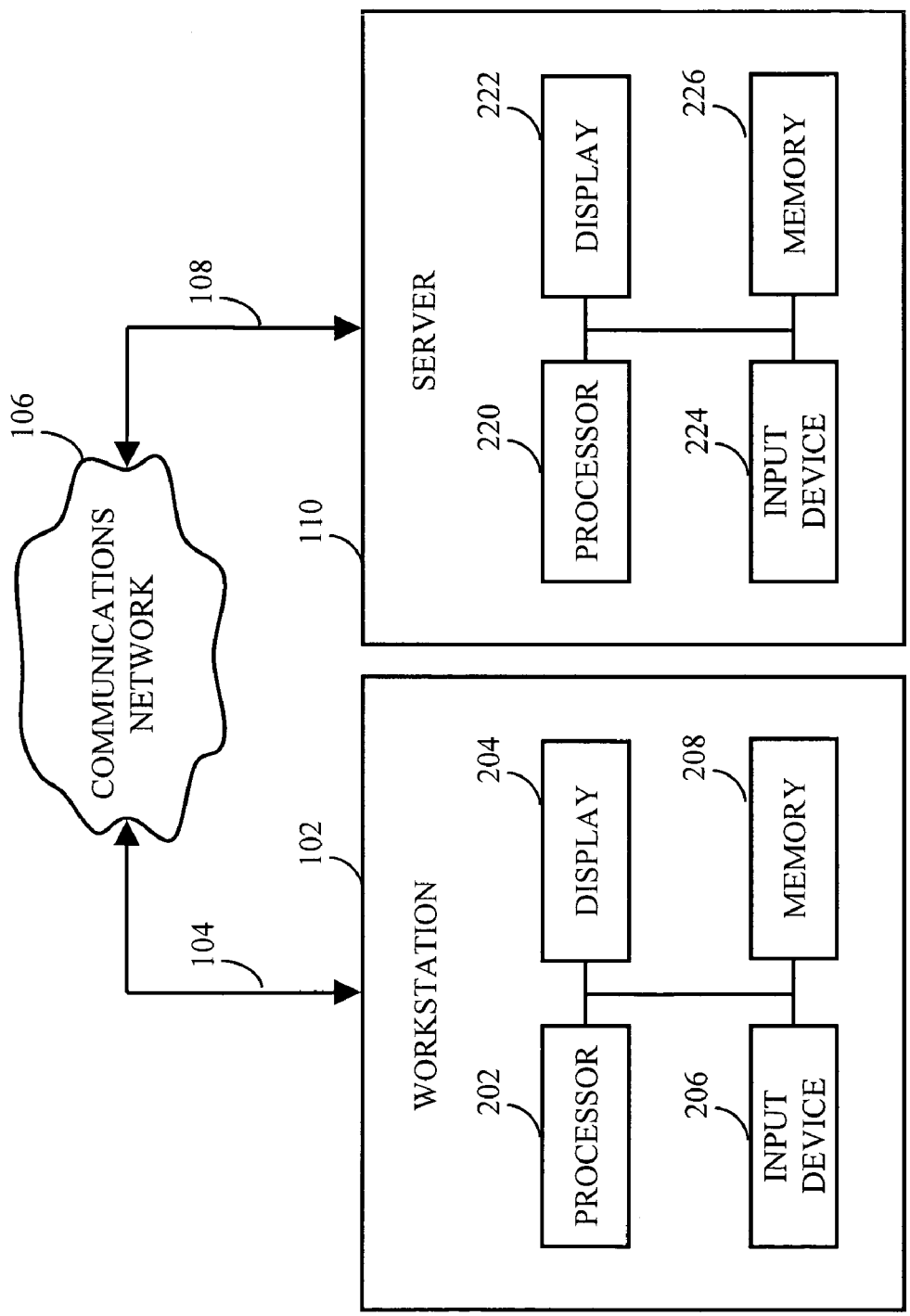
FIG. 2 is a schematic diagram of an illustrative workstation and server as provided, for example, in FIG. 1 in accordance with some embodiments of the present invention.

The server and one of the workstations, which are depicted in FIG. 1, are illustrated in more detail in FIG. 2. Referring to FIG. 2, workstation 102 may include processor 202, display 204, input device 206, and memory 208, which may be interconnected. In a preferred embodiment, memory 208 contains a storage device for storing a workstation program for controlling processor 202.

Processor 202 uses the workstation program to present on display 204 the application and the data received through communications link 104 and commands and values transmitted by a user of workstation 102. It should also be noted that data received through communications link 104 or any other communications links may be received from any suitable source, such as WebServices. Input device 206 may be a computer keyboard, a cursor-controller, dial, switchbank, lever, or any other suitable input device as would be used by a designer of input systems or process control systems.

Server 110 may include processor 220, display 222, input device 224, and memory 226, which may be interconnected. In a preferred embodiment, memory 226 contains a storage device for storing data received through communications link 108 or through other links, and also receives commands and values transmitted by one or more users. The storage device further contains a server program for controlling processor 220.

In some embodiments, the media content management application may include an application program interface (not shown), or alternatively, the application may be resident in the memory of workstation 102 or server 110. In another suitable embodiment, the only distribution to workstation 102 may be a graphical user interface ("GUI") which allows a user to interact with the media content management application resident at, for example, server 110.

In one particular embodiment, the media content management application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the media content management application is described herein as being implemented on a workstation and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, e.g., the Internet, an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

Figure 3:
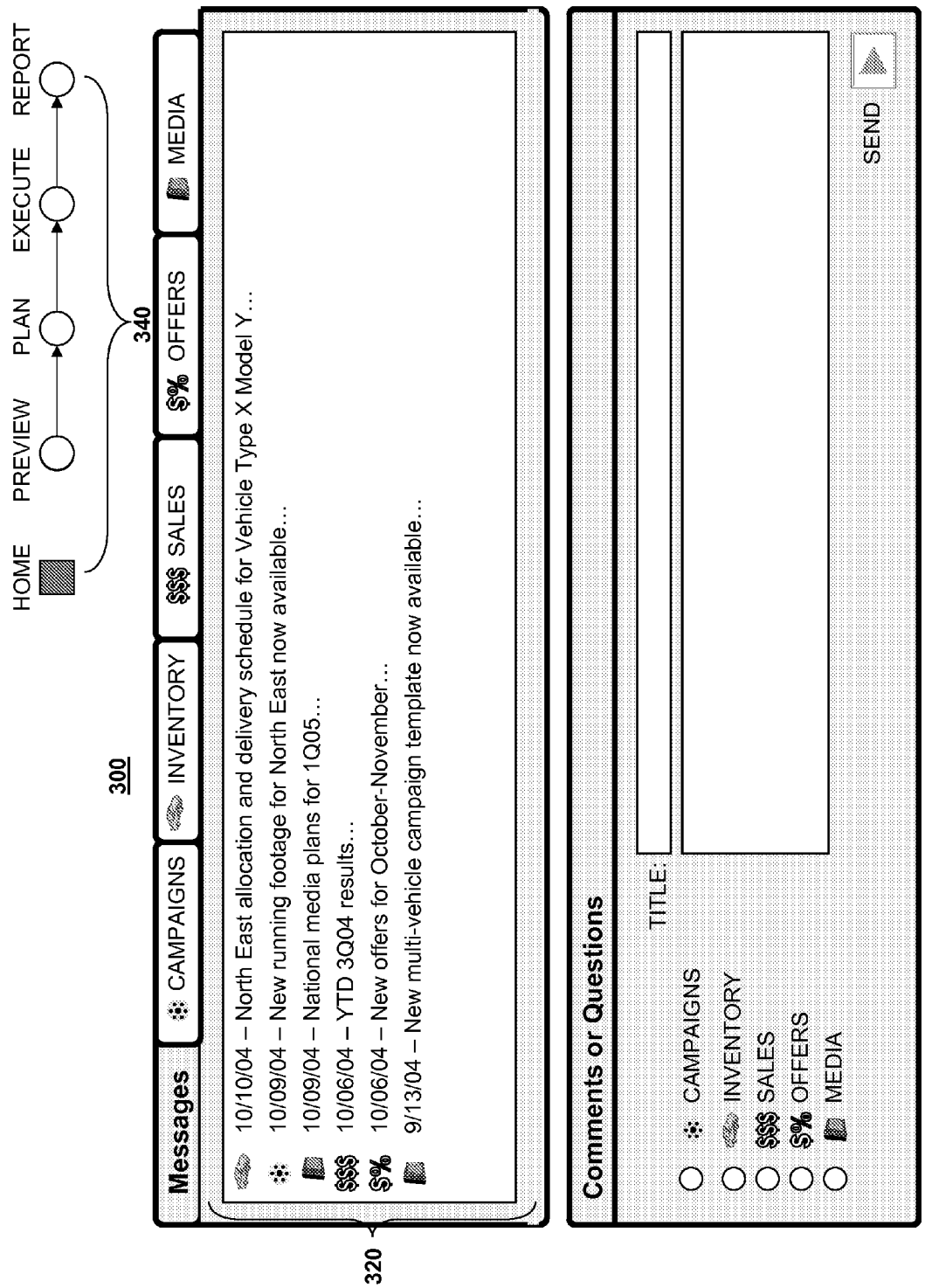
FIG. 3 is an illustrative home screen that may be provided in accordance with some embodiments of the present invention.

Turning now to FIG. 3, an illustrative home screen 300 that may be provided in accordance with some embodiments of the present invention is displayed. The media content management application is designed to provide users with the ability to efficiently and conveniently create, customize, and/or distribute media content using semantic criteria. This includes, for example, allowing the user to browse through information relating to media content (e.g., which media segments are available, which media segments are new, inventory information, sales information, sales results, offer information, templates available for use, etc.).

As shown in FIG. 3, screen 300 is related to creating, customizing, and/or distributing media content relating to automobiles (e.g., automobile commercials). However, the media content may relate to any other suitable subject, such as, for example, travel, electronics, political campaigns, etc.

Screen 300 includes information relating to campaigns, campaign templates (e.g., a campaign template for a thirty second commercial for multiple vehicles), inventory (e.g., newly delivered cars and the allocation in the Northeast), sales (e.g., third quarter of 2004 sales results, year to date sales results, annual sales reports, etc.), offers (e.g., offers for the months of October and November, end of the year offers, leasing offers, etc.), and updated media content (e.g., new campaign templates available for use, new media content for selection, etc.).

As shown, screen 300 of FIG. 3 is designed to be provided on a computer display (e.g., display 204 of workstation 102 or display 222 of server 110 of FIGS. 1 and 2). However, it should be noted that the format and contents of the screens that follow may be modified to accommodate different platforms, if desired. It should also be noted that some, all, or alternatives to the following screens may be provided to a user of the media content management application in accordance with the present invention.

The media content management application may be accessed by various users including, but not limited to, an advertiser, a marketer, a user at a field office, a user at a parent company, a user at a subsidiary of the parent company, and a user at a cable operator in order to create, customize, and/or distribute media content. In some embodiments, the media content management application may provide each of these users with different features. For example, an advertiser may be permitted to create a variety of versions of a commercial spot, while a user at a field office may only be permitted to make certain changes to one or more commercial spots. In such an example, the commercial spots created by the advertiser may be customized by other users, but in a way that the overall message does not change. Alternatively, certain users (e.g., an advertiser or a marketer) may be permitted to create and/or customize media content, while other users (e.g., a user at a field office) may be permitted to purchase or receive media content.

The media content management application provides the user with an interface 340 for creating, customizing, and/or distributing media content. As shown in FIG. 3, the "home" button is currently selected in interface 340.

In some embodiments, the media content management application may allow the user to select to receive media content. For example, the user may be provided with an interface having a plurality of media content. In response to the selection by the user, the media content management application may retrieve the media content from a library of media content and provide the media content to the user. The library of content may be provided to the user in the form of, for example, a list, a database, or any other suitable approach for providing content to the user. Alternatively, the media content management application may provide the user with one or more semantic criteria for creating and/or customizing the media content. Segments (e.g., portions of audio, portions of video, background audio, voiceovers, images, etc.) may be retrieved from the library of content and assembled to create the media content using an editing/assembly software package, an editing/assembly system, or a user that is capable of using the editing/assembly software package or editing/assembly system. The user may preview the content before purchasing it or at any time during or after the selection and creation process.

Figure 4:
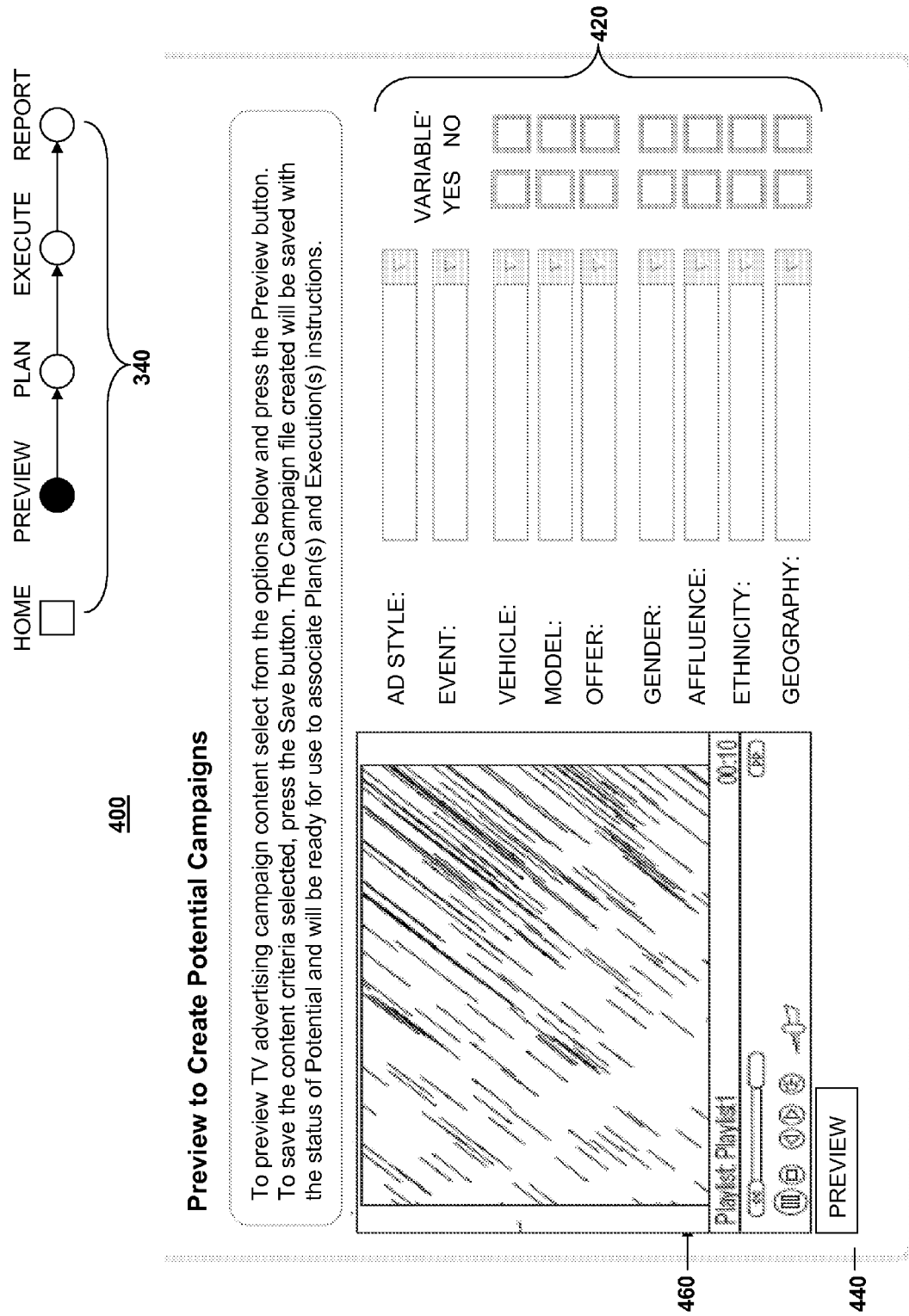
FIG. 4 is an illustrative customization screen having options for customizing and editing media content that may be provided in accordance with some embodiments of the present invention.

Referring back to FIG. 3, in response to the user selecting the "preview" button of interface 340, the media content management application provides the user with an illustrative creation screen 400 (FIG. 4). In some embodiments, the media content management application may provide the user with a list of campaigns (e.g., an advertising campaign for automobiles, an advertising campaign for a politician, etc.) or a list of generated media content. In response to selecting a particular campaign or particular media content, the media content management application may provide the user with screen 400 to customize the media content using semantic criteria.

In some embodiments, the media content management application may provide the user with one or more semantic criteria (e.g., in the form of questions or options) relating to the media content. Using the responses to the semantic criteria, the media content management application provides the user with semantic editorial control. For example, the media content management application may provide the user with one or more abstract questions for information relating to gender, affluence, ethnicity, geography, advertisement style, type of offer, etc. Based on the responses to each of the questions, the media content management application may use an editing/assembly software package to determine which media segments are associated with the responses, retrieve the corresponding media segments, and/or assemble the one or more versions of the media content.

In one example, the media content management application may provide the user with the question "What is the offer?" In response to the user inputting that a 20% off offer should be conveyed in the media content, the media content management application may perform the routines necessary to create media content that conveys such a message. For example, the media content management application may associate such a response with the media segments relating to 20% off sales offers (e.g., an audio segment describing the offer, a video segment describing the offer, a soundtrack to go along with the offer, disclaimers that are to be displayed along with the offer, how the media segments are sequenced, how the audio segments are married to the video segments, which segments overlap, how the background audio track is married to the video segments, etc.). The media content management application may transmit the semantic criteria to an editing/assembly software package, an editing/assembly system, or a user of the editing/assembly software package or editing/assembly system that constructs a version of the media content for the user.

As shown in FIG. 4, screen 400 provides the user with a list of semantic criteria 420 relating to the media content to be created. Using screen 400 or any other suitable interface, the media content management application allows the user to manage the editing of media content and make decisions relating to the media content (or version of the media content) based on semantic criteria. Semantic criteria 420 may include, for example, options relating to the style of the advertisement, options relating to the event, options relating to the type of vehicle, options relating to the model of the vehicle, options relating to the offer, options relating to the gender of the target audience (e.g., male or female), options relating to the affluence of the target audience (e.g., income greater than $70,000), options relating to the ethnicity of the target audience (e.g., Caucasian, African-American, Hispanic, Asian, etc.), options relating to the geography of the target audience (e.g., Northeast, South, Europe, Asia, etc.), etc. Any other suitable criteria may also be provided. For example, criteria relating to the target audience's likes and dislikes (e.g., the audience likes sports-related commercials, the audience likes advertisements with dogs in it, etc.) may be provided.

For example, as shown in FIG. 4, the media content management application may allow a user, such as an advertiser, to respond to the questions having semantic criteria. The responses to the semantic criteria (e.g., semantic criteria 420) may be used by the media content management application to perform the necessary functions to generate one or more version of media content. For example, in response to the user indicating that the intended audience has the gender "Male," the media content management application may use this semantic criteria to determine which media segments may be used for constructing the version of the media content. In one example, the media content management application may provide the semantic criteria and/or metadata characteristics (e.g., male) to an editing/assembly software package or a user of the editing/assembly software package. The editing/assembly software package may be used to retrieve media segments relating to the semantic criteria and/or metadata characteristics and assemble one or more versions of the media content.

Professional editing/assembly software (e.g., editing software developed by Avid Technology, Inc., Final Cut Pro developed by Apple Computer Inc., intelliSpot or other assembly software developed by Visible World, etc.) requires that users be familiar with the editing toolsets of the software as well as the details of the media content, such as the editing points, the sequence of the media segments, how audio segments are married to video segments, how a background audio track is married to video segments, which media segments may be customized and/or replaced, and any other suitable detail relating to the media content. In addition, the professional editing/assembly software requires that the user know the database structure called by the editing/assembly software or how and which metadata has been married to the audio segments, video segments, or any other suitable media segments. It should be noted that the media content management application avoids these difficulties because the user is provided with an abstraction in the form of semantic controls or semantic criteria. In response to the semantic criteria, the semantic criteria are translated into functions that may be performed by one of these professional editing/assembly software packages. In response to providing semantic criteria, the media content management application may use one or more of these professional editing/assembly software packages or transmit the information to another user that has knowledge of these editing/assembly software packages to create one or more versions of the media content that correspond to the metadata characteristics. Thus, the users of the media content management application are not required to have knowledge of the professional editing/assembly software packages or have knowledge of how the media content (e.g., advertisement) is put together. In addition, the user of the media content management application is not required to have knowledge of the structure of the database accessed by the professional editing/assembly software packages or how and which metadata is associated with media segments stored in the database.

In some embodiments, the media content management application may use the semantic criteria provided by the user to obtain additional information about the intended audience of the version of the media content. For example, the user may input that the intended audience resides in the zip code "10020" in the "Geography" field of FIG. 4. In response, the media content management application may not require that the user know any other information regarding the intended audience in the zip code "10020." The media content management application may obtain the metadata characteristics that correspond to the intended audience from another entity, a database, or any other suitable source. For example, the media content management application may extract from the inputted zip code of "10020" that the intended audience is 60% male and 40% female, 80% has an income level greater than $100,000, and 60% is Caucasian. In another example, the media content management application may retrieve the information from a different source (e.g., from the United States Census Bureau website, from a market demographics website, from a marketing database, etc.).

In some embodiments, the media content management application may allow the user to indicate whether certain semantic criteria are variables for creating or customizing the media content. As shown in FIG. 4, the user may select "NO" for at least one of the semantic criteria 420. In response, those semantic criteria may not be considered a variable in creating or customizing the media content. For example, in response to the user selecting "NO" for the gender semantic criteria, the media content management application may select default audio and/or video segments from a database that are not directed towards a particular gender (gender neutral or gender unknown).

Accordingly, in response to the user responding to one or more of semantic criteria 420, the media content management application may assemble media content that the user may preview. In response to selecting a preview button 440, the media content management application may display the version of the media content in a window 460. Using semantic criteria, the media content management application allows user to preview and order finished versions of the media content for delivery.

It should be noted that the media segments include, for example, graphics (e.g., text, images, background filler, visual objects, visual effects, etc.), video segments, audio segments (e.g., synthesized speech, music, background sounds, etc.), animations, etc. While these media segments used in assembling the one or more versions of the media content may be retrieved from a database, it should also be noted that the user or the media content management application is not required to have a database that assembles the versions of media content. The media content management application avoids this difficulty by using an editing/assembly software package that generates the versions of media content with the appropriate media segments (e.g., portions of audio, portions of video, background audio, voiceovers, images, animations, graphics, etc.) and provides the versions of media content to the user without the need for having and/or maintaining a special purpose database (e.g., an object oriented database with a plurality of media segments, including those media segments not desired by the user). The media segments that relate to the semantic criteria and/or metadata characteristics are used by the editing/assembly software package to generate the versions of media content.

It should be also noted that media segments and other elements may have metadata associated with them in terms of relative or absolute fit with one or more semantic criteria. For example, in response to a price change, the media content management application or an editing/assembly software package may retrieve one or more different pieces of corresponding video segments and one or more different pieces of corresponding audio segments with rules on placement, synchronization of audio with video, and a change in the background music track. In another example, each media segment may have one or more metadata tags associated with it and, in response to receiving semantic criteria with corresponding metadata characteristics, the editing/assembly software package may retrieve media segments having the corresponding metadata characteristics. The semantic criteria may affect how media content is sequenced, the primary audio segments and how it is married to the video segments, the background audio track and how it is married to the video segments, etc.

It should further be noted that the media content management application may use an editing/assembly software package or any other suitable software to assemble a plurality of versions of the media content that the user may preview, each of which are in accordance with the user's responses to the one or more semantic criteria 420. The user may preview and select one or more of the media content for distribution. In another embodiment, the media content management application may allow the user to select additional options (e.g., options 420) to more narrowly tailor the one or more versions of the media content.

Alternatively, in some embodiments, the media content management application may provide the user with a variety of media segments that correspond to the semantic criteria for selection by the user to construct the customized version of media content. For example, the media content management application may provide the user with a variety of customized media content, where each has different media segments, and the user may select at least one of the customized media content. In another example, the media content management application may provide the user with a list or a display of media segments, where the user may select one or more of the media segments for incorporation into the resulting customized media content.

Figure 5:
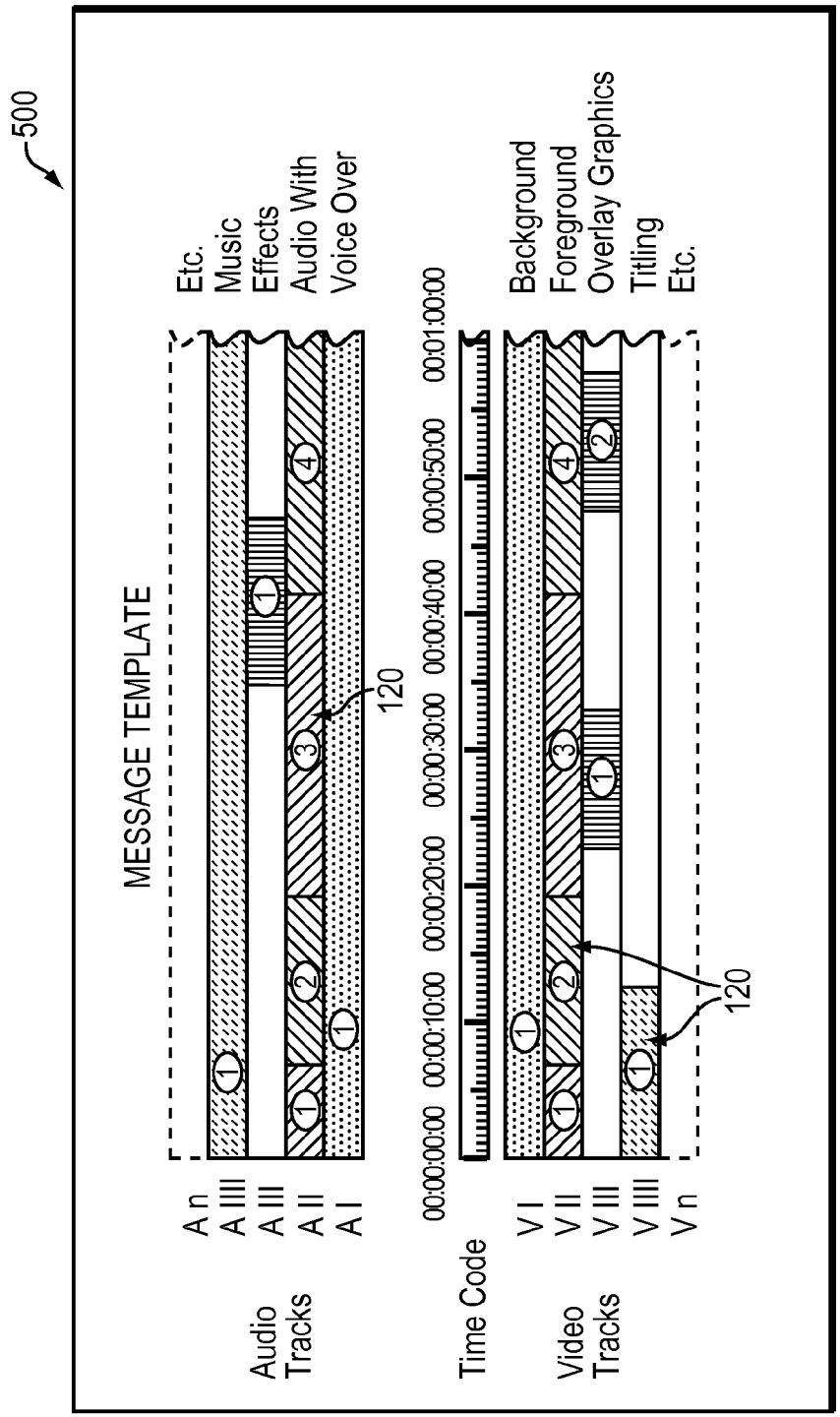
FIG. 5 is an illustrative message template that may be provided in accordance with some embodiments of the present invention.
Figure 6:
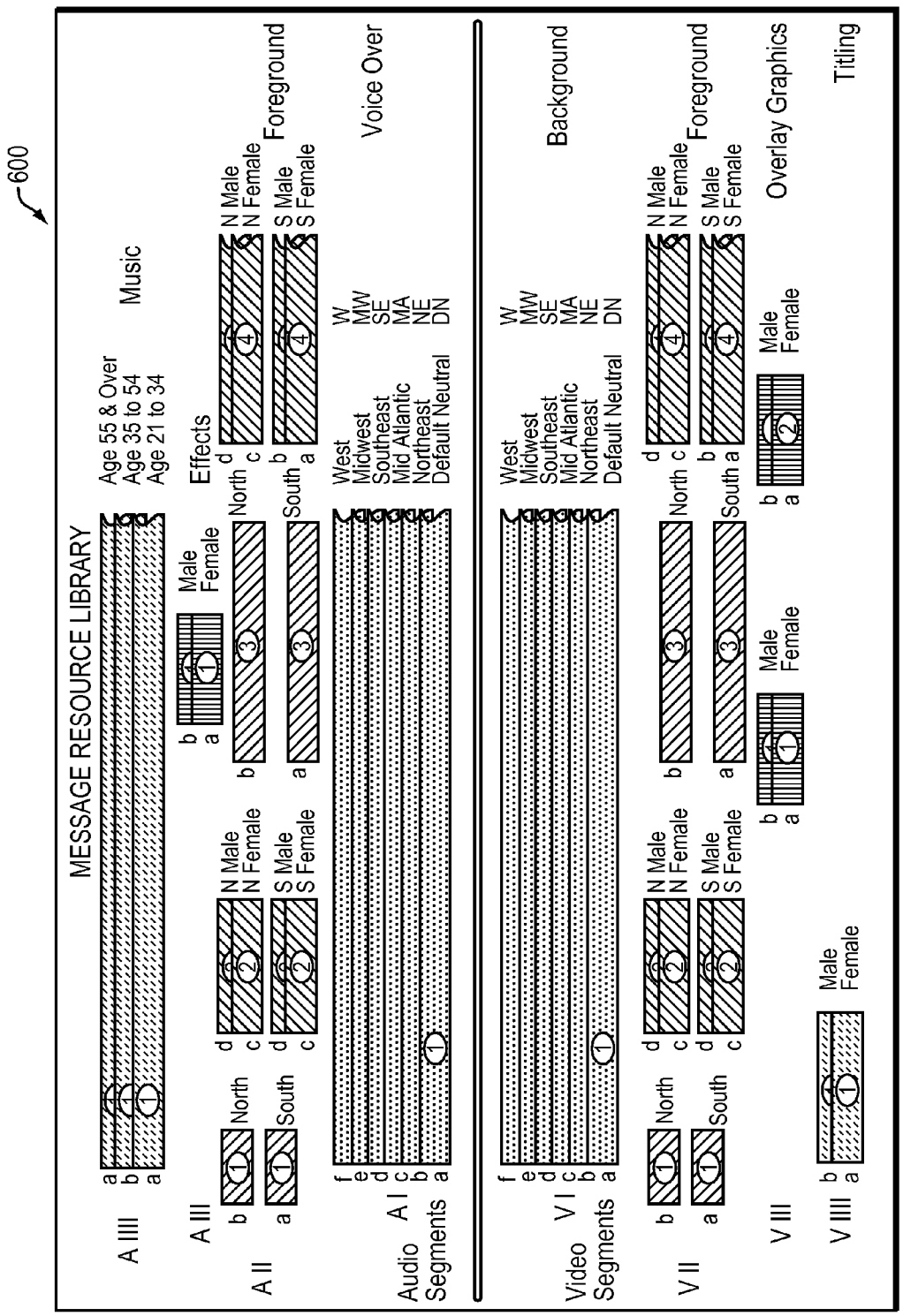
FIG. 6 is an illustrative schematic of the contents of a media database that may be provided in accordance with some embodiments of the present invention.

FIGS. 5 and 6 show an illustrative message template 500 and the contents 600 of a database that may be provided in accordance with some embodiments of the present invention. The message template 500 describes a framework to create and assemble media content for the target audience. The message template may include sequences 520, such as insertable sequences (e.g., insertable audio and/or video media segments) and/or predefined sequences. For example, predefined sequences may be inserted into the message template 500 that do not vary between different versions of the media content. In addition, the message template 500 may include rules for selection and combination of media segments and other resources to generate the media content.

It should be noted that the message template of the present invention 500 is not limited to orthogonal assembling of media segments. One or more elements of the media content are capable of being controlled and combined using various approaches to provide customized media content. For example, a background scene, such as a geographic landscape, is selected from one database and used as a common background throughout the playback of the media content, while insertable video segments are added to the media content at certain positions.

The design of the message template may be determined using information from the campaign, information from the default message (e.g., non-customized media content), etc.

In response to indications from the user, the media content management application may create media content for a particular market, company, or individual. For example, the media content management application may use an editing/assembly software package to obtain particular media segments and/or media information from one or more databases and assemble media content to be distributed to an audience. It should be noted that the database accessed by the media content management application or the editing/assembly software package may be any suitable storage device for storing advertisement information, audio segments, video segments, sequences, any other suitable media segments, and any other suitable information that may be used to generate media content. The database may be a special media database that is accessed by the media content management application or the editing/assembly software package. The database may be untethered to the media content management application, the editing/assembly software package, the cable operator, the headend, the network provider, and/or any other suitable entity.

It should be also noted that these sequences and media segments may be stored on high capacity, high speed servers, databases, or any suitable storage device capable of delivering these sequences and media segments in "real time" or "near real time" for production and assembly on the fly.

Editing/assembly software packages and features for creating personalized messages based on user information are described in, for example, commonly-owned, commonly-assigned U.S. patent application Ser. No. 09/545,524, filed Apr. 7, 2000, which is hereby incorporated by reference herein in its entirety.

In some embodiments, the media content management application may also use or attach semantic criteria and/or metadata characteristics to more narrowly tailor or customize the versions of media content.

Figure 7:
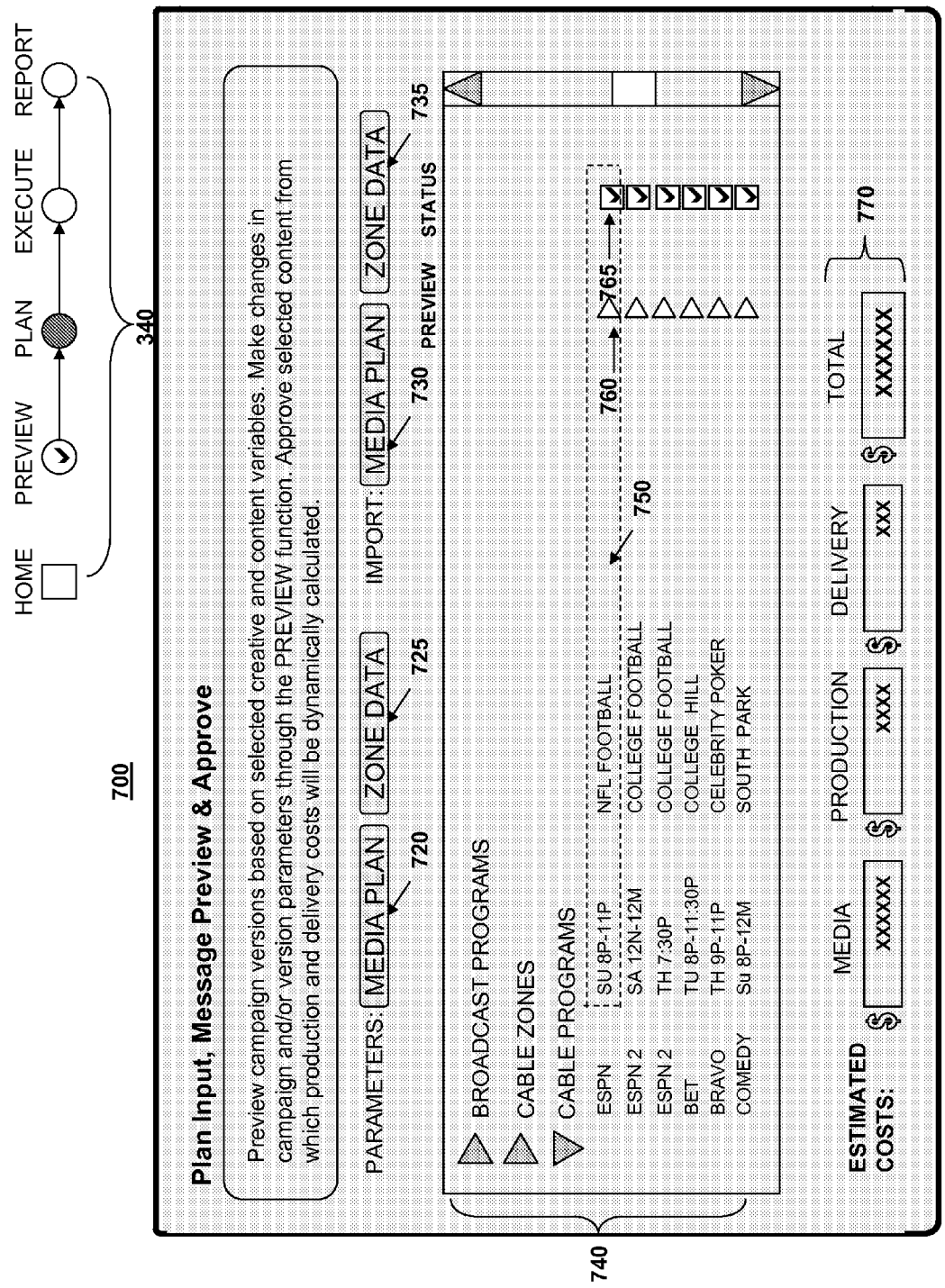
FIG. 7 is an illustrative planning screen that may be provided in accordance with some embodiments of the present invention.

Referring to FIG. 7, in response to the user previewing the assembled version of the media content, the media content management application provides the user with an illustrative planning screen 700 that may be provided in accordance with some embodiments of the present invention. As shown in interface 340, the "plan" button is currently selected.

In some embodiments, the media content management application may provide the user with an opportunity to preview versions of the media content based on selected options, edit and/or customize the media content, and approve media content to be produced. In some embodiments, the media content management application will dynamically calculate the product and delivery costs for the approved media content. The media content management application may provide the user with alternatives and/or optimize the version of media content based on cost. For example, one version of the media content may provide a video clip using an actor, while another version of the media content may provide a video clip using a cartoon character. Each version of the media content may have a different cost associated with it (for example, due to the cost of hiring an actor or the Screen Actors Guild agreement for on-camera performers associated with the video clip).

As shown in FIG. 7, the media content management application provides the user with parameters 720 and 725. Parameters 720 and 725 may allow the user to further customize the version of media content based on additional semantic criteria. Based on the parameters selected by the user or by the media content management application, certain additional semantic criteria may be provided to the user for customizing the version of media content. For example, the parameters "Media Plan" and "Zone Data" are provided in FIG. 5. "Zone Data" may relate to demographics for the region the media content is to be transmitted. Accordingly, the parameter "Zone Data" may provide the user with demographics options, such as gender options, income options, ethnicity options, etc.

In some embodiments, the media content management application allows the user to import parameters from other sources (e.g., parameters 730 and 735). For example, the user may import "Zone Data" parameters 735 from another campaign. In another example, importing "Zone Data" parameters 735 may include retrieving demographic information from a different source (e.g., from the United States Census Bureau website, from a market demographics website, from a marketing database, etc.).

As shown in FIG. 7, the media content management application provides the user with a listing of programs 740 for each provider (e.g., broadcast programs, cable zones, cable programs, etc.). In response to selecting a provider or type of program, the media content management application may display the listing of programs 740. Each listed program 750 may include program information, such as channel name, broadcast time, title of the program, type of program, and/or any other suitable information. The user may select to associate the customized version of media content to the program 750 by, for example, selecting a check box 765. Upon approval of the media content, the media content may be assembled, produced, and distributed to the appropriate entity for playback during the selected program 750.

For each selected program to distribute media content, the media content management application may dynamically calculate the associated costs and display the associated costs in cost interface 770. The costs may be an estimate to generate one or more pieces of media content and deliver the media content to the appropriate entities. The costs may include, for example, media costs, production costs, delivery costs, etc. The costs provided in cost interface 770 may allow the user to use the media content management application to optimize the cost of the version of media content. For example, the media content management application provides the user with the opportunity to optimize the cost of the version of media content without having knowledge of the different costs associated with creating and delivering the version of media content (e.g., the user does not need to know of the cost of providing the version of media content into MPEG-2 or MPEG-4, the user does not need to know of the Screen Actors Guild agreement parameters or overriding compensation agreements with specific talent personnel, the user does not need to know of the production implications for generating the version of media content, etc.).

In some embodiments, the media content management application may allow the user to further customize the version of the media content for the particular program using one or more semantic criteria (e.g., in the form of questions or options). Using the responses to the semantic criteria, the media content management application provides the user with additional semantic editorial control. For example, the media content management application may provide the user with one or more abstract questions for information relating to gender, affluence, ethnicity, geography, advertisement style, type of offer, etc. Based on the responses to each of the questions, the media content management application may transmit the semantic criteria to an editing/assembly software package, an editing/assembly system, or a user of an editing/assembly software package or editing/assembly system to further tailor and/or construct the one or more versions of the media content for the user. By selecting one of the preview buttons 760 of FIG. 7, the media content management application may provide the user with illustrative approval screens 800 of FIG. 8, 900 of FIGS. 9, and 1000 of FIG. 10 in accordance with some embodiments of the present invention.

Figure 8:
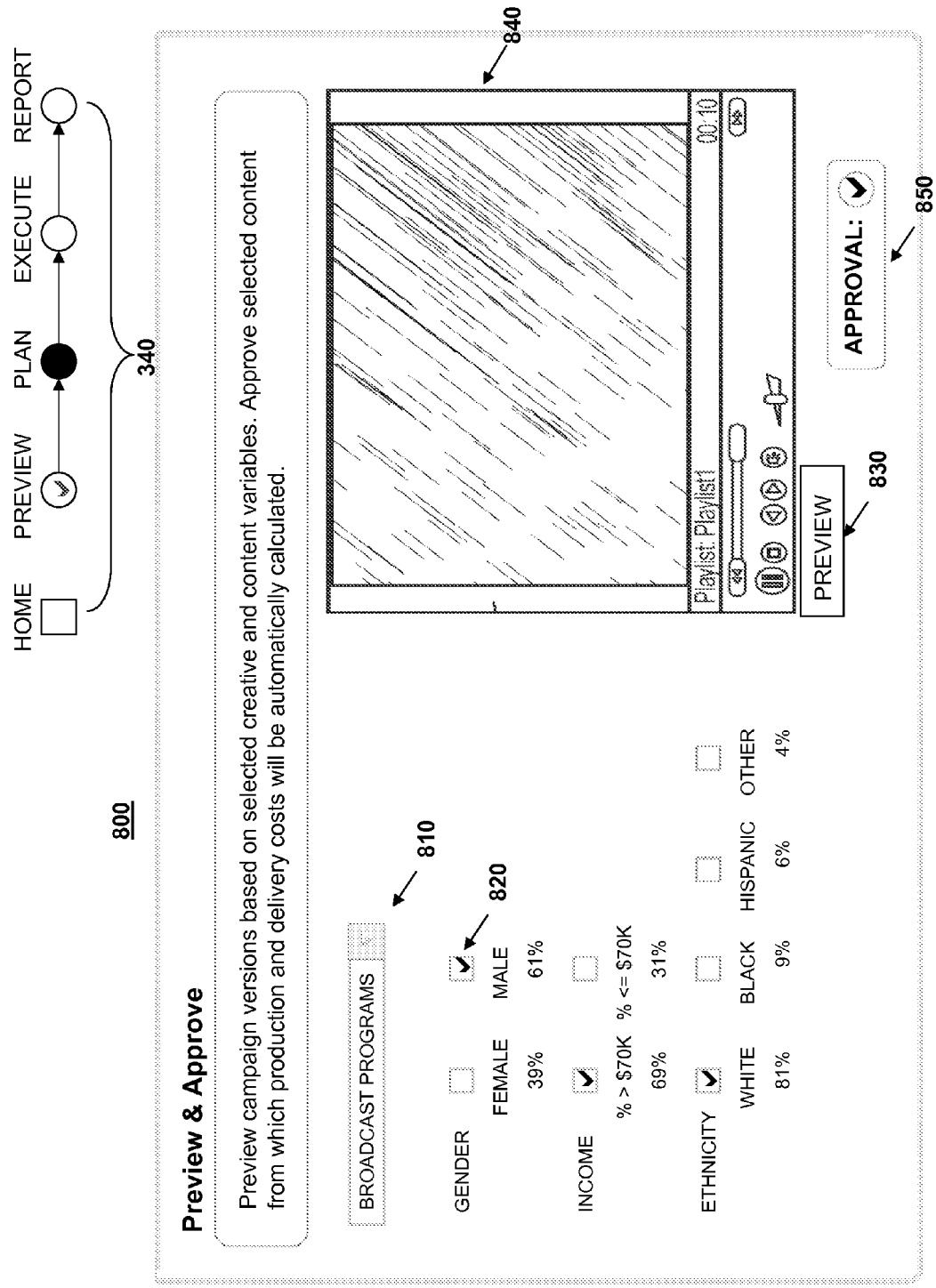
FIGS. 8-10 are illustrative approval screens having options for further customizing one or more versions of media content that may be provided in accordance with some embodiments of the present invention.
Figure 9:
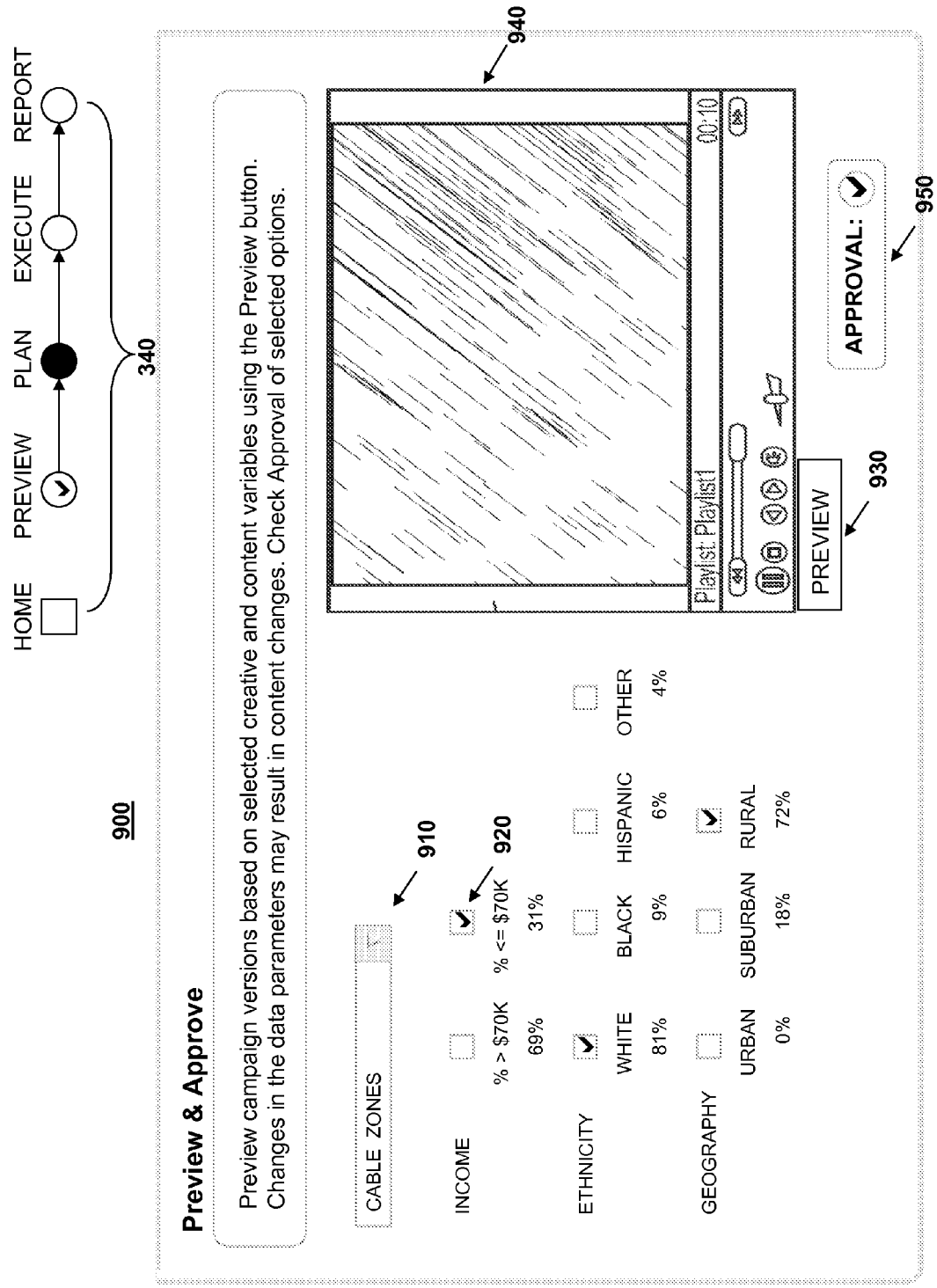
Figure 10:
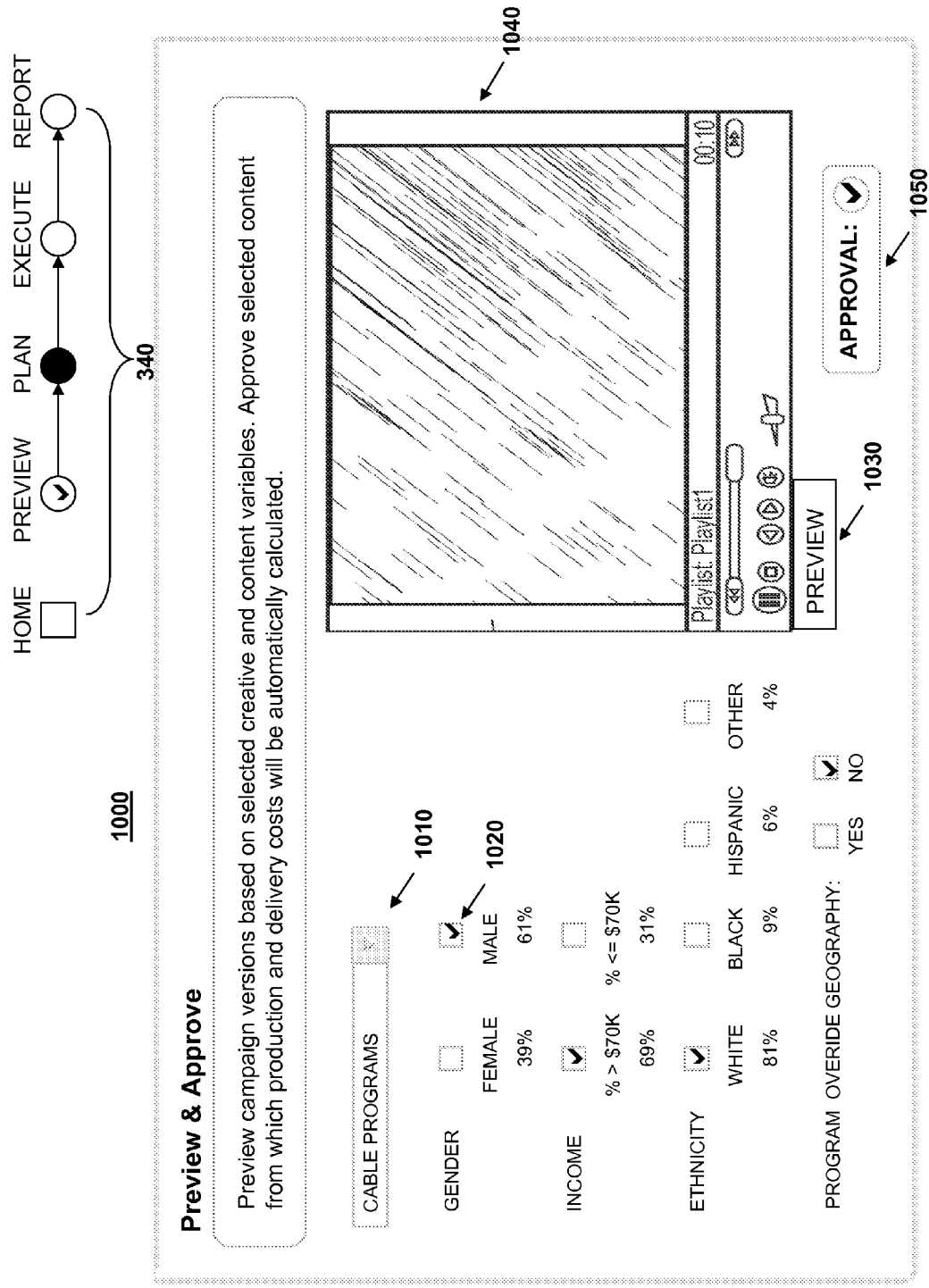

As shown in screens 800, 900, and 1000, the media content management application may provide the user with additional semantic criteria (e.g., the options and information on statistics, demographic information, etc. shown in FIGS. 8-10) for tailoring the version of media content. For example, in approval screen 800 of FIG. 8, the user is provided with category 810 of "Broadcast Programs" and semantic criteria 820 relating to gender, income, and ethnicity. As shown, the media content management application may provide the user with additional semantic criteria. For example, the media content management application may inform the user that Caucasian males with an income of less than $70,000 is the intended audience of the media content. The media content management application may obtain demographic information to determine how the user should further customize the version of the media content. In another example, the media content management application may default to selections based on the demographic information. When the media content management application determines that the region the user is providing the media content to is primarily Caucasian males (e.g., 61% males and 81% Caucasian as shown in FIG. 8), the media content management application may automatically default to those options.

Using screens 800, 900, 1000, or any other suitable interface, the media content management application allows the user to manage the editing of media content and make decision relating to the media content (or version of the media content) based on semantic criteria. Semantic criteria may include, for example, options relating to the style of the advertisement, options relating to the event, options relating to the type of vehicle, options relating to the model of the vehicle, options relating to the offer, options relating to the gender of the target audience (e.g., male or female), options relating to the affluence of the target audience (e.g., income greater than $70,000), options relating to the ethnicity of the target audience (e.g., Caucasian, African-American, Hispanic, Asian, etc.), options relating to the geography of the target audience (e.g., Northeast, South, Europe, Asia, etc.), etc. Any other suitable criteria may also be provided. For example, criteria relating to the target audience's likes and dislikes (e.g., the audience likes sports-related commercials, the audience likes advertisements with dogs in it, etc.) may be provided.

Again, professional editing/assembly software (e.g., editing software developed by Avid Technology, Inc., Final Cut Pro developed by Apple Computer Inc., intelliSpot or other assembly software developed by Visible World, etc.) requires that users be familiar with the editing toolsets of the software package as well as the details of the media content, such as the editing points, the sequence of the media segments, how audio segments are married to video segments, how a background audio track is married to video segments, which media segments may be customized and/or replaced, and any other suitable detail relating to the media content. In addition, the professional editing/assembly software requires that the user know the database structure called by the editing/assembly software or how and which metadata has been married to the audio segments, video segments, or any other suitable media segments. It should be noted that the media content management application avoids this difficulty because the user is provided with an abstraction in the form of semantic controls or semantic criteria. In response to the semantic criteria, the semantic criteria are translated into functions that may be performed by one of these professional editing/assembly software packages. In response to providing semantic criteria, the media content management application may use one or more of these professional editing/assembly software packages or transmit the information to another user that has knowledge of these editing/assembly software packages to create and/or tailor one or more versions of the media content that correspond to the metadata characteristics. Thus, the users of the media content management application are not required to have knowledge of the professional editing/assembly software packages or have knowledge of how the media content (e.g., advertisement) is put together. In addition, the user of the media content management application is not required to have knowledge of the structure of the database accessed by the professional editing/assembly software packages or how and which metadata is associated with media segments stored in the database.

In some embodiments, the media content management application may use such semantic criteria to determine that the user has appropriately targeted the media content. For example, the media content management application may determine that the media content is best suited for Caucasian males with an income level of less than $70,000. In response, the media content management application may place this information along with the other semantic criteria that the user has selected for customizing the version of media content.

In some embodiments, the media content management application may use such information to automatically correct the options selected by the user. For example, based on demographic information or any other suitable targeting or marketing information, the media content management application may adjust the options selected by the user to improve the targeting to the intended audience.

Referring back to FIG. 8, in response to the user responding to one or more of the additional semantic criteria, the media content management application uses the additional semantic criteria 820 to tailor and customize the version of the media content that the user may preview. Using a button or an interface, such as preview button 830, the user may preview the customized version of the media content in preview window 840. To approve the customized version of the media content, the media content management application provides the user with an approval button 850.

It should be noted that the additional semantic criteria 820, 920, and 1020 in FIGS. 8-10 may be any suitable criteria. In some embodiments, semantic criteria 820 for broadcast programs may be different than semantic criteria 920 for cable zones. Any suitable semantic criteria for customizing the versions of media content may be provided by the media content management application.

In response to approving one or more versions of the media content, the media content management application may provide the user with the ordering screens shown in FIGS. 11-14.

Figure 11:
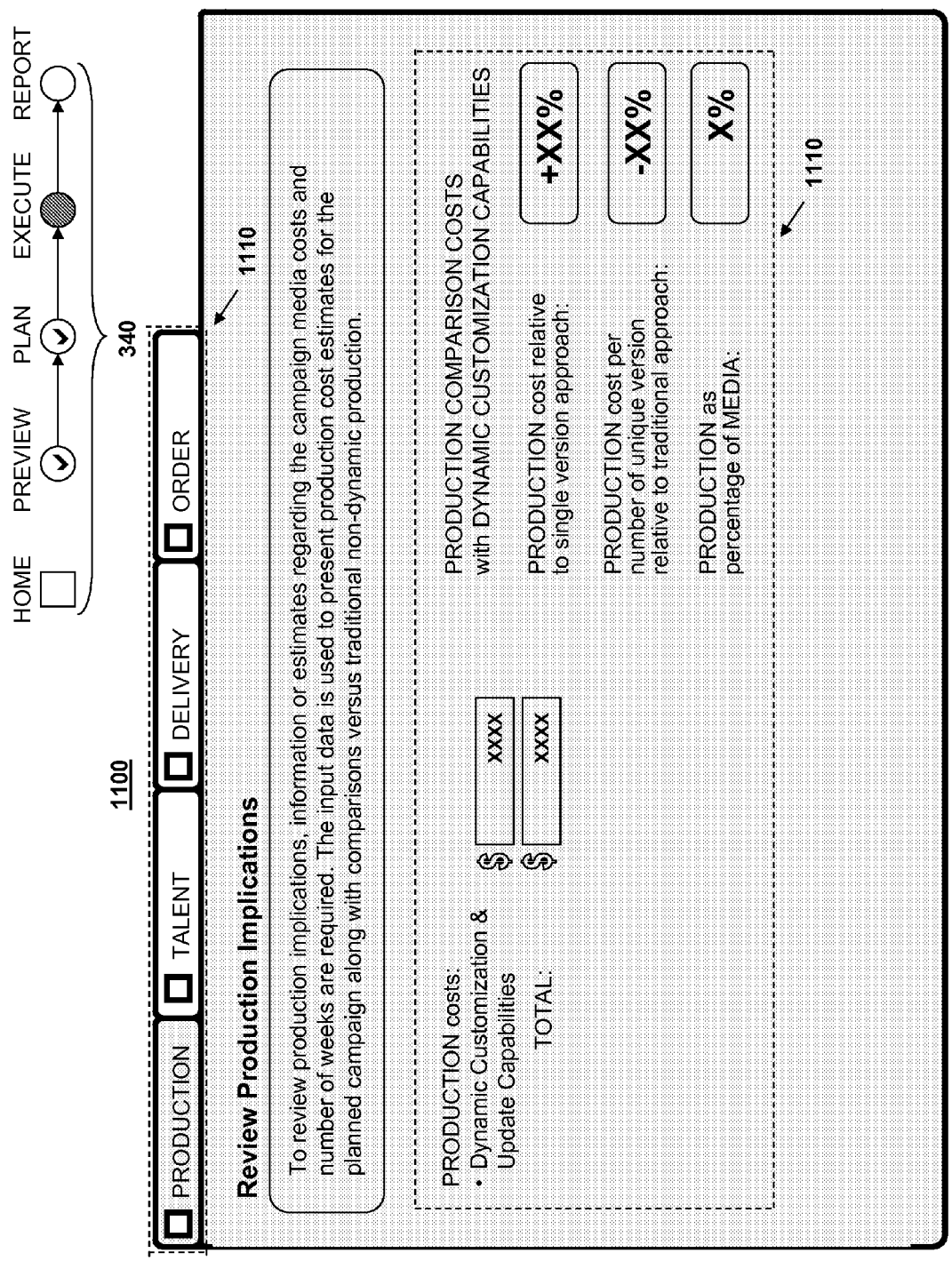
FIGS. 11-14 are illustrative screens for ordering the assembly, production, and delivery of media content that may be provided in accordance with some embodiments of the present invention.

Referring to FIG. 11, the media content management application may dynamically calculate the production costs for creating the one or more versions of the media content. The production costs may be based on, for example, the media segments used in the version of the media content, the time required to assemble and produce the media content, etc. As shown in FIG. 11, the media content management application may provide the user with an estimate for producing these customized versions of media content and compare that estimate with the estimated cost for creating customized versions of media content without using the media content management application (e.g., hiring an advertising agency to produce multiple versions of the media content). These estimated production costs are displayed in interface 1120.

In some embodiments, the media content management application may provide the user with the opportunity to optimize the version of media content by cost. Using the ordering screens shown in FIGS. 11-14, the media content management application may attach other metadata with the version of the media content. For example, the ordering screens may provide the user with multiple versions of the media content and provide the user with the metadata associated with each of the versions. One version of the media content may inform the user that a particular actor performs a scene in the media content. That version has associated costs for hiring that actor (e.g., Screen Actors Guild agreement parameters or overriding compensation agreements with specific talent personnel) and other costs related to the particular actor. It should be noted that the media content management application provides the user with these cost estimates without the requiring the user to be familiar with these agreements or associated costs. In addition, the media content management application may allow the user to select a version of the media content based on its associated cost. In response, the media content management application may transmit the cost information, semantic criteria, and/or associated metadata to the editing/assembly software package to assemble the version of the media content.

In some embodiments, the media content management application may itemize the product costs such that the user may be provided with estimates for producing each of the versions of media content. The media content management application may allow the user to select one or more of the itemized costs. These selected costs may be transmitted to an editing/assembly software package, where the selected costs are translated and used to assemble the version of media content. For example, in response to the user approving the cost estimate for an on-camera performer, the editing/assembly software package may interpret the approved cost estimate, retrieve media segments having the on-camera performer (e.g., a video clip that includes the on-camera performer), and assembles the version of the media content.

Figure 12:
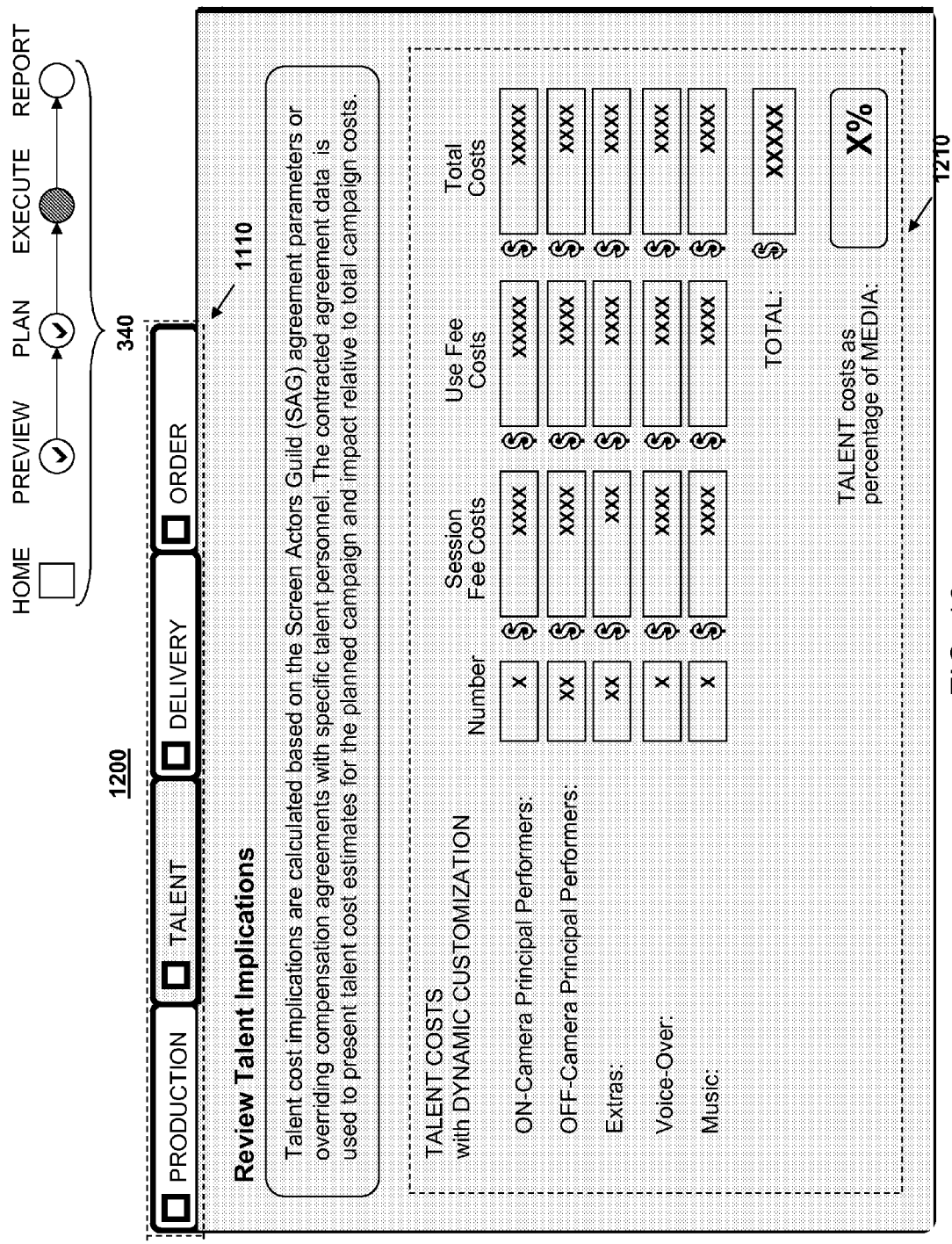

As shown in FIG. 12, the media content management application may generate an estimate of talent costs associated with generating the one or more versions of media content. Talent costs may include costs associated with hiring on-camera performers, off-camera performers, extras, performers for voiceovers, musicians, etc. These talent costs may be based on, for example, Screen Actors Guild agreement parameters or agreements with specific talent personnel. These talent costs are displayed in interface 1210.

In some embodiments, the media content management application may provide the user with the opportunity to select and/or optimize delivery options for transmitting the version of media content. That is, without the need for appreciating costs associated with delivering the version of media content, the media content management application allows the user to select a medium for the version of media content, one or more delivery point for the version of media content, etc.

Figure 13:
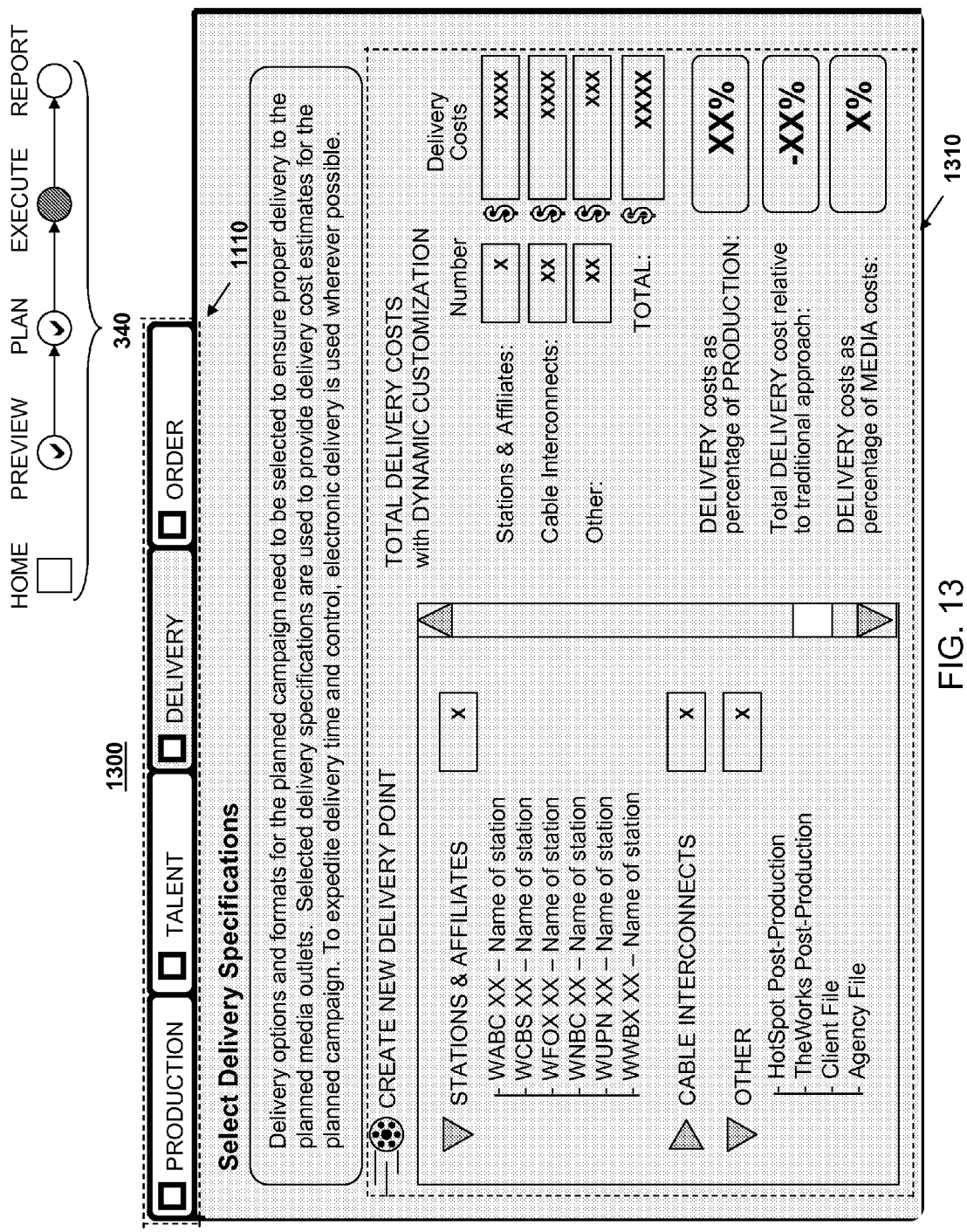
Figure 14:
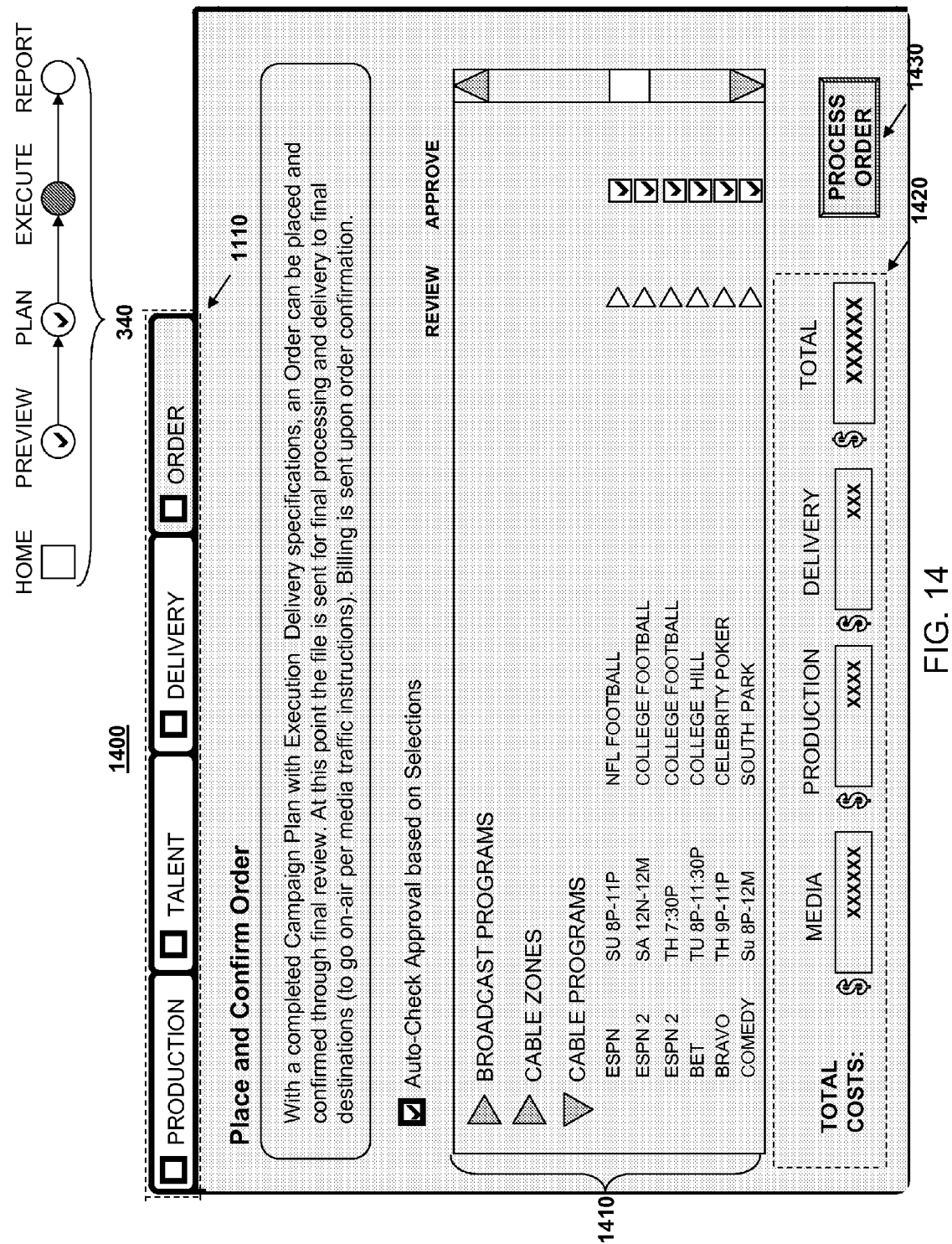

As shown in FIG. 13, the media content management application may allow the user to select delivery options. The media content management application may allow the user to select from one or more delivery points. These delivery points may include, for example, specific markets (e.g., Northeast, Atlanta, Chicago, etc.), stations and affiliates (e.g., KCNC (CBS) Denver, WABC (ABC) New York, etc.), companies, cable interconnects, types of individuals (e.g., via an e-mail list), or actual individuals for distribution of the media content.

In some embodiments, the media content management application may recommend which delivery points should receive the version of the media content. For example, the media content management application may provide a listing of delivery points that have demographic information corresponding to the targeting information selected for the media content. In another example, the media content management application may use the previously inputted semantic criteria to generate an optimized list of delivery points.

In some embodiments, the media content management application may use the previously inputted semantic criteria to generate a list of delivery points (where metadata is associated with each delivery point), where the metadata from the listed delivery points matches the metadata characteristics associated with the previously inputted semantic criteria. For example, the media content management application may extract metadata characteristics from the previously inputted semantic criteria. The metadata characteristics may be used by the media content management application to filter a list of available delivery points (e.g., WABC New York or all delivery points in New York have the metadata characteristics of greater than 50% Male and a majority of households have an income of greater than $100,000).

In addition to selecting delivery points, the media content management application may allow the user to select the format that the media content is to be delivered to the delivery point. These formats may include, for example, MPEG-2, MPEG-4, videotape (VHS), DVD, standard definition media (DV, DVCPRO, DVCAM, Uncompressed SD, etc.), high definition media (e.g., HDV, XDCAM HD, DVCPRO HD, Uncompressed HD, etc.), other media formats, other media resolutions, etc. For example, the station KCNC (CBS) Denver may receive the media content in the form of a videotape, while the station WABC (ABC) New York may download the media content from a server or database. In another example, the station KCNC (CBS) Denver may receive the version of media content in standard definition, while the station WABC (ABC) New York may receive the version of media content in high definition and standard definition.

In some embodiments, the media content management application may optimize the user's selections. For example, the media content management application may determine the media format preferences, requirements, and other information relating to the station that the user has selected to receive the version of media content. The media content management application may determine that WABC (ABC) New York requires that versions of media content be received in both standard definition and high definition. The media content management application may also determine that WABC (ABC) New York prefers that the versions of media content be provided in MPEG-2 format. The media content management application may also determine that WABC (ABC) New York requires that a videotape of the media content be sent to a particular address. In response to the determinations, the media content management application may pre-select the user's available selections for the particular delivery point (e.g., only standard definition and videotape). Alternatively, the media content management application may prohibit the user from selecting options that are not within the requirements of the delivery point (e.g., the user cannot select standard definition because the particular delivery point only accepts media content in high definition).

Accordingly, the media content management application provides the user with a number of options for delivering the version of media content with the user having to know about the requirements and/or preferences of a particular delivery point.

Once the media content and delivery points have been selected by the user, the media content management application may provide the user with a confirmation screen 1200. Confirmation screen may request that the user review the campaign plan, customized options, delivery specifications, and other information before ordering that the customized versions of media content be assembled, produced, and delivered to the selected delivery points (confirmation area 1410). The user may also be provided with a total estimated cost area 1420 that displays the estimated media, production, delivery, and total costs associated with assembling, producing, and delivering the customized versions of media content. Upon selecting a "Process Order" button, the order is placed.

In some embodiments, the media content management application is an end-to-end platform for creating, managing, distributing, and/or tracking media content. Users of the media content management application may include, for example, advertisers, marketers, users at a corporate headquarters, users at a field office, users at a subsidiary of a parent company, a cable operator, a service provider, a content provider, a multiple cable system operator (MSO), etc. For example, an advertiser may upload advertisement campaigns to the media content management application for use or purchase by users at a service provider or users at a MSO. In another example, an advertiser (e.g., Verizon Wireless) may create multiple versions of a commercial (e.g., commercials having different actors, different offers, different music clips, etc.) and allow local cable operators (e.g., CBS-Denver, CBS-New York) to select one of the versions for transmission to their audience. In yet another example, a user at a cable operator (e.g., CNN) may create multiple versions of a commercial and allow each of its affiliates (e.g., local CNN station) to select one of the versions of the commercial.

As described above, the media content management application of the present invention may allow users to generate and customize media content using semantic criteria. For example, the media content management application may provide the user with a list of semantic criteria (e.g., in the form of questions or options) relating to the media content. Using the user's responses to the semantic criteria, the media content management application provides the user with semantic editorial control. For example, the media content management application may provide the user with one or more abstract questions for information relating to gender, affluence, ethnicity, geography, advertisement style, type of offer, etc. Based on the responses to each of the questions, the media content management application may use an editing/assembly software package to determine which media segments are associated with the responses. Each of the media segments has metadata associated with it. The responses are interpreted by the editing/assembly software package and correlated with metadata. Using metadata, the editing/assembly software package retrieves the corresponding media segments and assembles the media content.

In some embodiments, the media content management application provides the user with a preview of the assembled media content. The preview may be presented to the user prior to transmitting the assembled media content to a content provider or other recipient. The preview may also be present to the user prior to providing the user with an opportunity to order the assembled media content. In some embodiments, the preview is transmitted to the user in a media format suitable for transmission over the Internet (e.g., Advanced Streaming Format (ASF), Windows Media Video, etc.), where the assembled media content is transmitted to a recipient in a different format (e.g., CD, DVD, VHS, Betamax, Blu-ray, HD DVD, etc.).

Using the media content management application, the user may also order (e.g., place in a shopping cart) and receive a finished version of the media content. The finished version may be transmitted to a delivery point in any suitable medium (e.g., videotape, DVD, MPEG-2, MPEG-4, standard definition, high definition, downloaded, etc.). That is, in addition to creating and assembling media content, the media content management application allows the user to manage the distribution of the media content. For example, an advertiser may create multiple versions of a commercial and transmit one or more of the versions to local content providers. In another example, the advertiser may create multiple versions of the commercial and allow each content provider to access the media content management application, where each content provider selects one or more versions of the commercial. The local content provider may then transmit the selected version of the commercial to an audience.

The media content management application may also include a feedback mechanism. The feedback mechanism of the media content management application may receive feedback information from, for example, an audience member, a local content provider, a service operator, an advertiser, a multiple cable system operator (MSO), or any other suitable entity, on the responsiveness or effectiveness of a commercial or media content. In response to receiving the feedback, the media content management application may store the feedback. The media content management application may also provide the user with a recommendation, such as a purchasing recommendation. The recommendation may include, for example, a recommended advertising campaign, recommended media segments (e.g., a recommended actor/actress, a recommended voiceover, a recommended background, a recommended music track, etc.), recommended local service providers for transmitting media content, etc.

The media content management application may also be implemented on, for example, a cable headend. For example, the media content management application may automatically generate media content (e.g., commercials) and transmit the media content to an audience through the headend. Upon monitoring the media content and receiving feedback on the media content, the headend may use the media content management application to automatically assemble updated media content (e.g., another version of the commercial) and transmit the media content to the audience.

Figure 15:
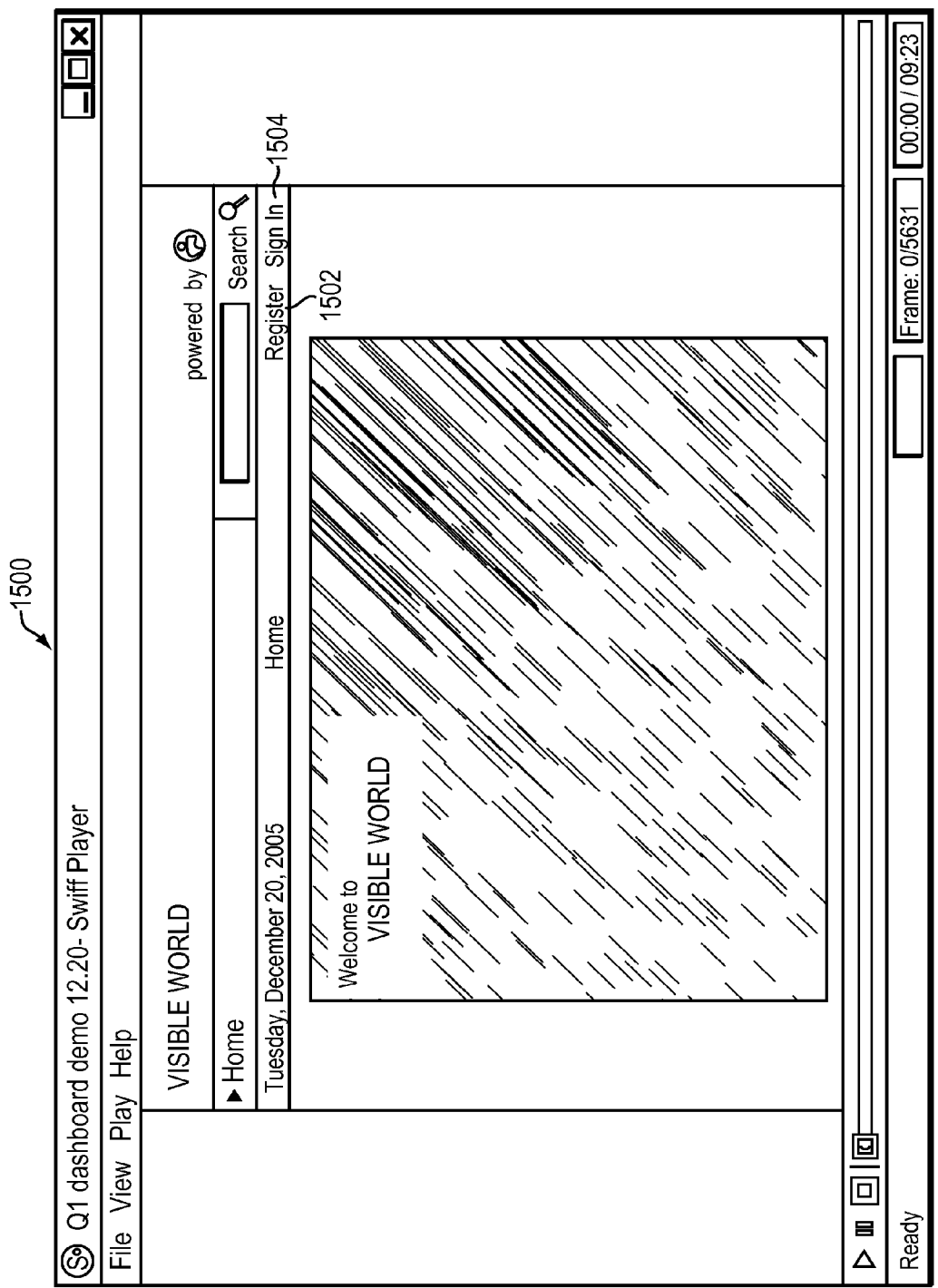
FIG. 15 is an illustrative introductory screen that may be provided in accordance with some embodiments of the present invention.
Figure 16:
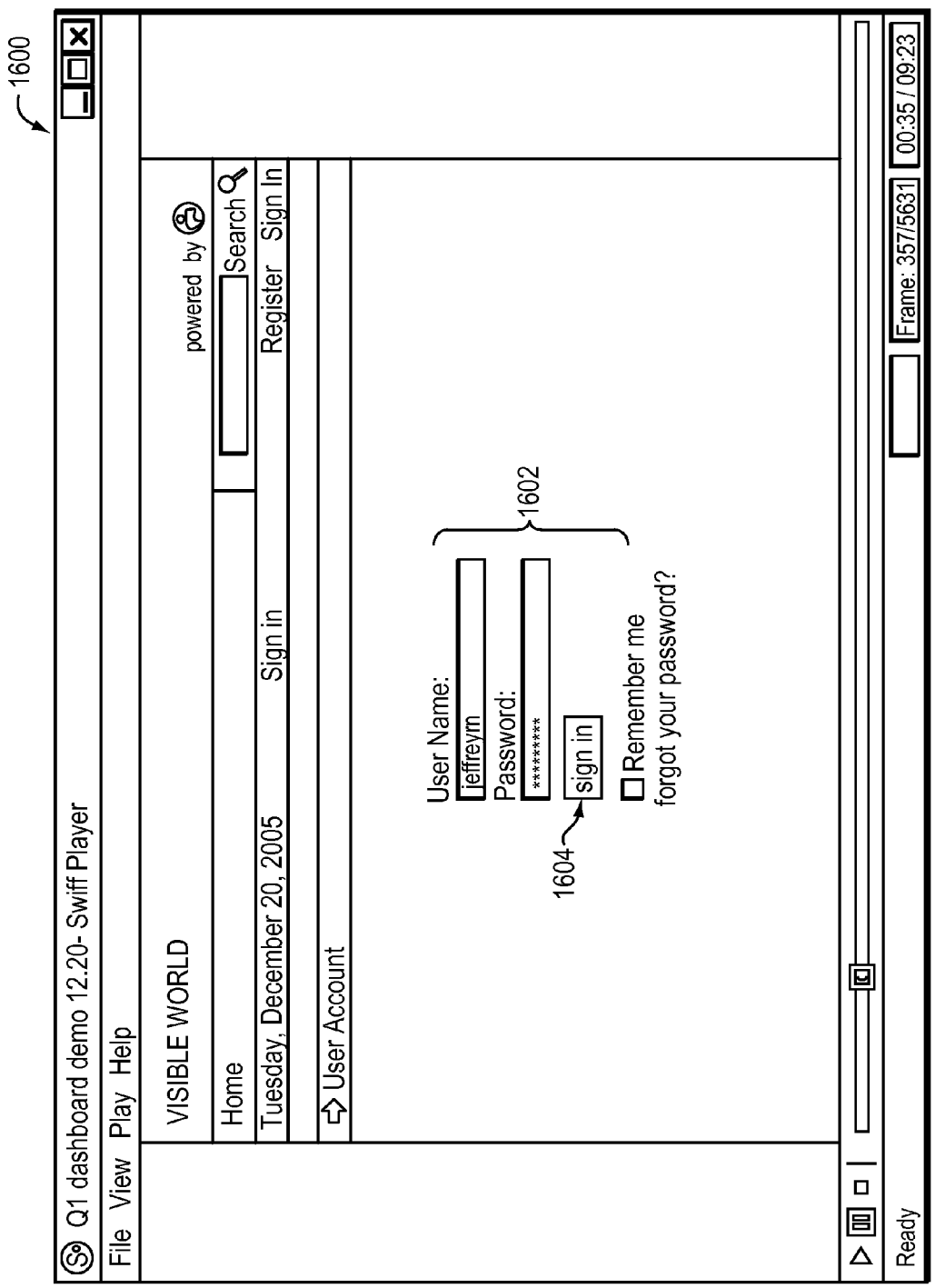
FIG. 16 is an illustrative login screen that may be provided in accordance with some embodiments of the present invention.

As shown in FIG. 15, the media content management application may allow the user to create a user account in response to selecting a register button 1502 or access an existing user account in response to selecting a sign in button 1504. In response to creating a user account or pressing sign in button 1504, the media content management application may prompt the user to login (e.g., with a username and password 1602 of FIG. 16). In response to the user logging in to the media content management application and selecting a sign in button 1604, the user may be permitted to access the media content management application. For example, using user information, such as a user name and/or a password, the media content management application may provide the user with authorization to access the features of the media content management application. In addition, the media content management application may, for example, access the user's profile, pre-populate specific fields for customizing media content (e.g., the user is from New York and always inserts the same disclaimer used for media content distributed to the New York audience), retrieve stored advertisement campaigns, retrieve stored assembled commercials, retrieve historical information associated with the user (e.g., order history, targeting history, etc.), retrieve content/service providers that are associated with the user, etc.

Figure 17:
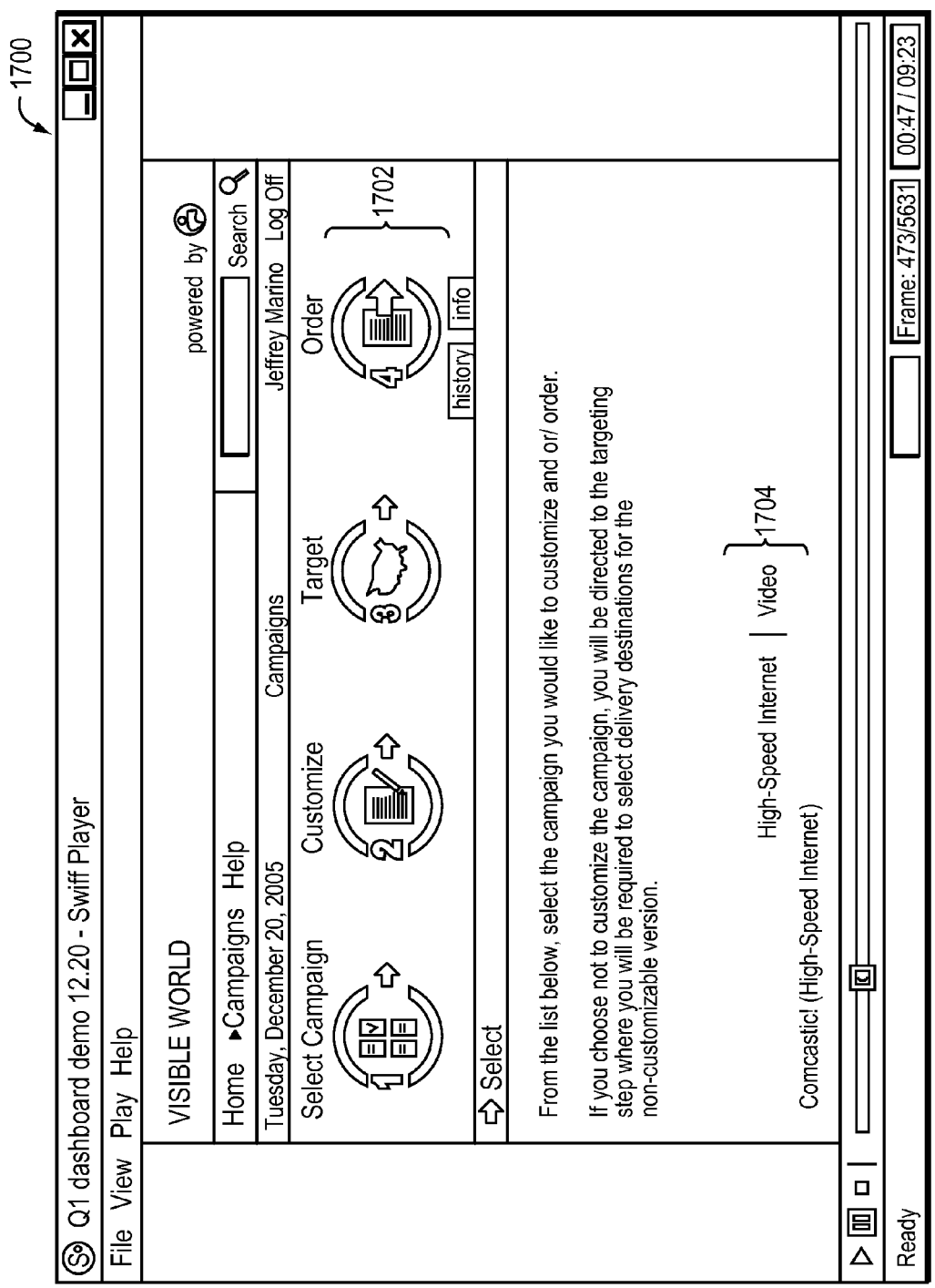
FIG. 17 is an illustrative advertisement campaign selection screen that may be provided in accordance with some embodiments of the present invention.

Referring to FIG. 17, in response to the user accessing the media content management application, the media content management application provides the user with an illustrative campaign screen 1700 that may be provided in accordance with some embodiments of the present invention. As shown in interface 1702, the "select campaign" button is currently highlighted.

In some embodiments, the media content management application may provide the user with a list of campaigns (e.g., an advertising campaign for automobiles, an advertising campaign for a politician, etc.) or a list of generated media content. As shown in campaign screen 1700, the media content management application provides the user with multiple advertisement campaigns related to Comcast. The media content management application may be provided with Comcast advertisement campaigns because, for example, a parent company purchased the general campaign from a marketer and/or advertiser, a parent company purchased the general campaign from Comcast, the user purchased the general campaign from Comcast, or any other suitable approach. Each campaign may further be organized by, for example, product or service offered by a company. For example, Comcast has a number of campaigns related to their High-Speed Internet and Video products 1704.

It should also be noted that the media content management application may provide the user with a list of customizable and non-customizable advertisement campaigns. In response to the user selecting a non-customizable advertisement campaign, the media content management application may assemble the predefined media segments to assemble the advertisement. For example, media segments may have been preselected by the service provider or the parent company. In another example, media segments for the non-customizable advertisement campaign may have been predetermined by the media content management application. In response to the user selecting a customizable advertisement campaign, the media content management application may provide the user with semantic criteria (e.g., a list of questions) for assembling a version of the commercial.

Figure 18:
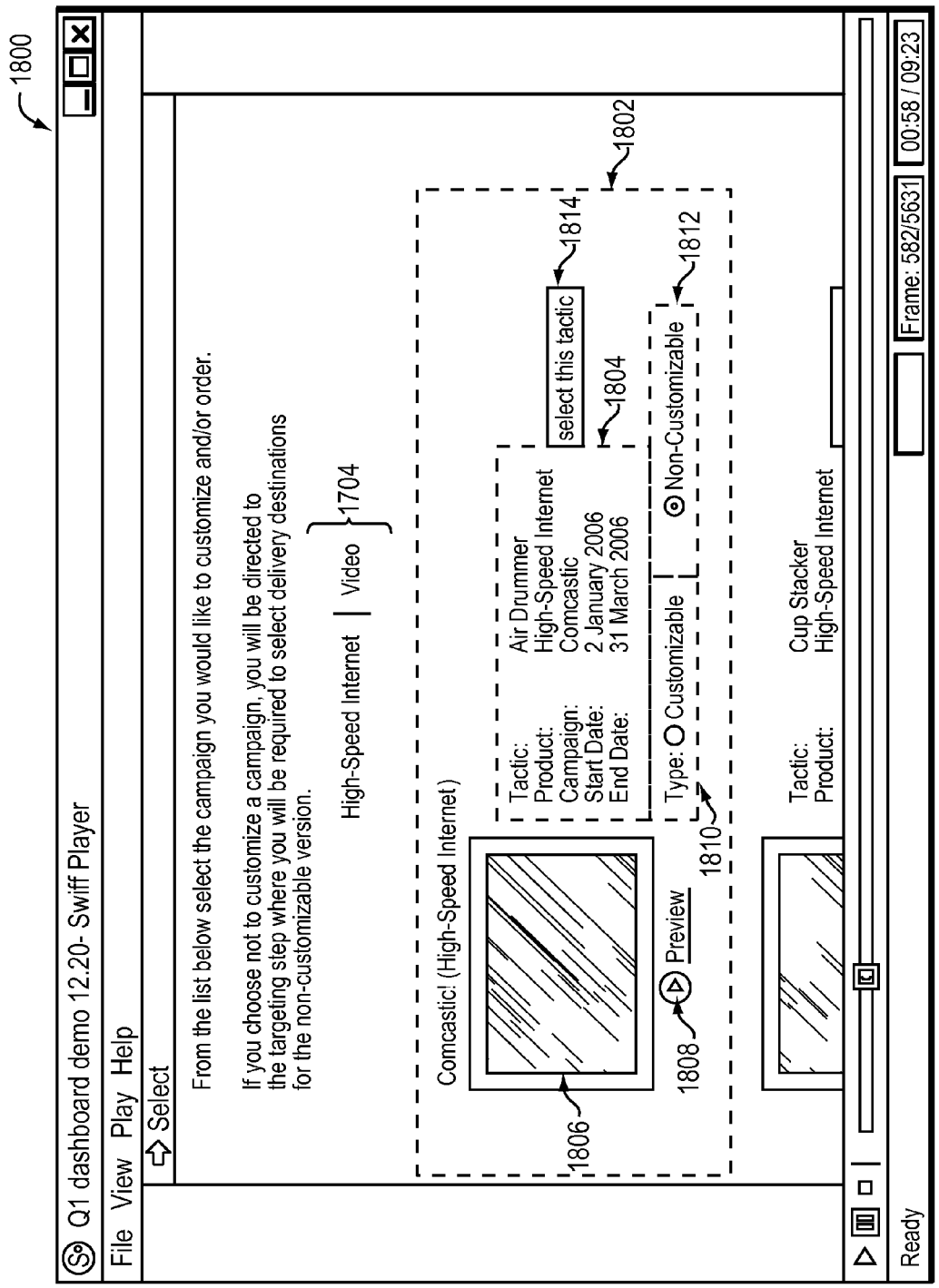

Referring to FIG. 18, the media content management application may provide the user with a number of options relating to each campaign 1802. As shown, each campaign 1802 may include, for example, a description of the campaign 1804, a screenshot of the campaign 1806, a preview button 1808, a customize options 1810 and 1812. Description 1804 informs the user that one of the "Comcastic!" campaigns for Comcast's High Speed Internet product is titled "Air Drummer." Description 1804 may also inform the user of the dates that any commercial generated using the campaign runs (e.g., a start date of Jan. 2, 2006 and an end date of Mar. 31, 2006).

In some embodiments, the media content management application may allow the user to preview the media content (e.g., customized or non-customized) before selecting the advertisement campaign or at any time during of after the creation and assembly of the media content. Referring back to FIG. 18, in response to the user selecting preview button 1808 or any other suitable interface, the media content management application may present a preview window to the user, where the customized or non-customized version of the media content is displayed.

In some embodiments, the media content management application may allow the user to select whether to create a customized advertisement or commercial using the advertisement campaign or to use the non-customizable version. In FIG. 18, the media content management application provides the user with a customizable option 1810 and a non-customizable option 1812. In response to the user selecting the non-customizable option 1812 for the "Air Drummer" tactic of the "Comcastic!" campaign, the media content management application may direct the user to the delivery portion of the management process, where the user may input delivery destinations (e.g., local content providers) for the non-customized version of the "Air Drummer" media content.

Alternatively, the media content management application may allow the advertiser or creator of the advertisement campaign to preset the campaign as either customizable or non-customizable. For example, because Comcast does not want the media content to be altered, Comcast may preset the "Air Drummer" tactic of the "Comcastic!" campaign to be only non-customizable. In another example, the advertiser may provide the user with a customizable and non-customizable version of the "Air Drummer" tactic. As shown in screen 1900 of FIG. 19, the media content management application allows the user to select from a non-customizable "Air Drummer" tactic and a customizable "Cup Stacker" tactic for the "Comcastic!" campaign and the "High-Speed Internet" product.

Figure 19:
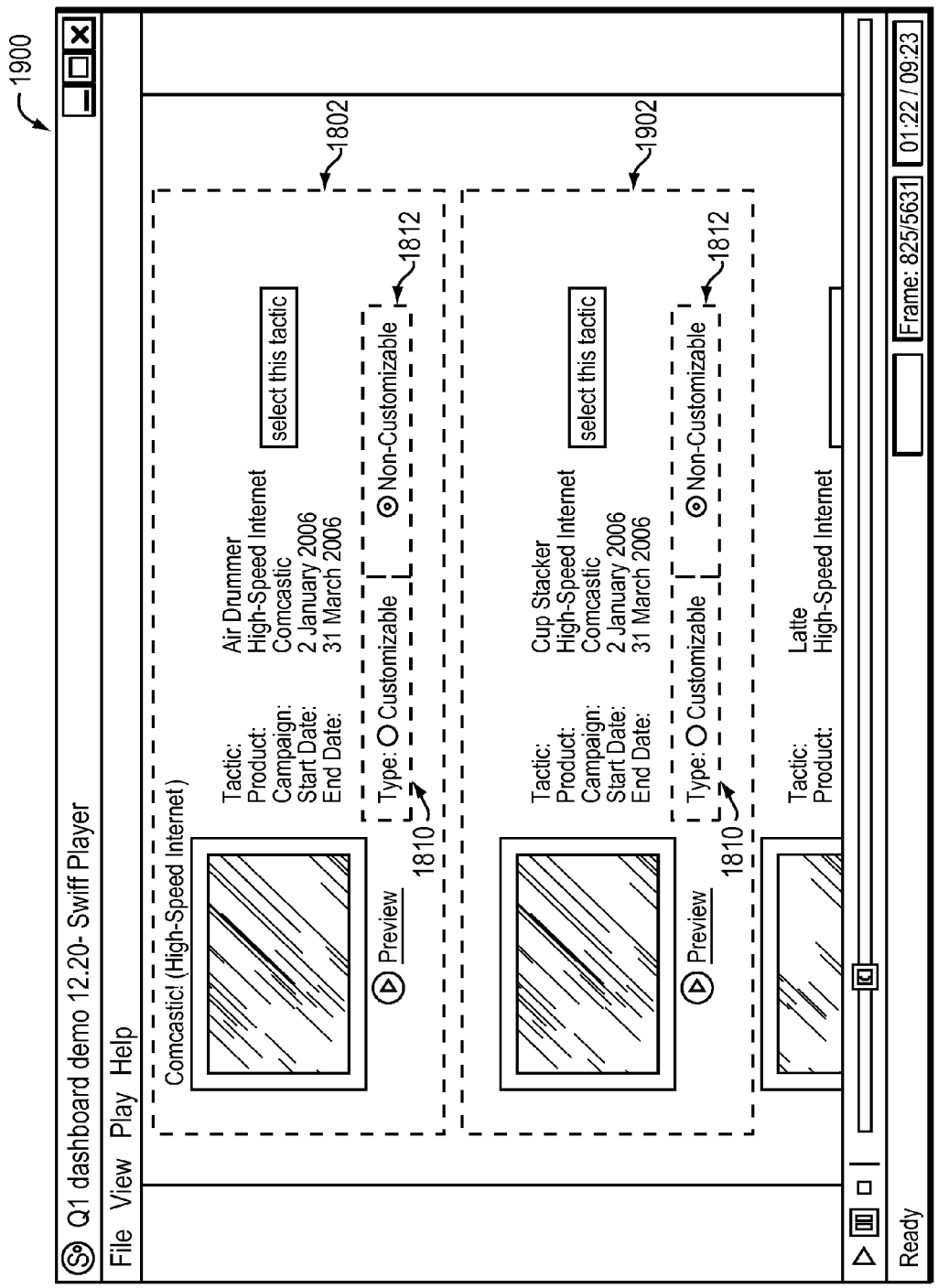
Figure 20:
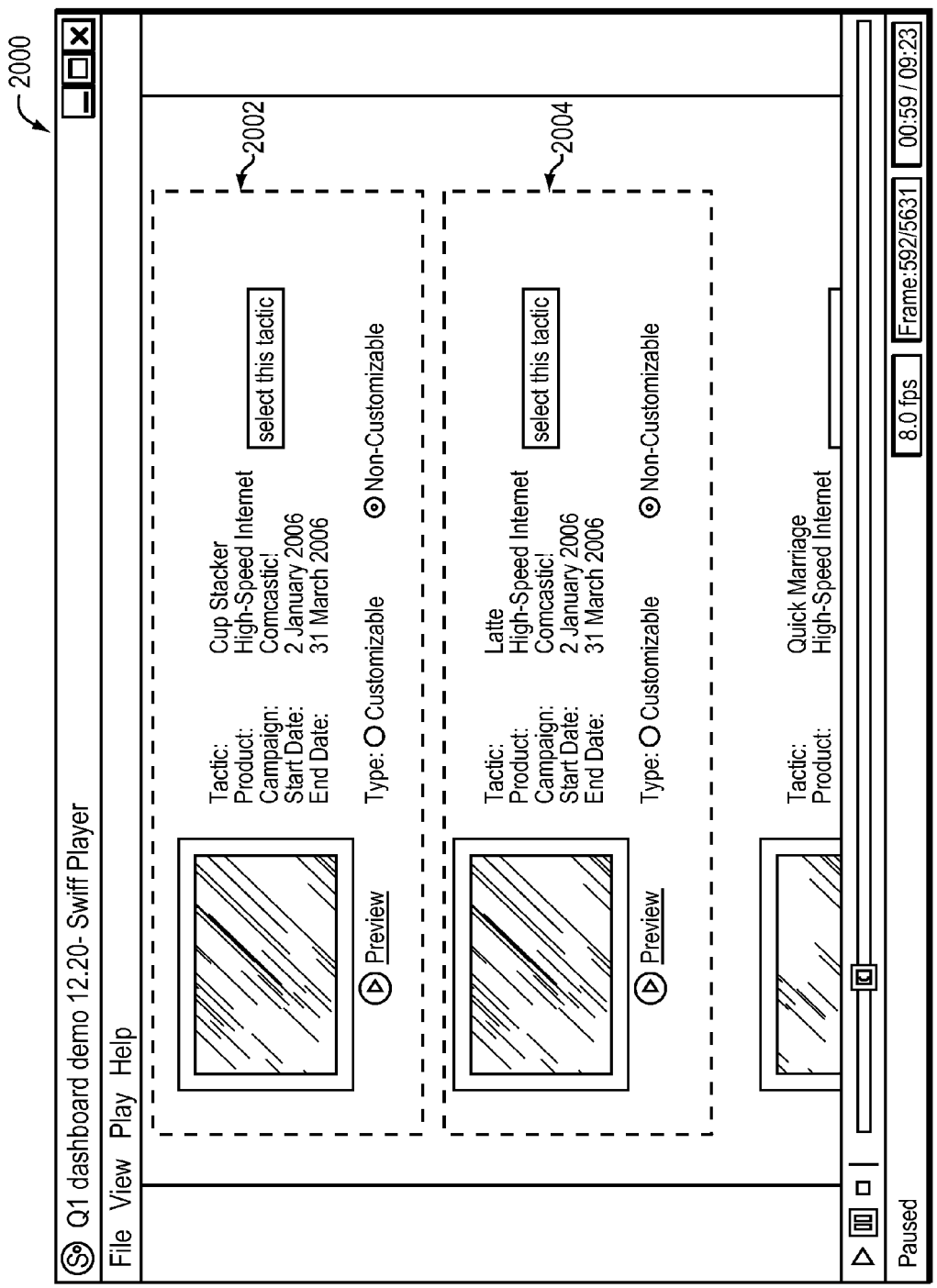
Figure 21:
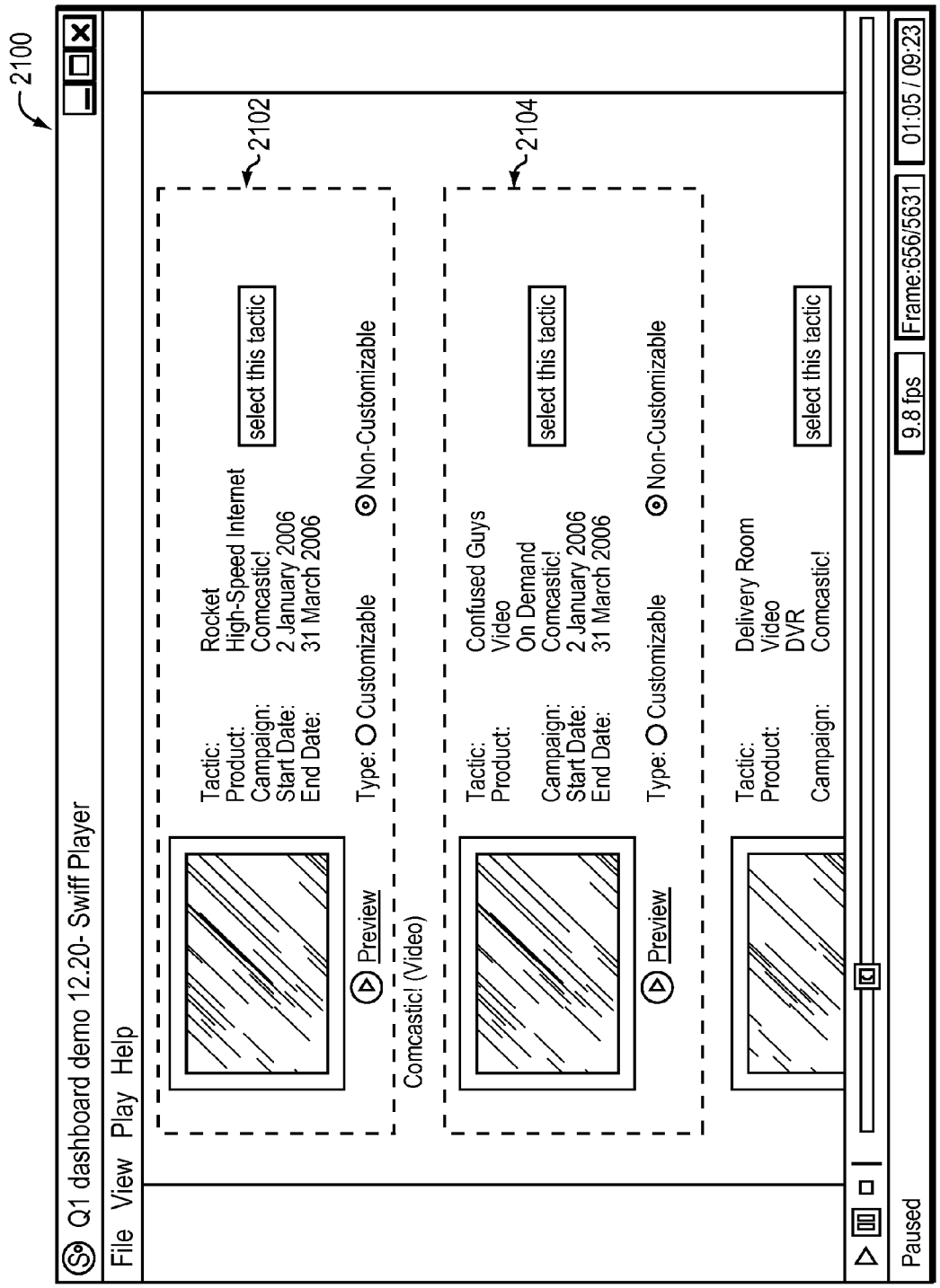
Figure 22:
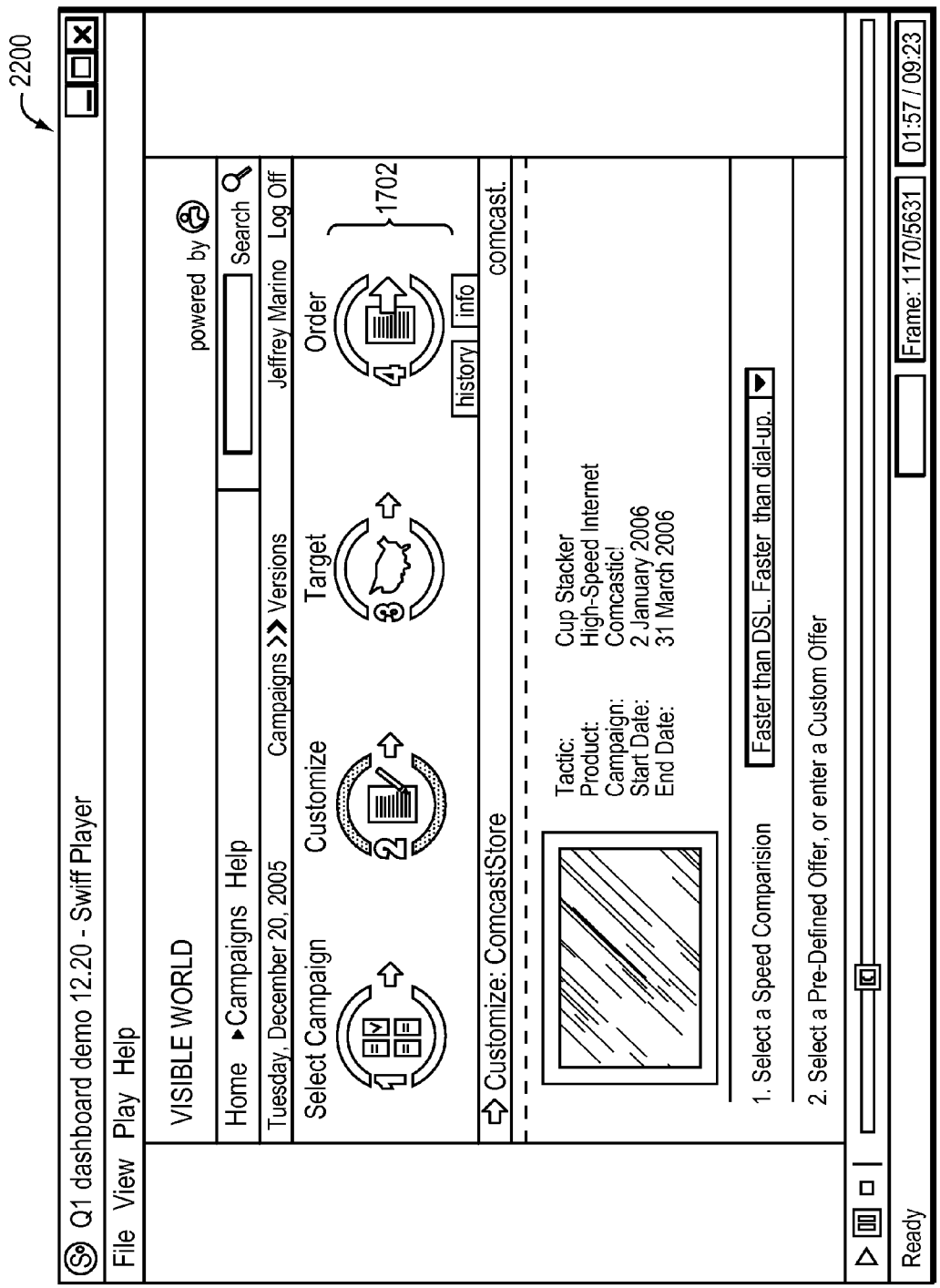
Figure 23:
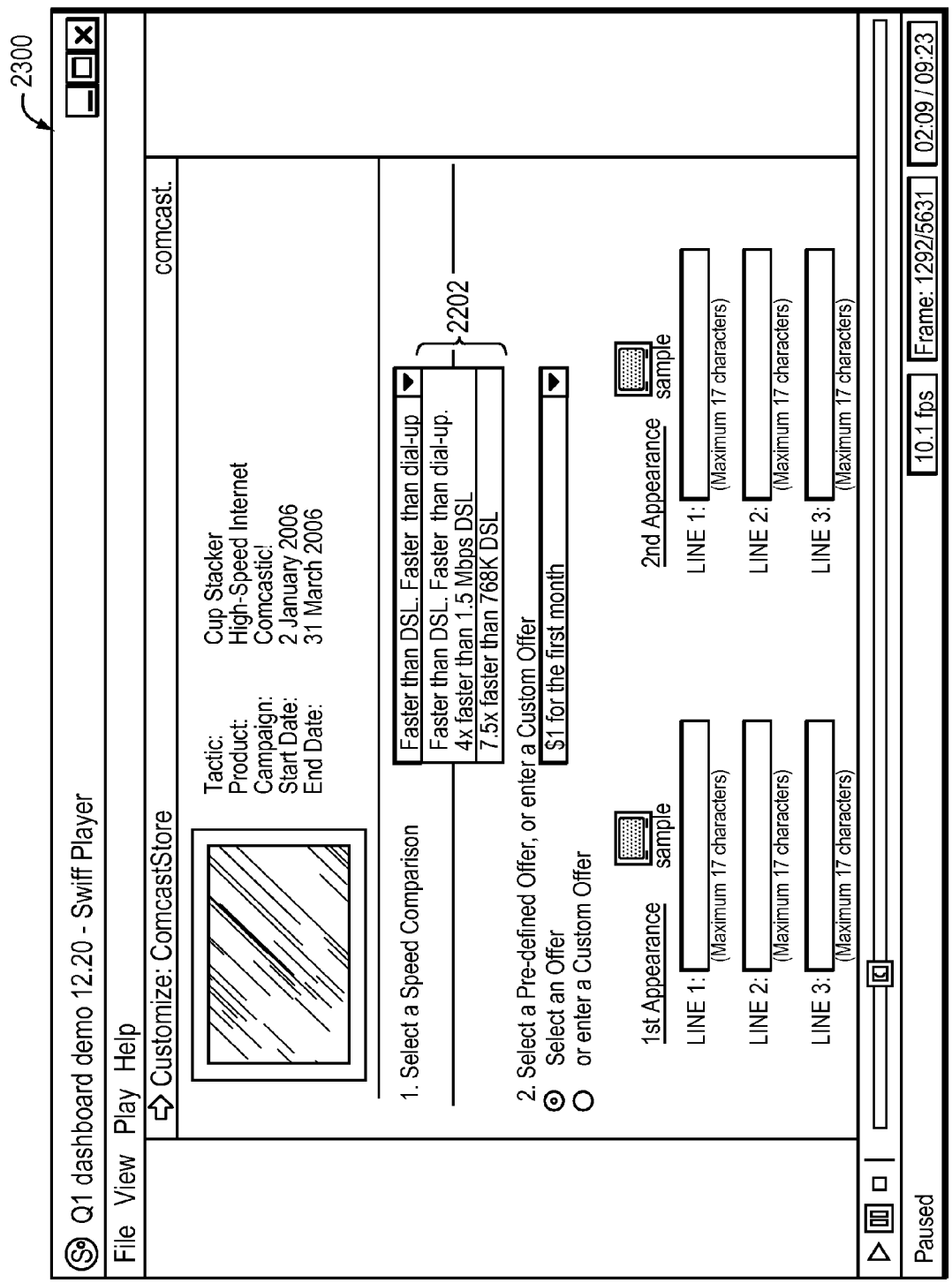
Figure 24:
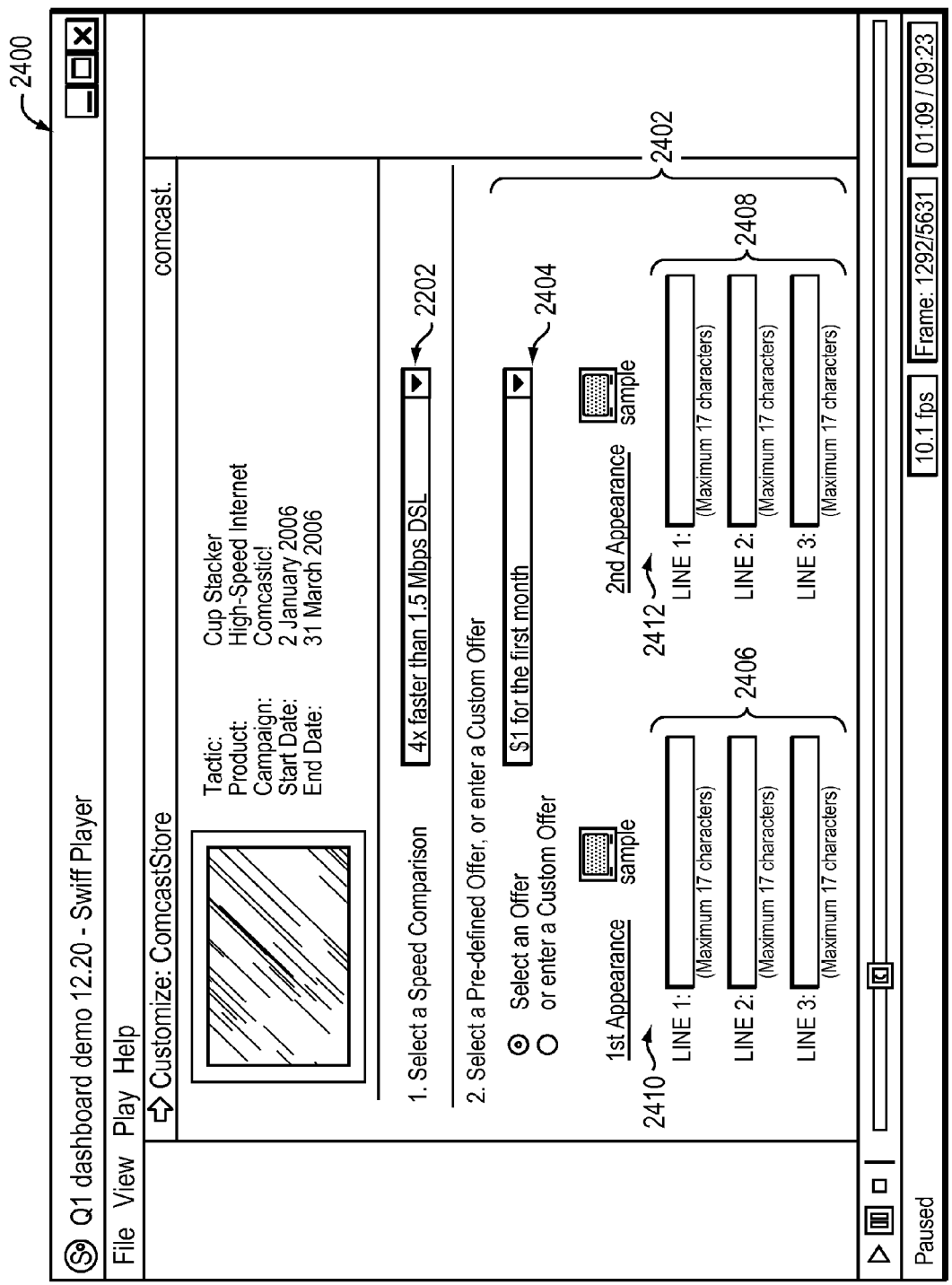
Figure 25:
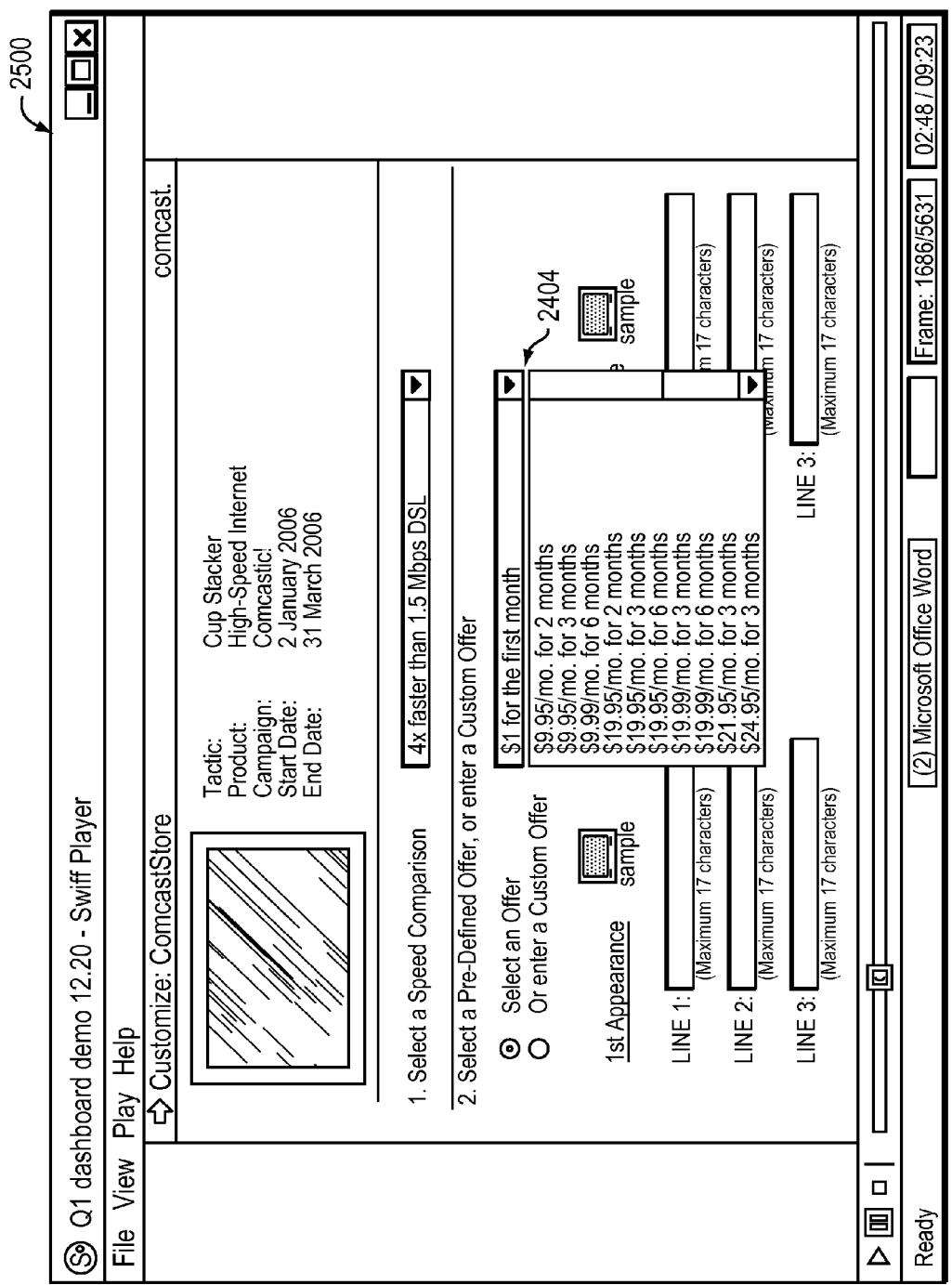
Figure 26:
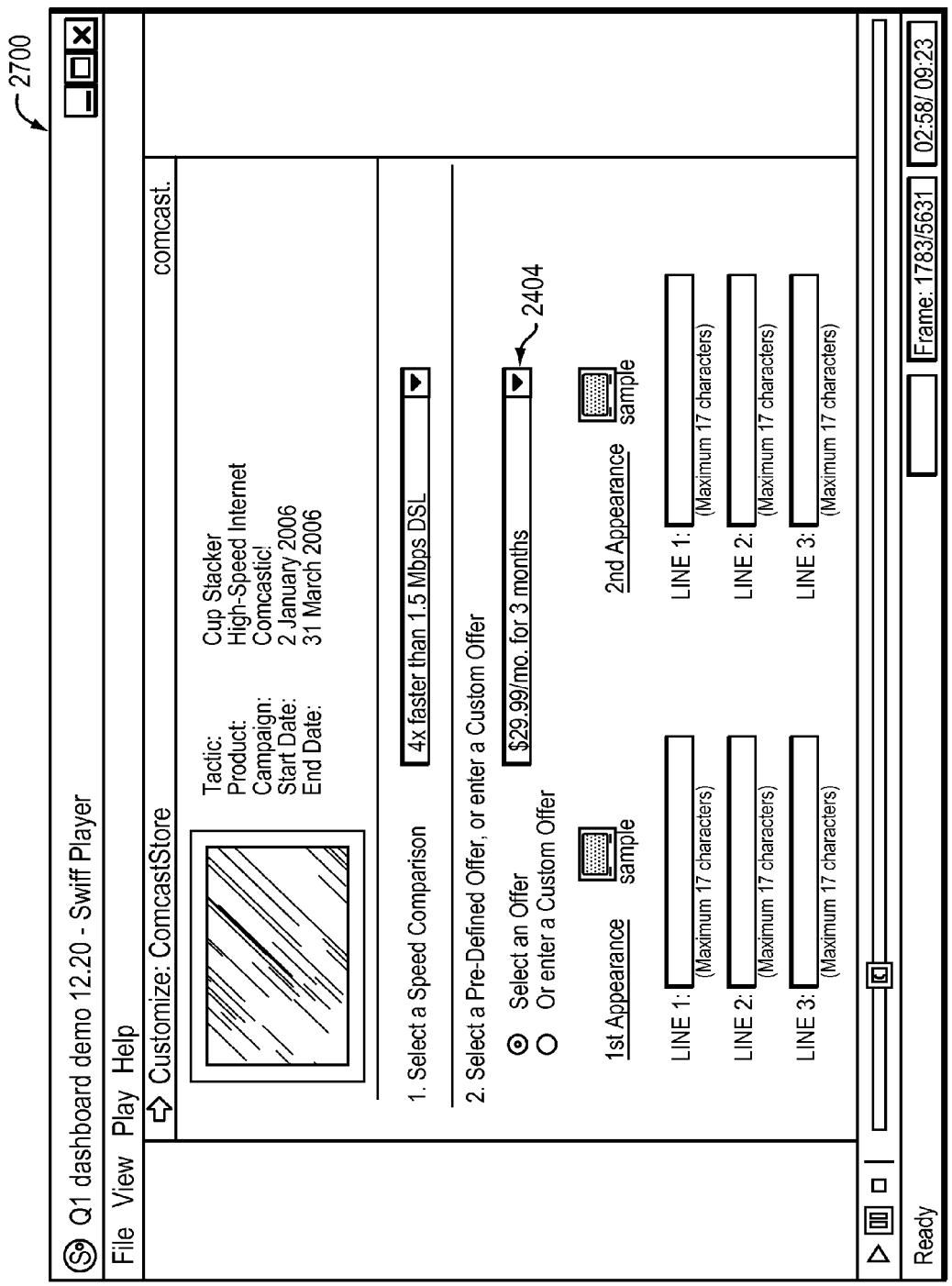

As shown in FIGS. 19-21, the media content management application may present the user with various tactics and/or campaigns. Screen 1900 of FIG. 19 and screen 2000 of FIG. 20 show that the user may select from a non-customizable "Air Drummer" tactic 1802, a customizable "Cup Stacker" tactic 1902, a non-customizable "Cup Stacker" tactic 2002, and a non-customizable "Latte" tactic 2004. Screen 2100 of FIG. 21 shows that the media content management application provides the user with tactics and/or campaigns for different products (e.g., the "High Speed Internet" product and the "Video On Demand" product).

Alternatively, the media content management application may present the user with various campaigns from different advertisers (e.g., Comcast advertisement campaigns, Time Warner advertisement campaigns, Dell computer advertisement campaigns, etc.). For example, the user may have purchased general campaigns relating to cable products from Comcast, Time Warner, and Cablevision. When a user has a thirty second spot available and is interested in inserting an advertisement or commercial relating to cable products, the media content management application may provide the user with all campaigns relating to cable products. The user may use these campaigns to create a customized commercial or select a non-customized commercial for that available timeslot.

As described above, the media content management application may allow the user to generate and customize media content using semantic criteria. In response to the user selecting, for example, the customizable "Cup Stacker" tactic for the "Comcastic!" campaign 1902 (FIG. 19), the media content management application may provide the user with a list of semantic criteria (e.g., in the form of questions or options) relating to the media content. As shown in interface 1702, the "customize" button is currently highlighted.

As shown in FIGS. 22-32, the media content management application provides the user with a list of semantic criteria relating to the media content to be created. Using screens 2200-3200 or any other suitable interface, the media content management application allows the user to manage the editing of media content and make decisions relating to the media content (or version of the media content) based on semantic criteria. Semantic criteria may include, for example, options relating to the product (e.g., a speed comparison option 2202 of FIGS. 22 and 23), options relating to the offer (e.g., a pre-defined offer 2404 or a customized offer 2408 of FIG. 24-26), legal disclaimers (e.g., disclaimer fields 3102 of FIG. 31), options relating to the style of the advertisement, options relating to the type of product or service, options relating to the gender of the target audience (e.g., male or female), options relating to the affluence of the target audience (e.g., an income greater than $70,000), options relating to the ethnicity of the target audience (e.g., Caucasian, African-American, etc.), options relating to the geography of the target audience (e.g., Northeast USA, New York City, Europe, Japan, etc.), etc. Any other suitable criteria may also be provided. For example, criteria relating to the target audience's likes and dislikes (e.g., the audience likes sports-related commercials, the audience likes advertisements with dogs in it, etc.) may be provided.

Using the user's responses to the semantic criteria, the media content management application provides the user with semantic editorial control. Based on the responses to each of the questions, the media content management application may use an editing/assembly software package to determine which media segments are associated with the responses. Each of the media segments has metadata associated with it. The responses are interpreted by the editing/assembly software package and correlated with metadata. Using metadata, the editing/assembly software package retrieves the corresponding media segments and assembles the media content.

It should be noted that some user responses to the list of semantic criteria may be presented in the assembled commercial, while some user responses are interpreted and correlated to metadata. For example, the media content management application provides the user with option 2202 in FIGS. 22-24 or any other suitable interface element to select the speed comparison. Using option 2202, the user may indicate the speed comparison for the given product (e.g., Faster than DSL and dial-up," 4× faster than 1.5 Mbps DSL, or 7.5× faster than 768 k DSL, etc.). In another example, the media content management application provides the user with offer options 2404 in FIG. 24. Using options 2404, the user may indicate whether to include a pre-defined offer from list 2404 or a customized offer using fields 2406 and/or 2408. List 2404 may include, for example, pre-defined offers provided by the advertiser or creator of the advertisement campaign (e.g., $1 for the first month, $9.95/month for two months, etc.). Fields 2406 and 2408 may, for example, allow the user to create a customized offer for insertion into the commercial.

Figure 27:
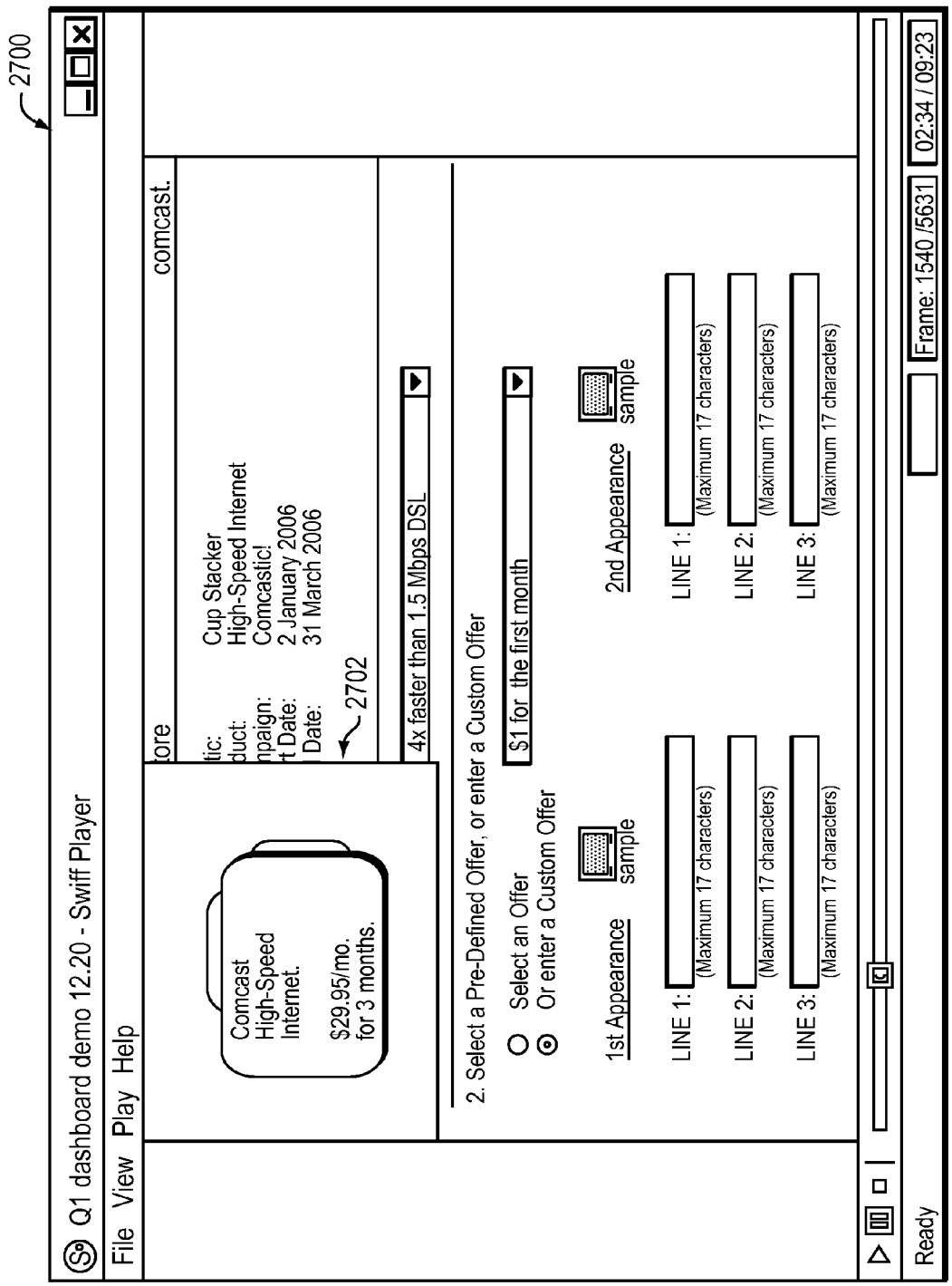
Figure 28:
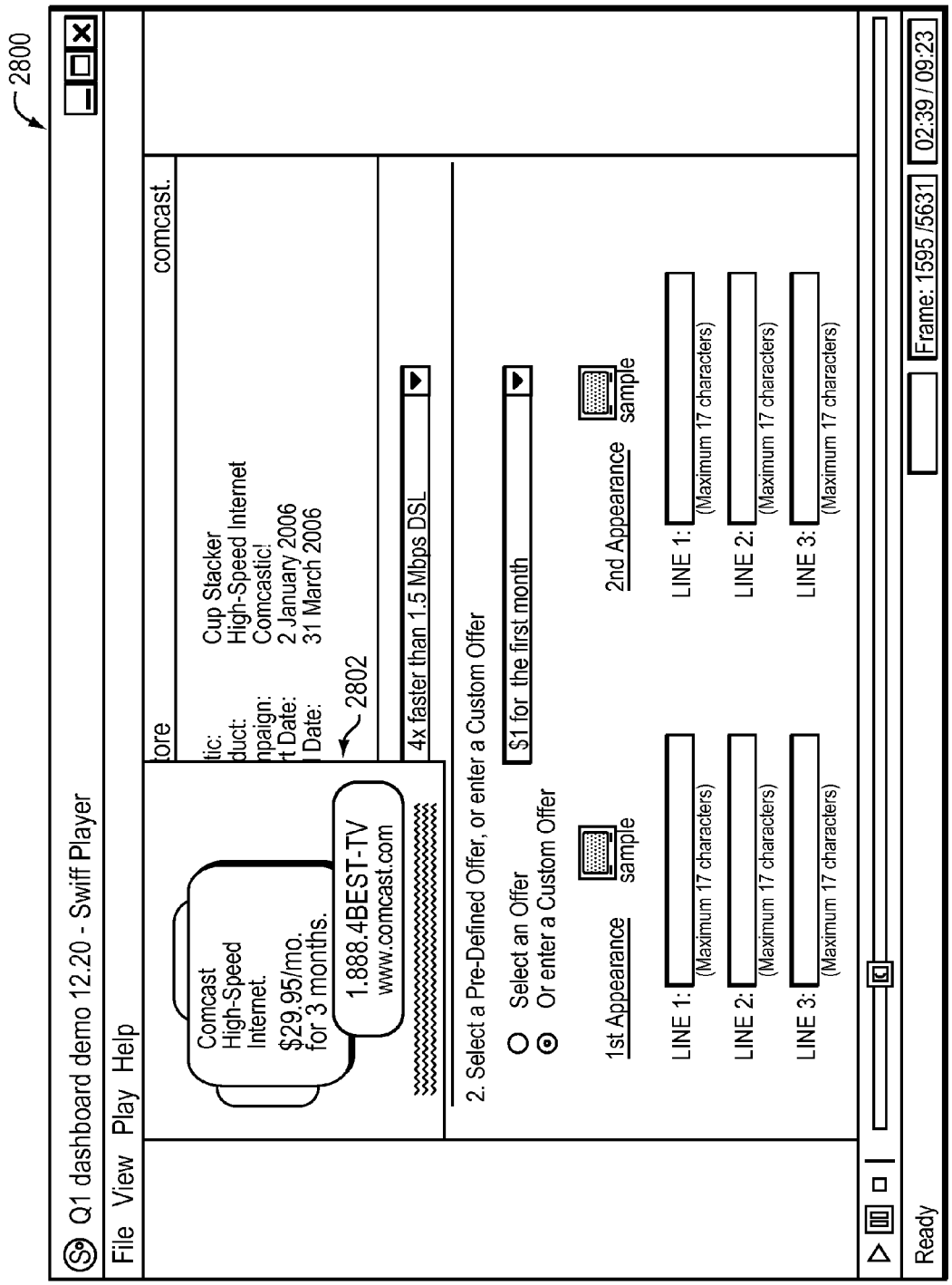

In response to selecting a pre-defined offer or inputting a customized offer, the media content management application may allow the user to preview the offer in the commercial. For example, in response to selecting sample button 2410, the media content management application may interpret the user selections, retrieve the appropriate media segments from a database, and assemble a screenshot of the offer within the commercial. As shown in FIG. 27, in response to selecting sample button 2410, the media content management application assembles the screenshot and provide the user with preview window 2702. In addition, when an offer appears more than once within a commercial or advertisement, the media content management application may allow the user to preview the next appearance of the offer in the commercial. For example, in response to selecting sample button 2412 (FIG. 24), the media content management application may assemble a screenshot of the next offer within the commercial and provide the user with preview window 2802 of FIG. 28. Alternatively, the media content management application may retrieve one or more screenshots associated with the user selections to provide the user with a preview of the offer within the commercial.

Figure 29:
Figure 30:
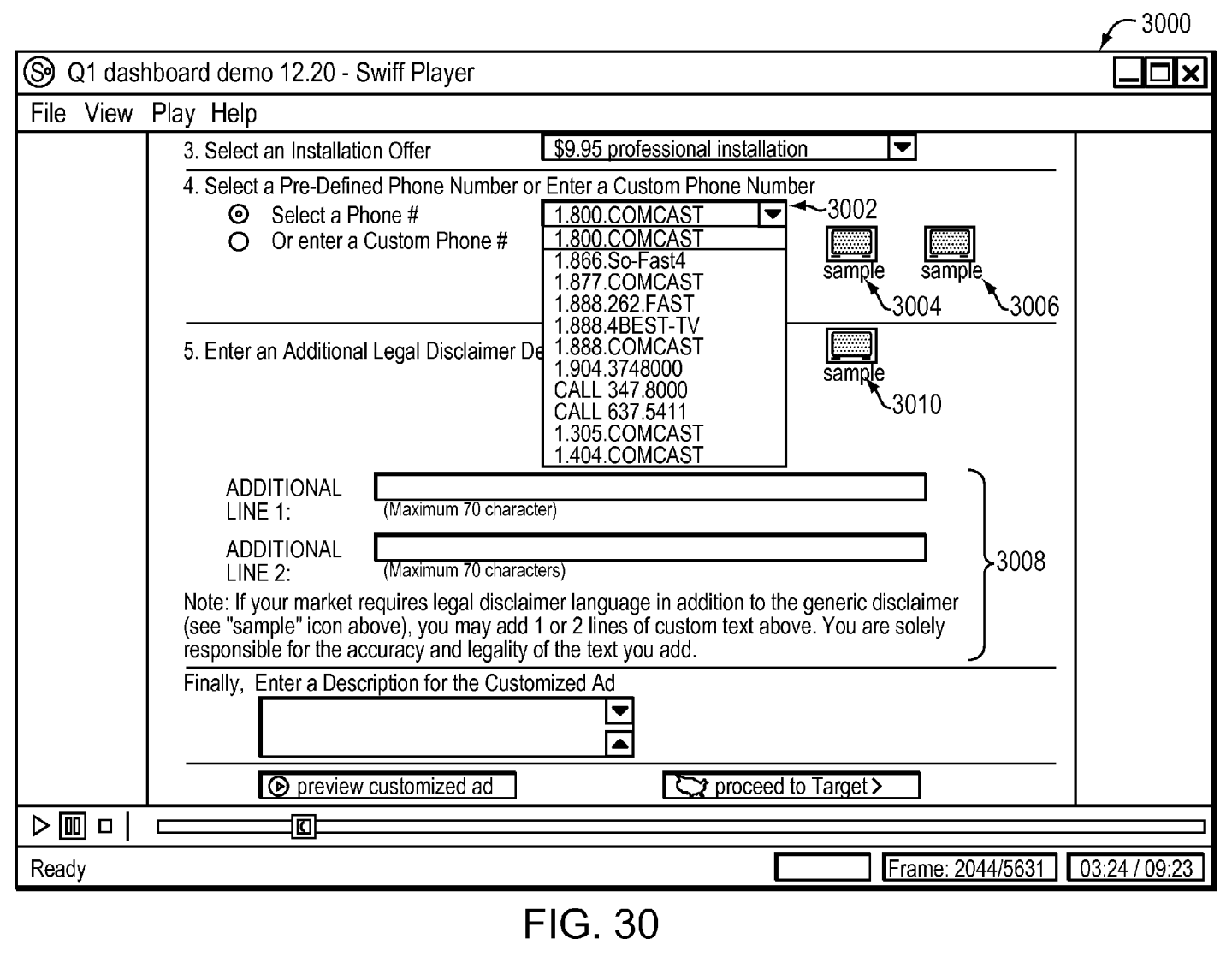
Figure 31:
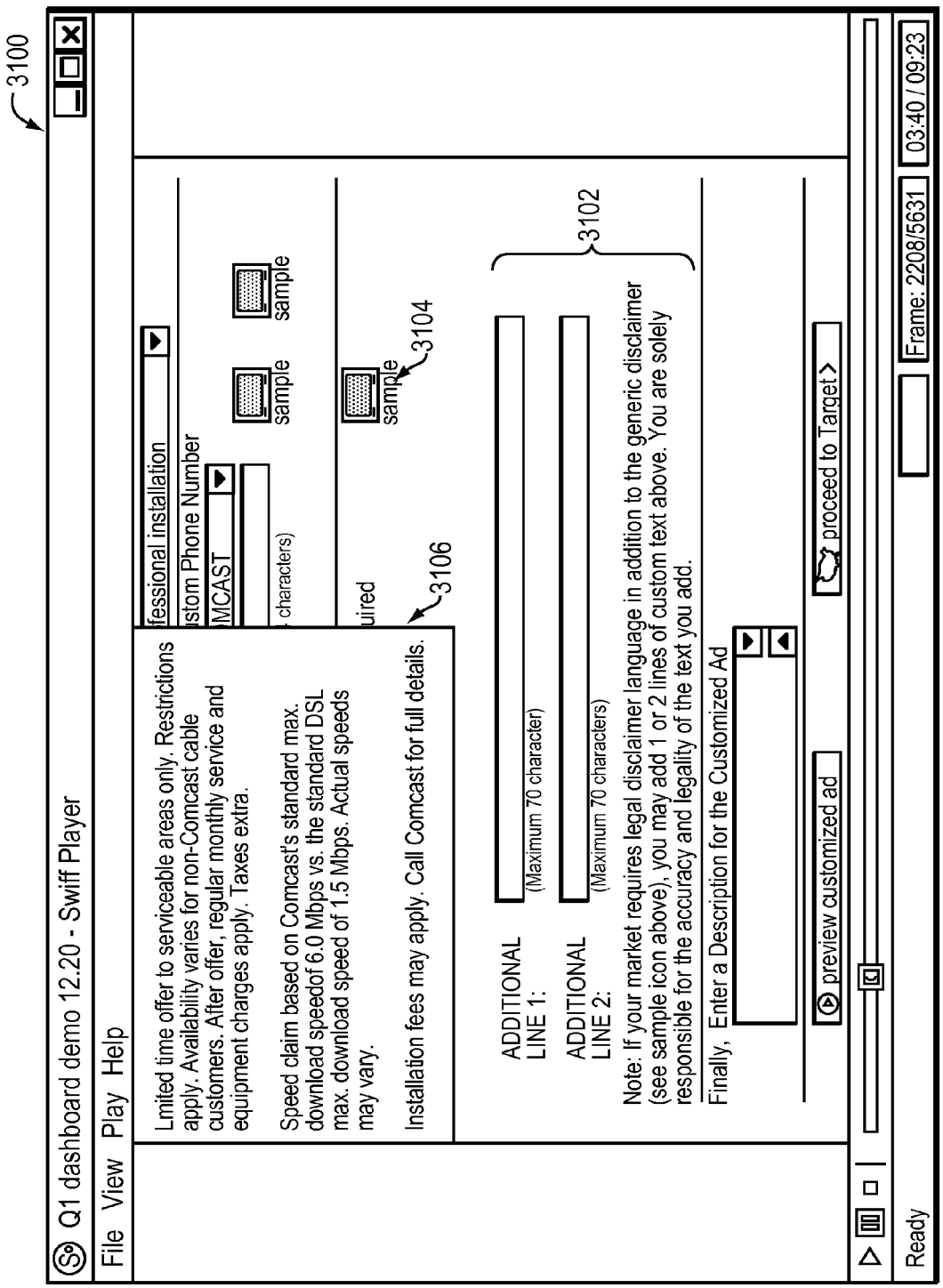

The media content management application may provide the user with additional semantic criteria. For example, list 2902 of FIG. 29 provides the user with installation offer options 2902 (e.g., $1 self-installation kit, 50% off pro installation, etc.), list 3002 of FIG. 30 provides the user with an option 3002 for selecting a phone number related to the advertised product, and fields 3008 provide the user with an opportunity to enter additional legal disclaimers. As shown in FIG. 30, in response to the user entering text into fields 3008, the media content management application adds the entered text to the generic legal disclaimer. In response to the user selecting a sample button 3010, the media content management application presents the user with preview window 3102 of FIG. 31.

It should be noted that the media content management application may provide the user with pre-selected semantic criteria. The advertiser and/or marketer may have determined that a particular offer is preferable for a particular advertisement campaign. For example, the advertiser may have statistical information informing the advertiser that consumers are responding to the advertiser's $1 for the first month and 50% off installation offers. In response, the advertiser may preset these offers associated with the advertisement campaign. In another example, the advertiser may determine their top five offers and allow the user to select from those top five offers.

In some embodiments, the media content management application may provide the user with recommendations for semantic criteria. For example, the media content management application may collect feedback from audience members, local content providers, or other viewers of the media content. Based on the collected feedback, the media content management application may automatically highlighted the semantic criteria that the application recommends (e.g., a recommended offer, a particular user response that causes the editing/assembly software package to retrieve the recommended media segment, a recommended content provider for transmitting the commercial, etc.).

Figure 32:
Figure 33:
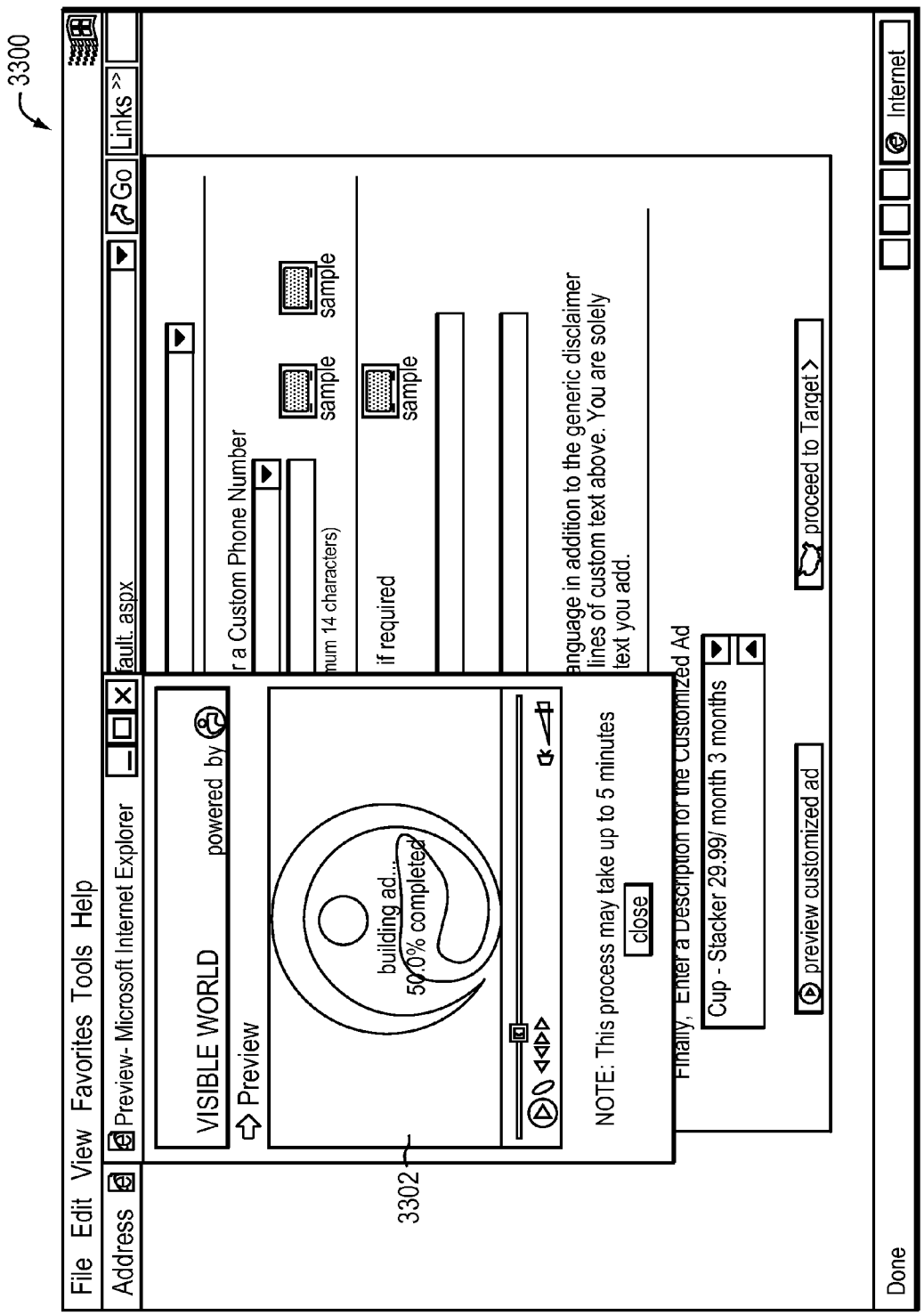
FIGS. 33-42 are illustrative assembly screens that may be provided in accordance with some embodiments of the present invention.
Figure 34:
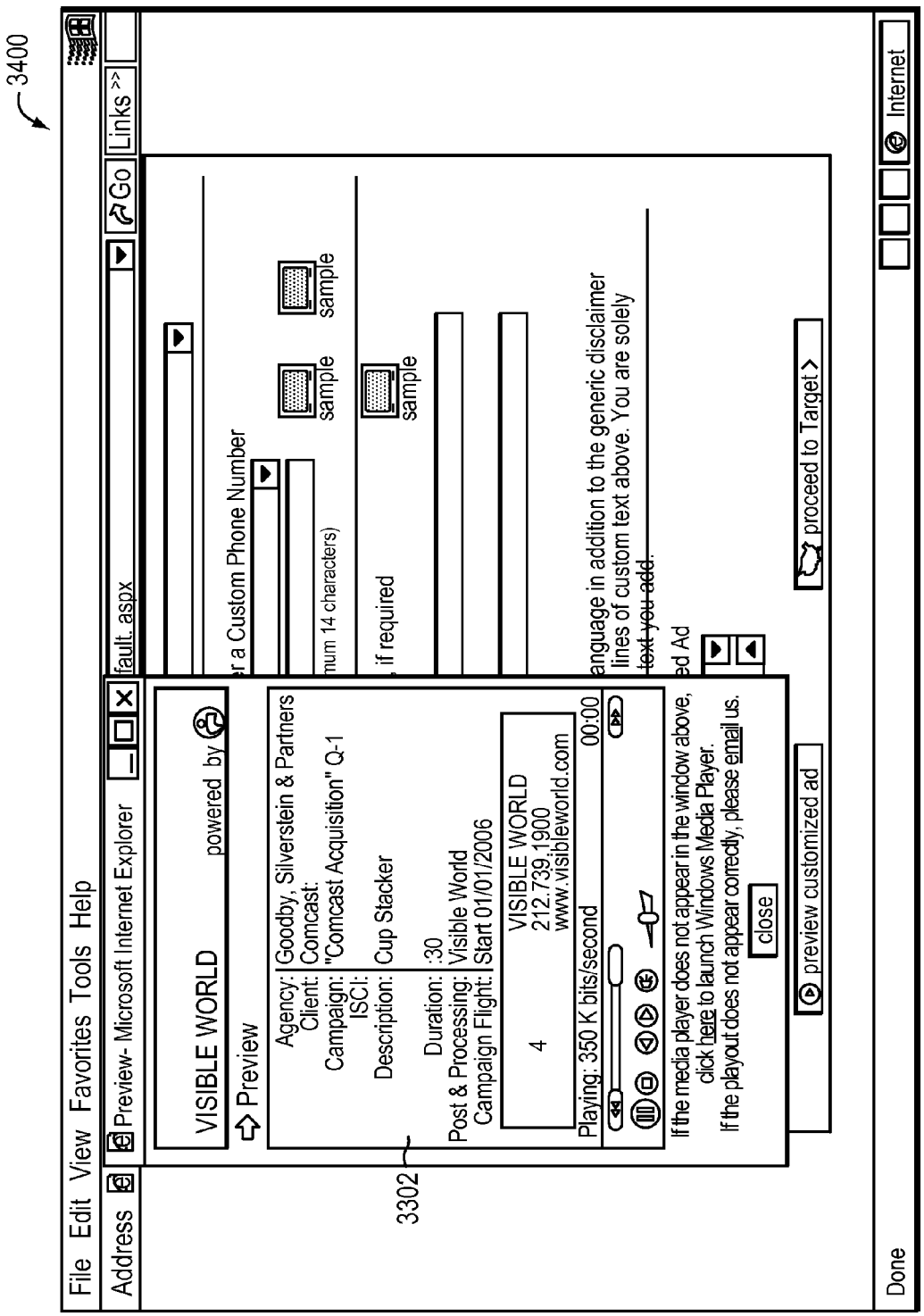
Figure 35:
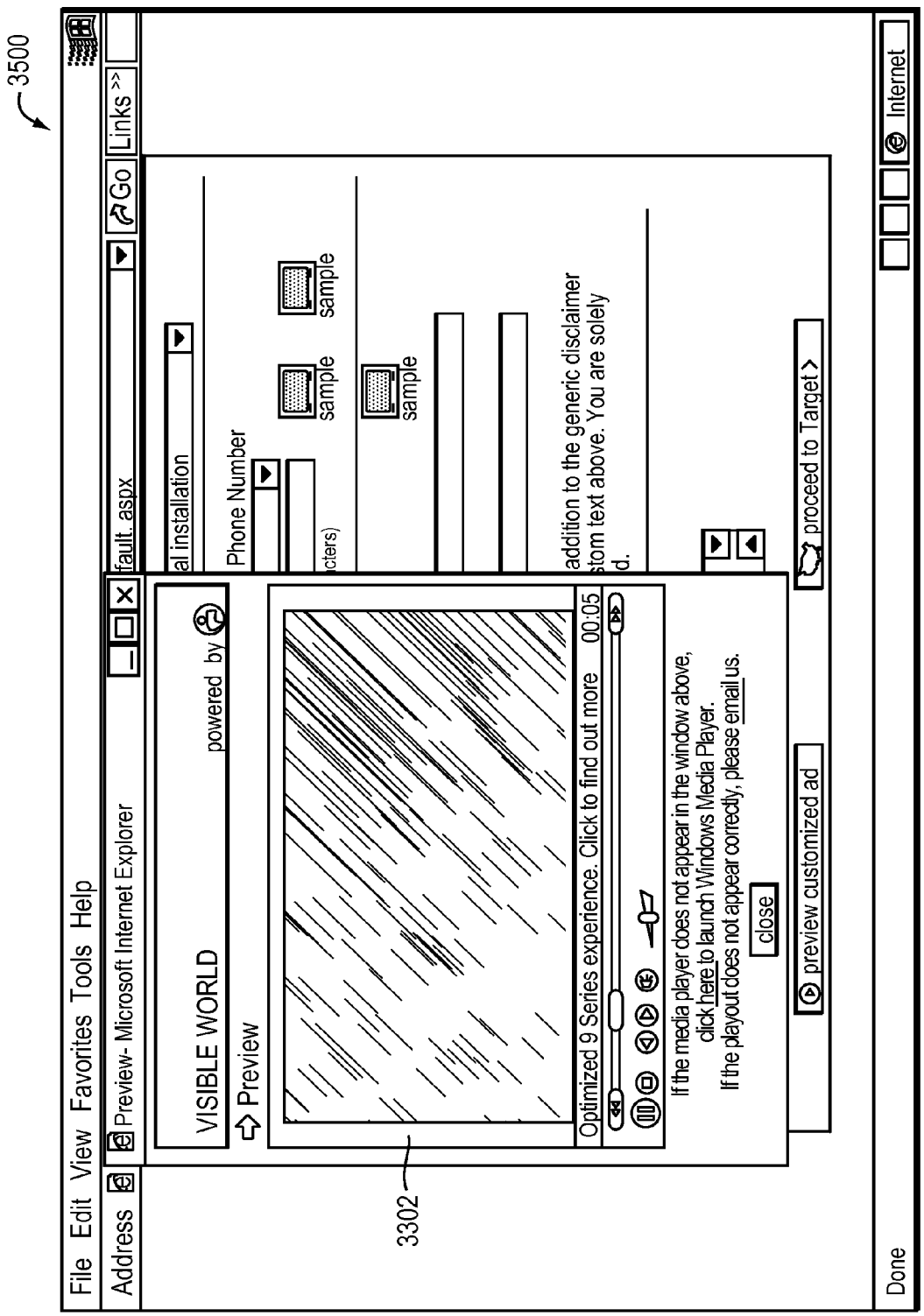
Figure 36:
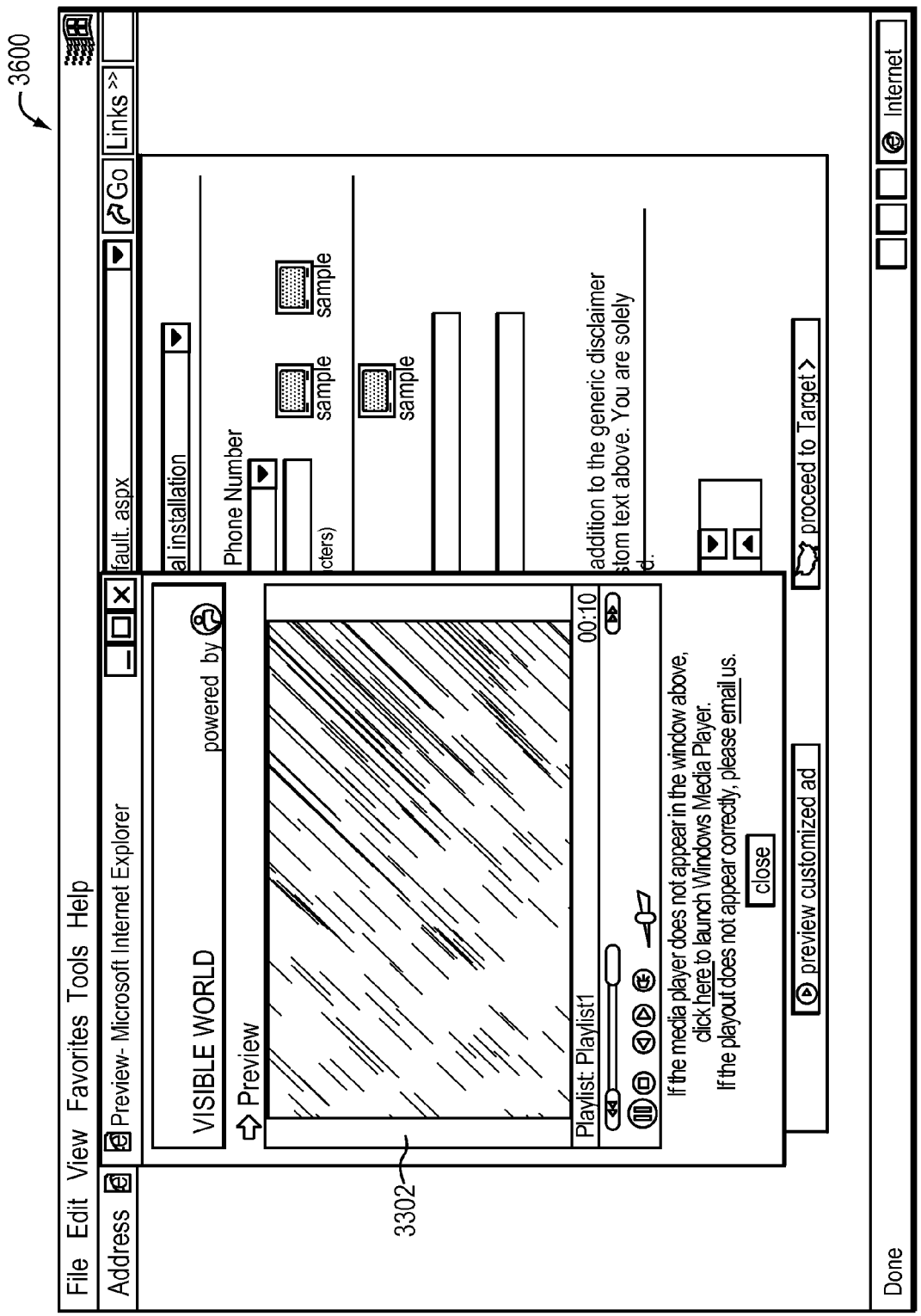
Figure 37:
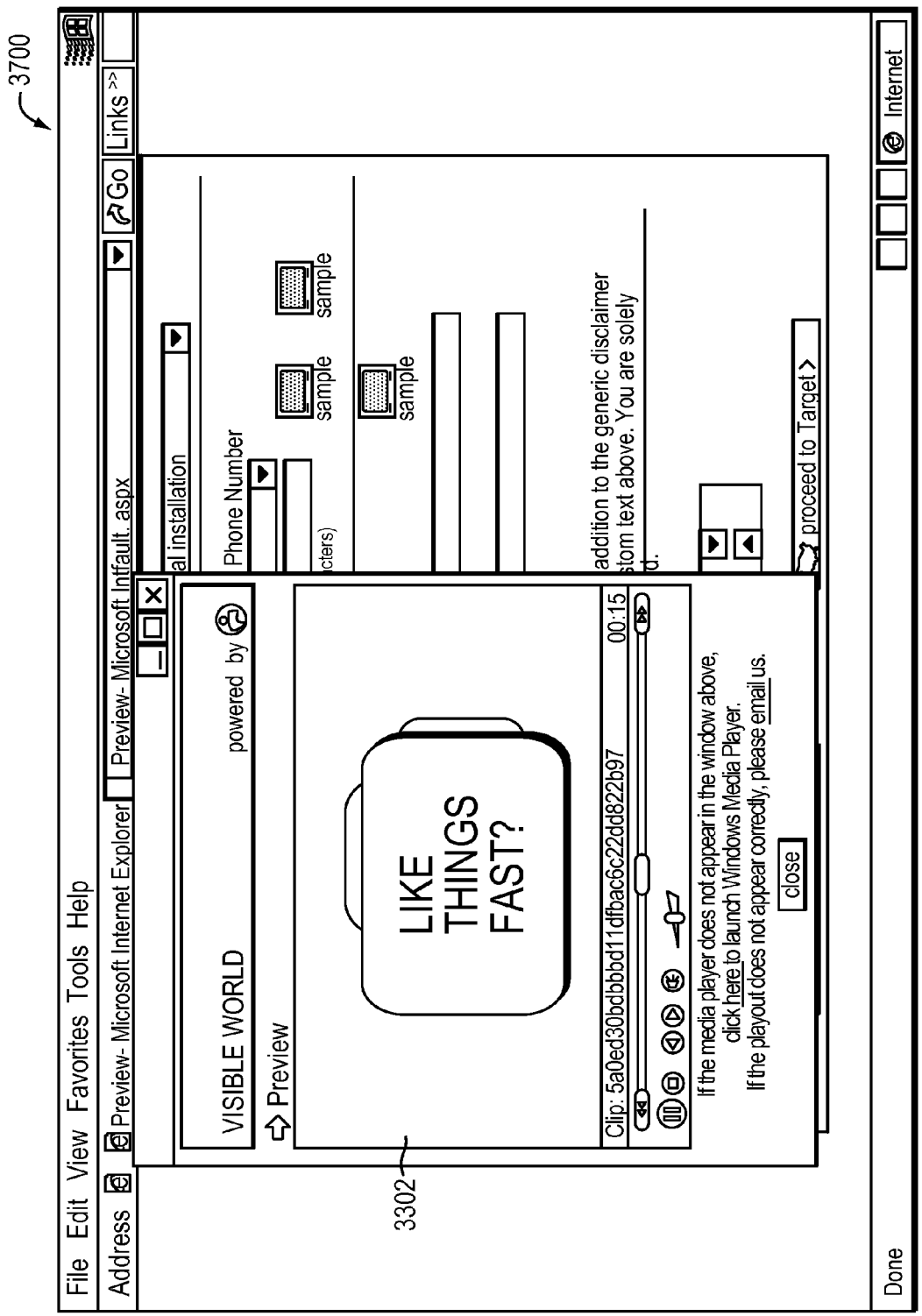
Figure 38:
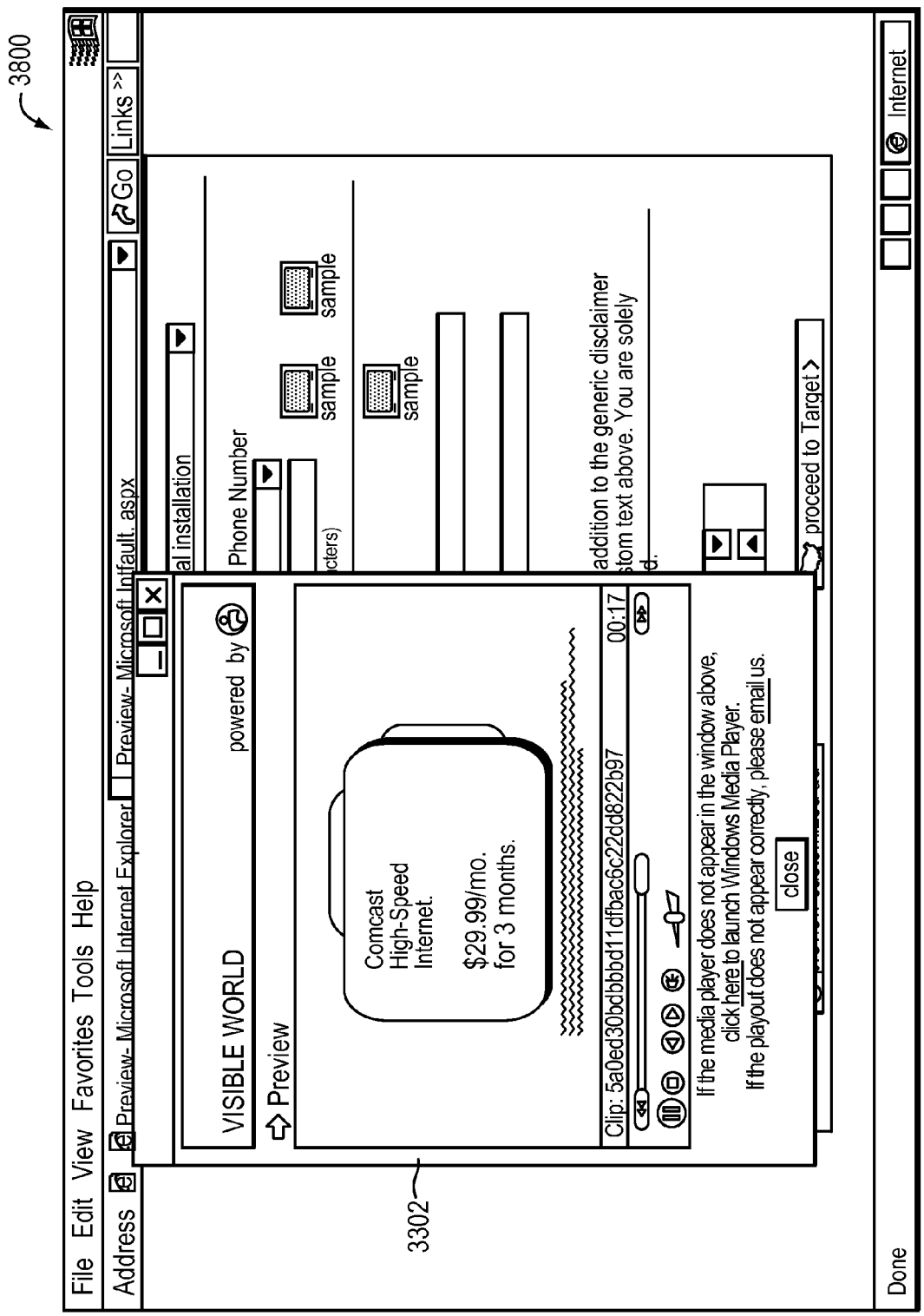
Figure 39:
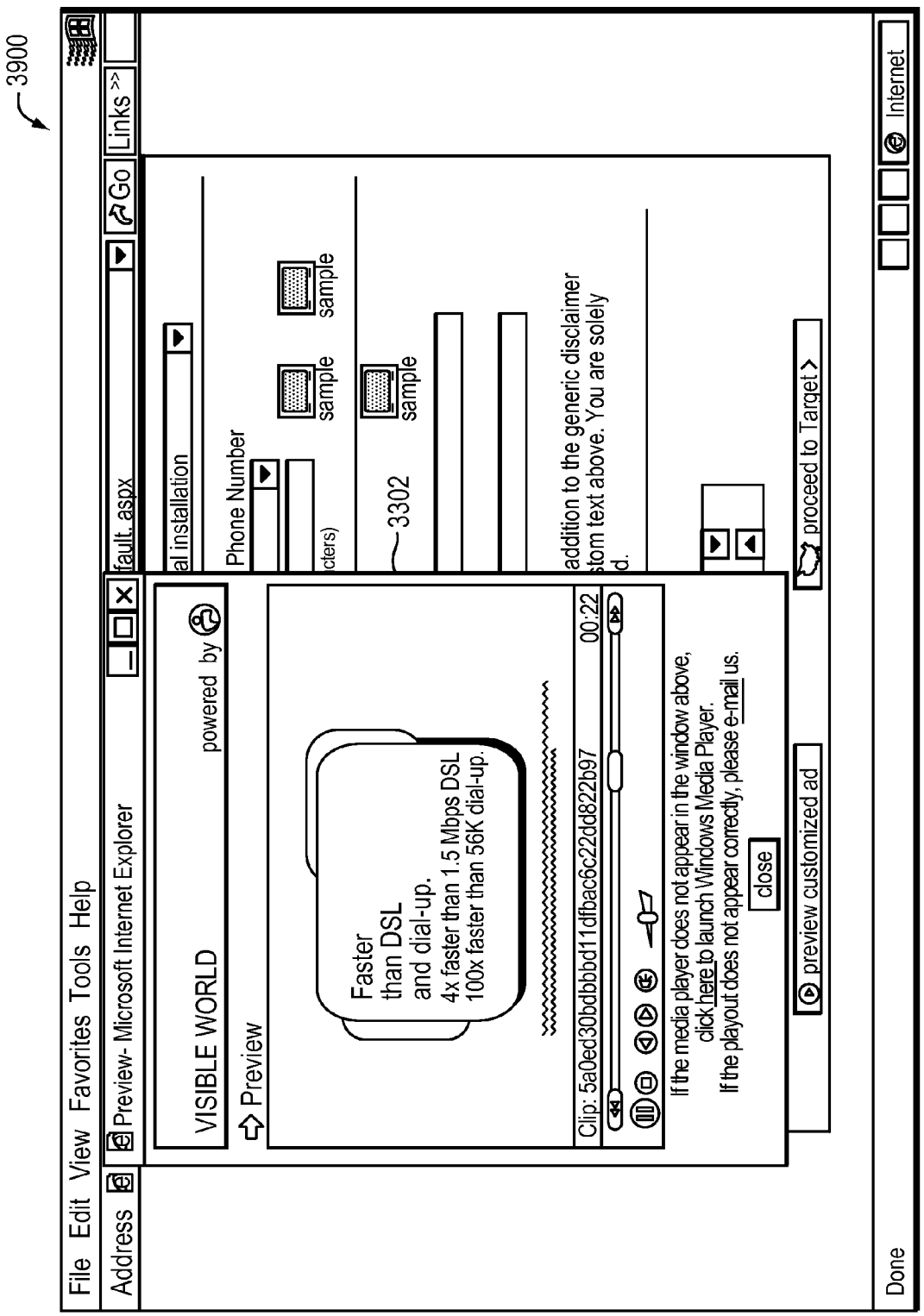
Figure 40:
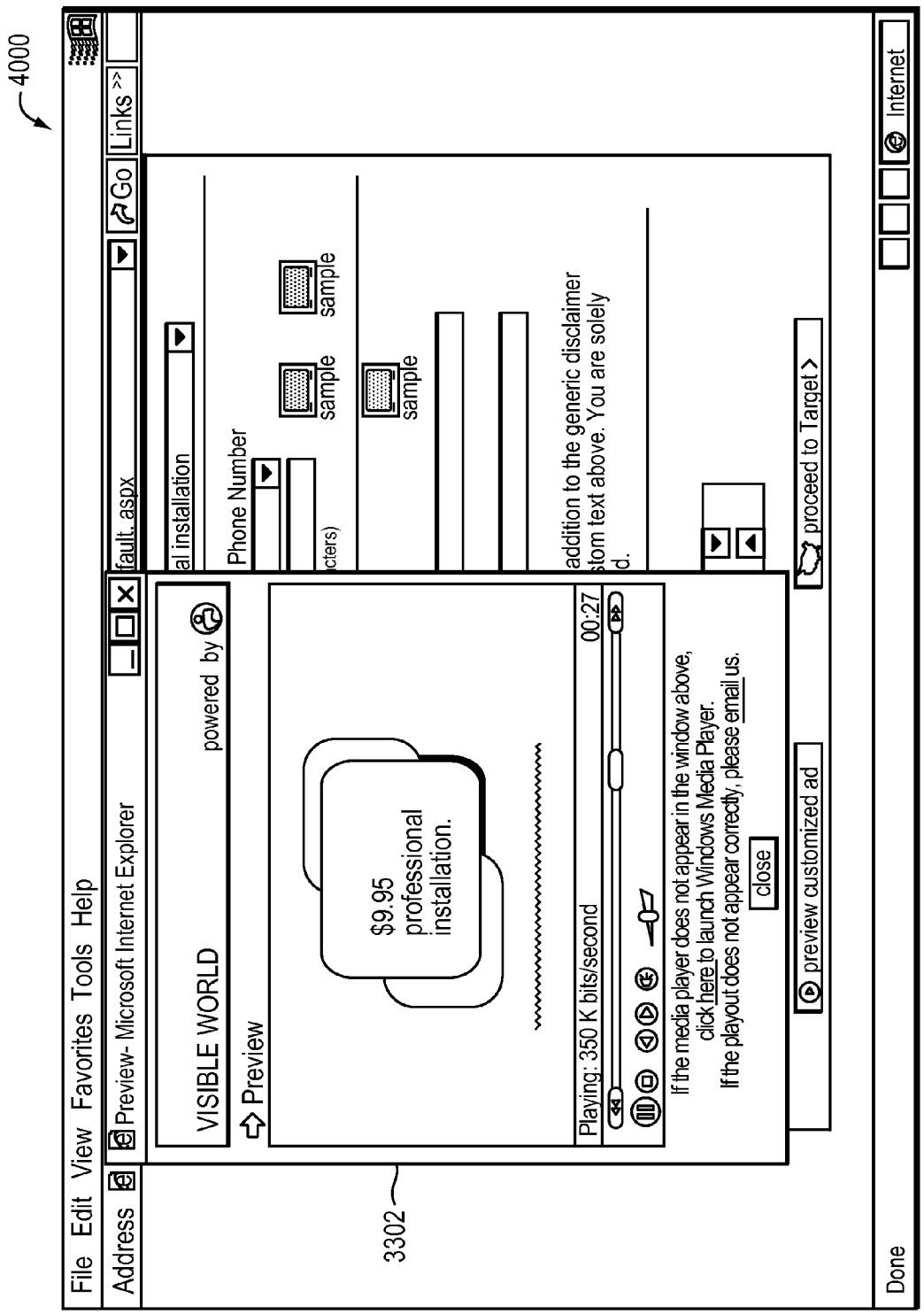
Figure 41:
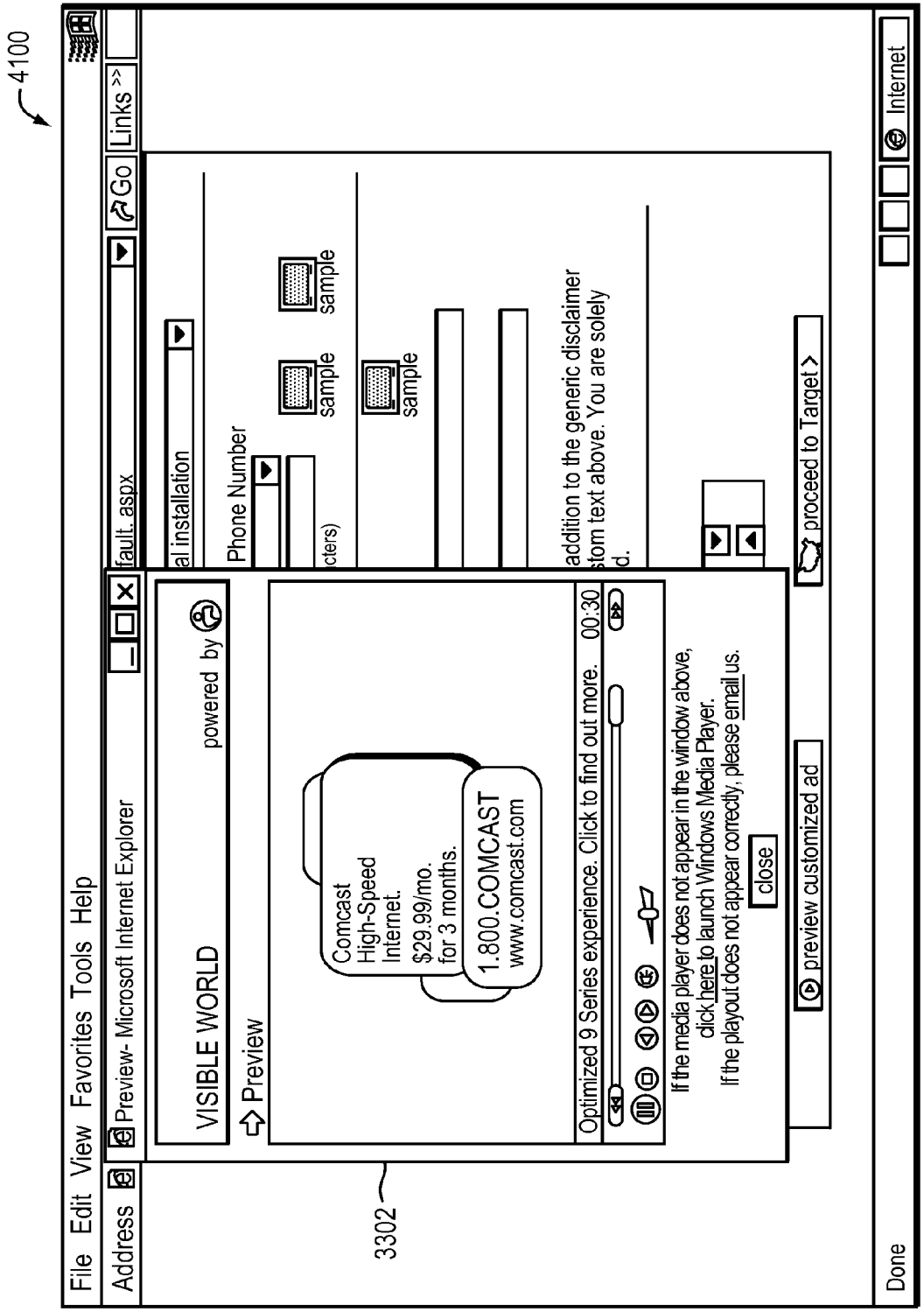
Figure 42:
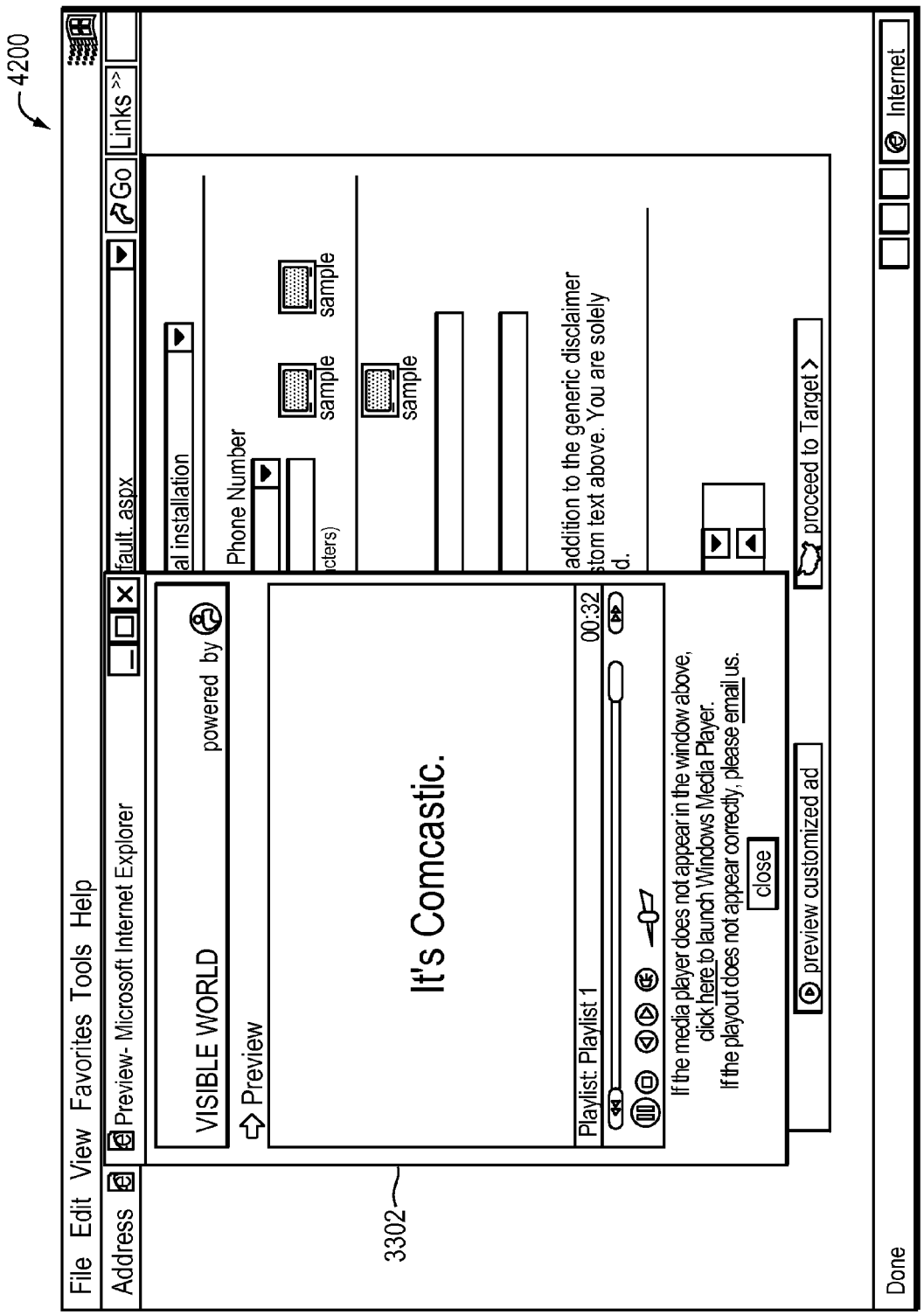

Referring to FIG. 32, the media content management application may allow the user to create a description for the customized advertisement or commercial. In some embodiments, the media content management application may associate the description with the completed and assembled commercial. For example, in response to receiving an indication from the user to purchase the customized commercial, the description "Cup—Stacker 29.99/month 3 months" may be used in the purchasing list or electronic shopping cart to identify the commercial.

In some embodiments, the media content management application may allow the user to preview the assembled commercial based on the selected semantic criteria. In response to selecting a preview button 3204 or any other suitable interface element, the media content management application may interpret the user's responses to the semantic criteria, retrieve the appropriate media segments from a database, and assemble a version of the commercial. As shown in FIGS. 33-42, the media content management application assembles a version of the commercial with various media segments and provide the user with preview window 3302. Using preview window 3302, the media content management application allow the user to review the version of the commercial that includes the media segments retrieved in response to some of the user's responses to the semantic criteria and includes customizations that the user inputted into the media content management application (e.g., particular offers, particular contact phone numbers, etc.).

In response to providing a preview of the assembled version of the commercial, the media content management application may provide the user with an opportunity to change the responses to one or more semantic criteria or proceed to targeting the version of the commercial by, for example, selecting a target button 3206 (FIG. 32).

In some embodiments, the media content management application may allow the user to target the assembled version of the commercial or media content. That is, without the need for appreciating costs associated with delivering the version of media content, the media content management application allows the user to select a medium for the version of media content, one or more destinations for the version of media content, etc. As shown in interface 1702, the "customize" button is currently highlighted.

Figure 44:
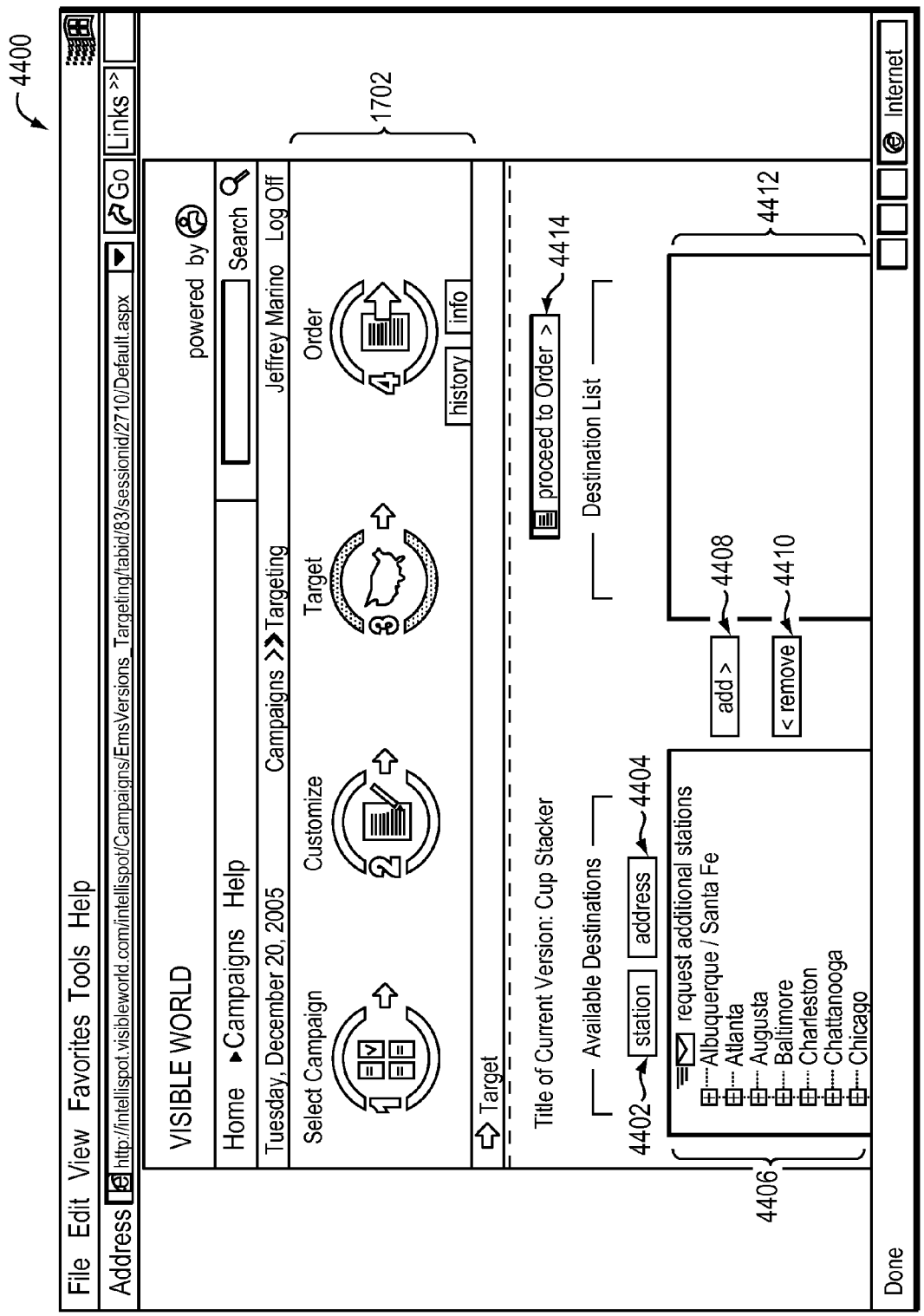

In response to the user selecting target button 3206 or any other suitable interface element, the media content management application may provide the user with targeting screen 4400 as shown in FIG. 44. As shown in FIG. 44, the media content management application may allow the user to select delivery options. The media content management application may allow the user to select from one or more delivery points 4406. These delivery points may include, for example, specific markets (e.g., Northeast, Atlanta, Chicago, etc.), stations and affiliates (e.g., KCNC (CBS) Denver, WABC (ABC) New York, etc.), companies, cable interconnects, types of individuals (e.g., via an e-mail list), or actual individuals for distribution of the media content. The media content management application may allow the user to select a destination for the media content by station (e.g., in response to selecting a station button 4402), by address (e.g., in response to selecting an address button 4404), or any other suitable approach. In some embodiments, the media content management application may allow the user to submit a request to the media content management application to add additional stations, companies, individuals, or other entities for transmitting the media content.

Figure 45:
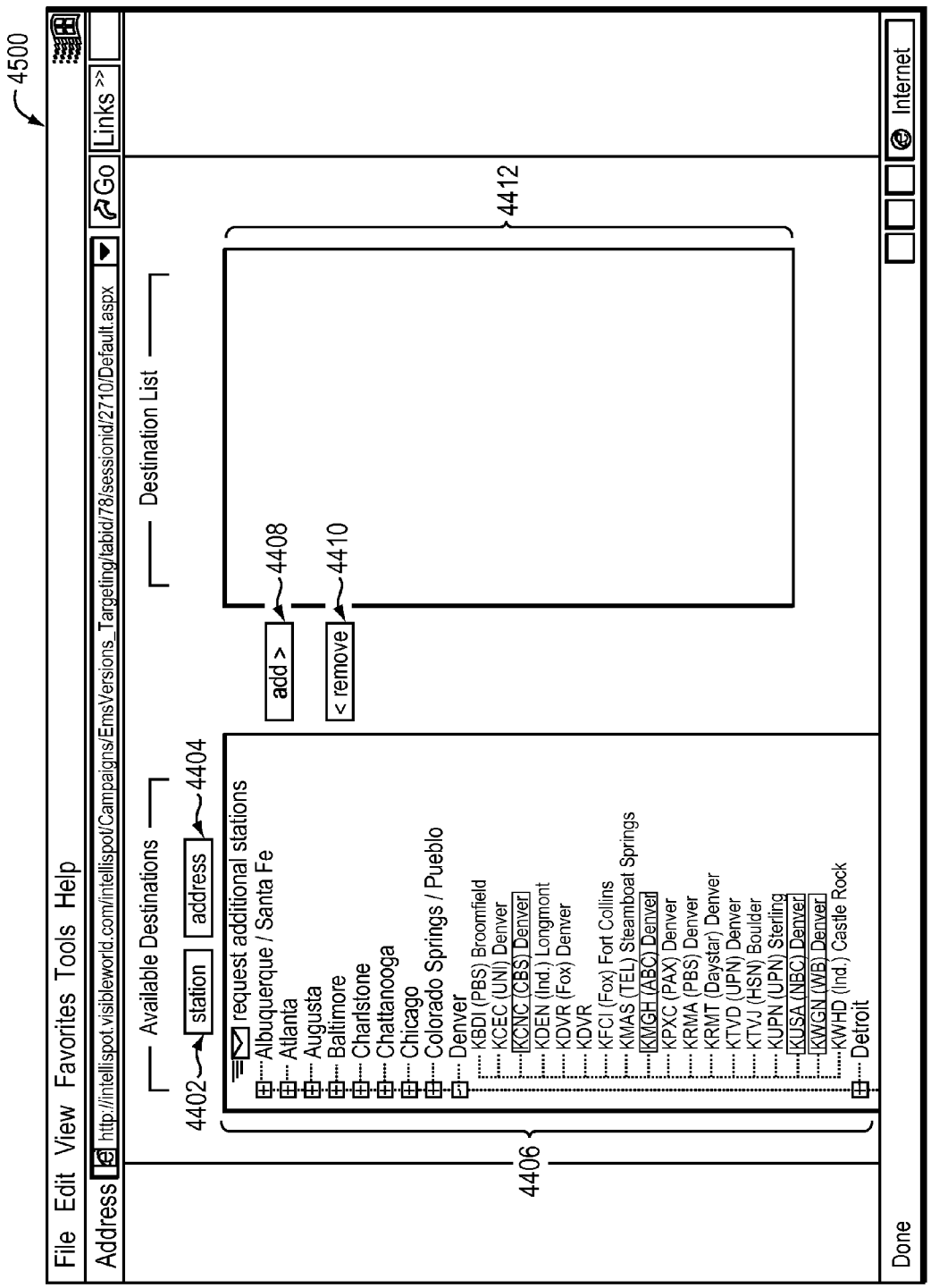
Figure 46:
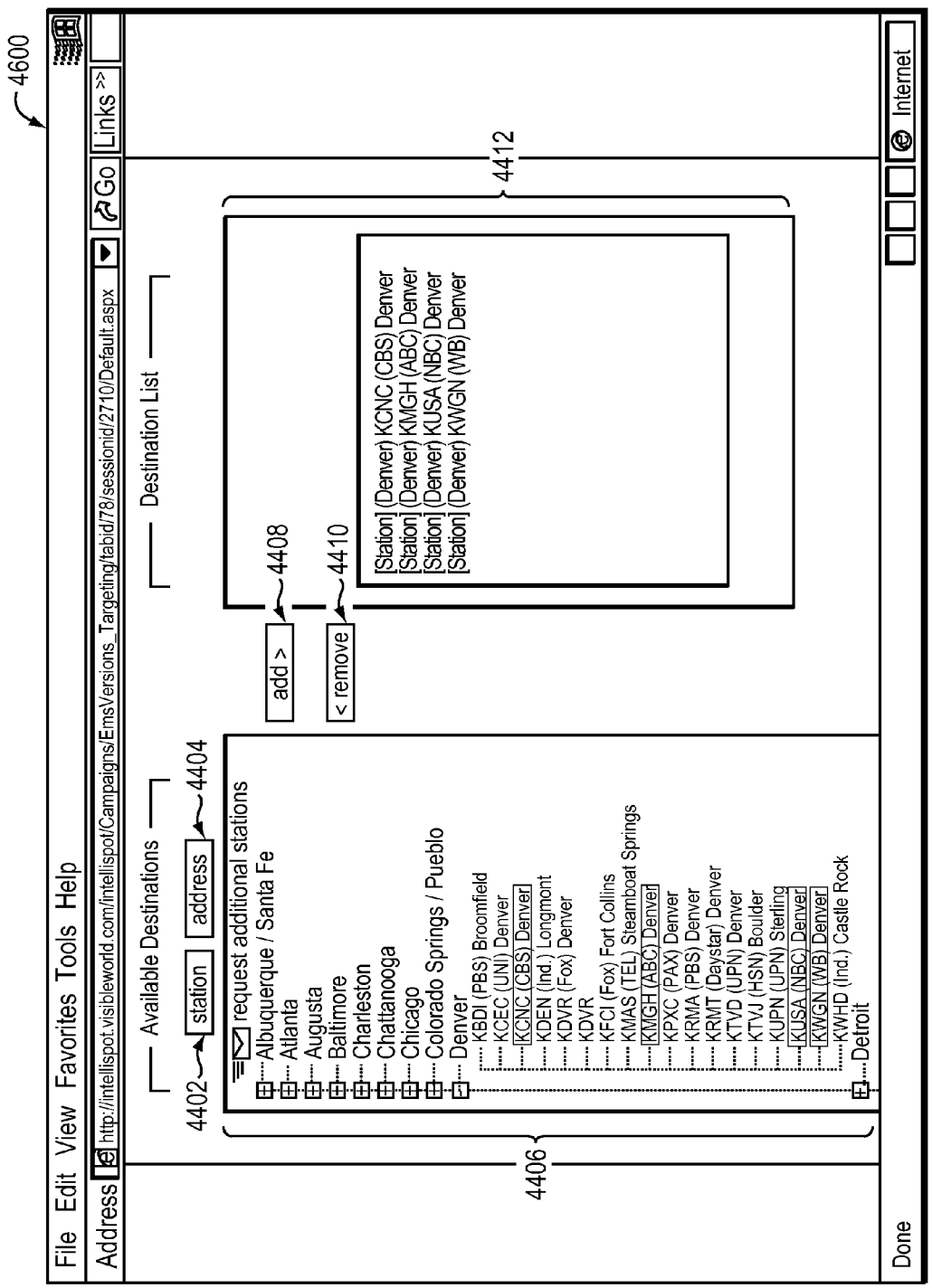
Figure 47:
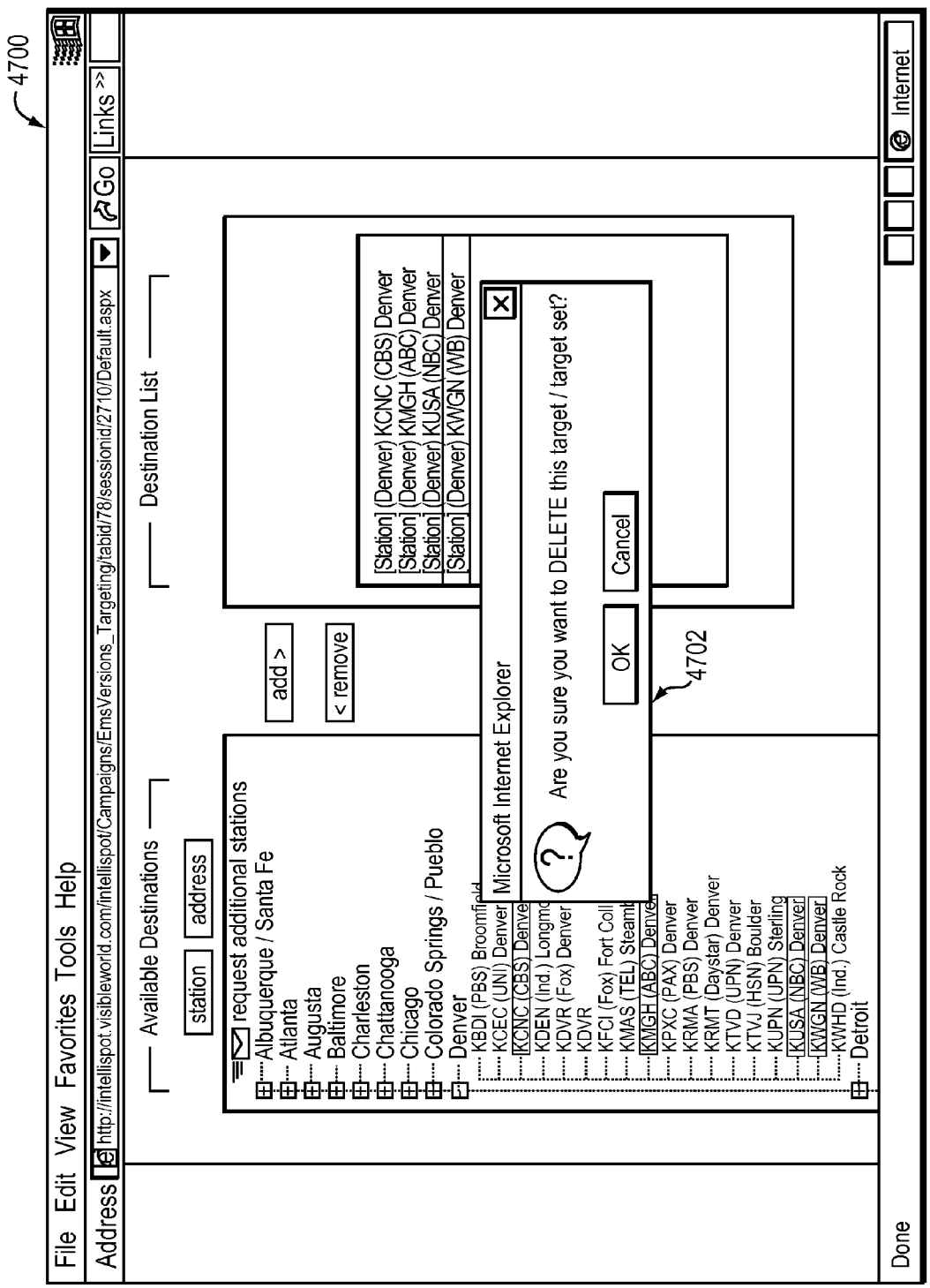
Figure 48:
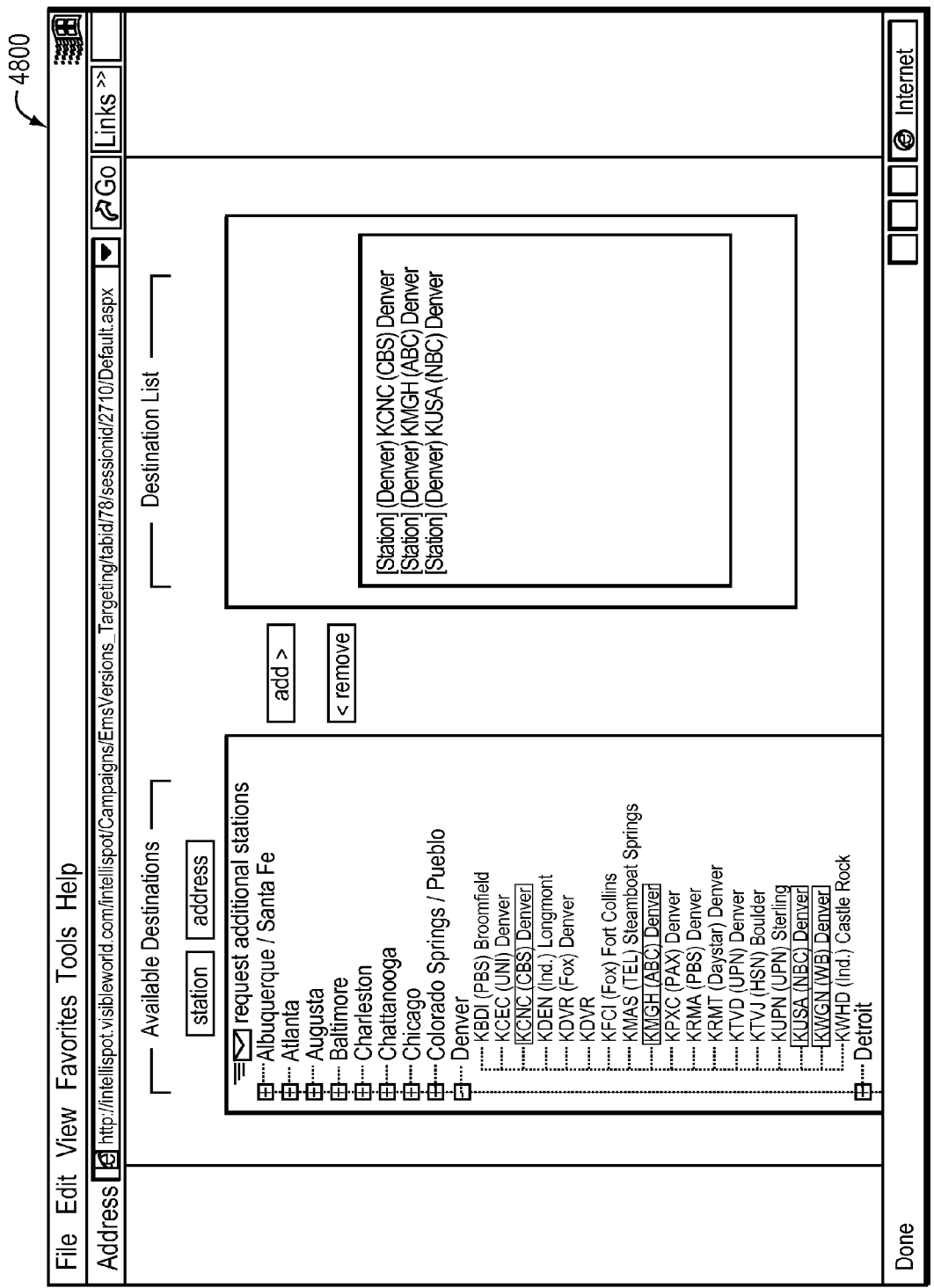

As shown in FIG. 44, the media content management application may allow the user to transmit the assembled version of media content to multiple stations or entities. Using an add button 4408 and/or a remove button 4410, the media content management may place one or more stations and/or entities on a destination list 4412. For example, screen 4500 of FIG. 45 shows that the user has selected KCNC (CBS) Denver, KMGH (ABC) Denver, KUSA (NBC) Denver, and KWGN (WB) Denver in list 4406. In response to selecting add button 4408, those stations are added to destination list 4412 as shown in FIG. 46. In response to the user selecting a station on destination list 4412 and selecting remove button 4410, the media content management application may present the user with a delete prompt 4702 (FIG. 47). In response to the user confirming the deletion in prompt 4702, the media content management application may remove the selected station from list 4412 as shown in FIG. 48.

Figure 49:
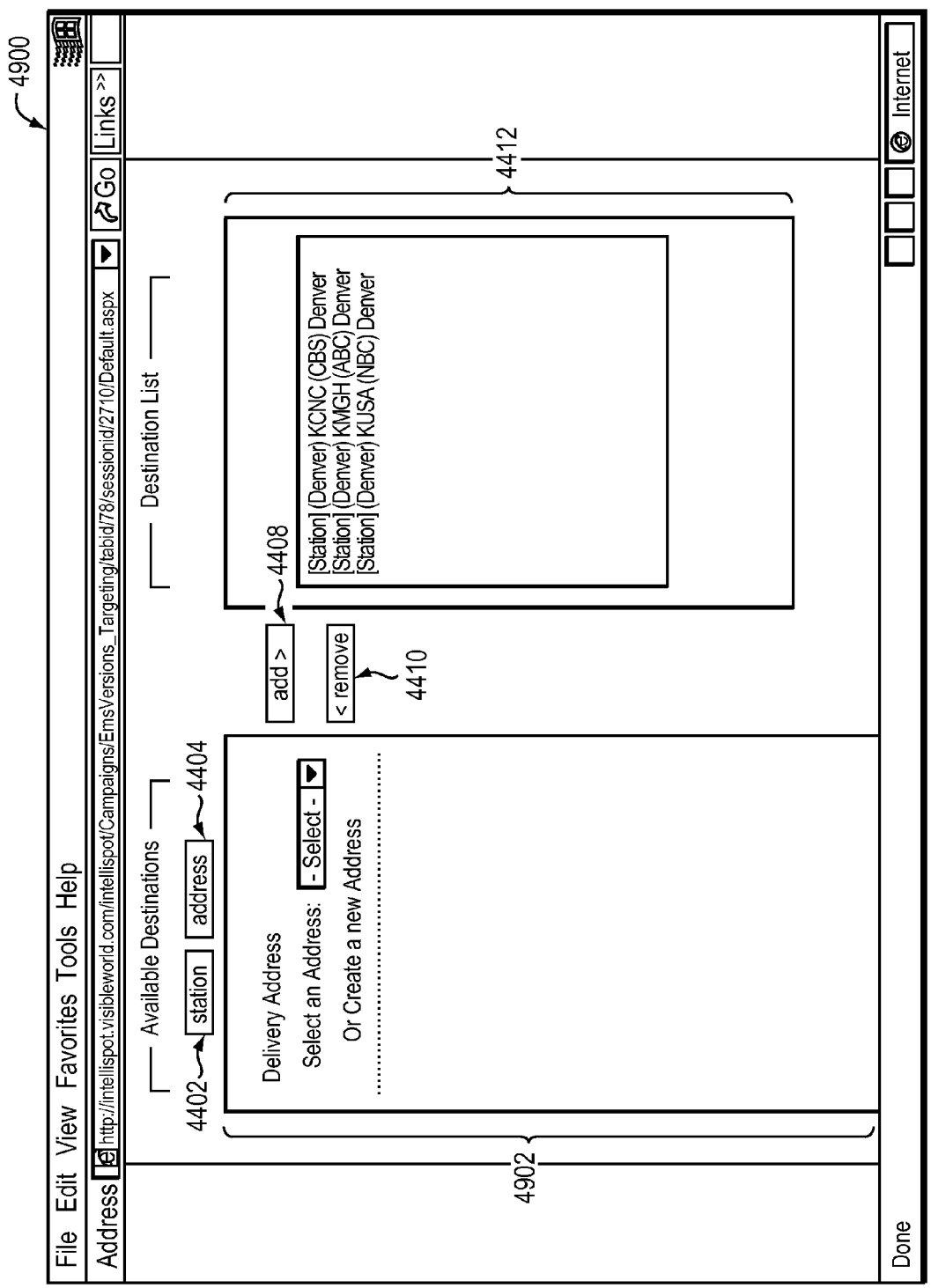
Figure 50:
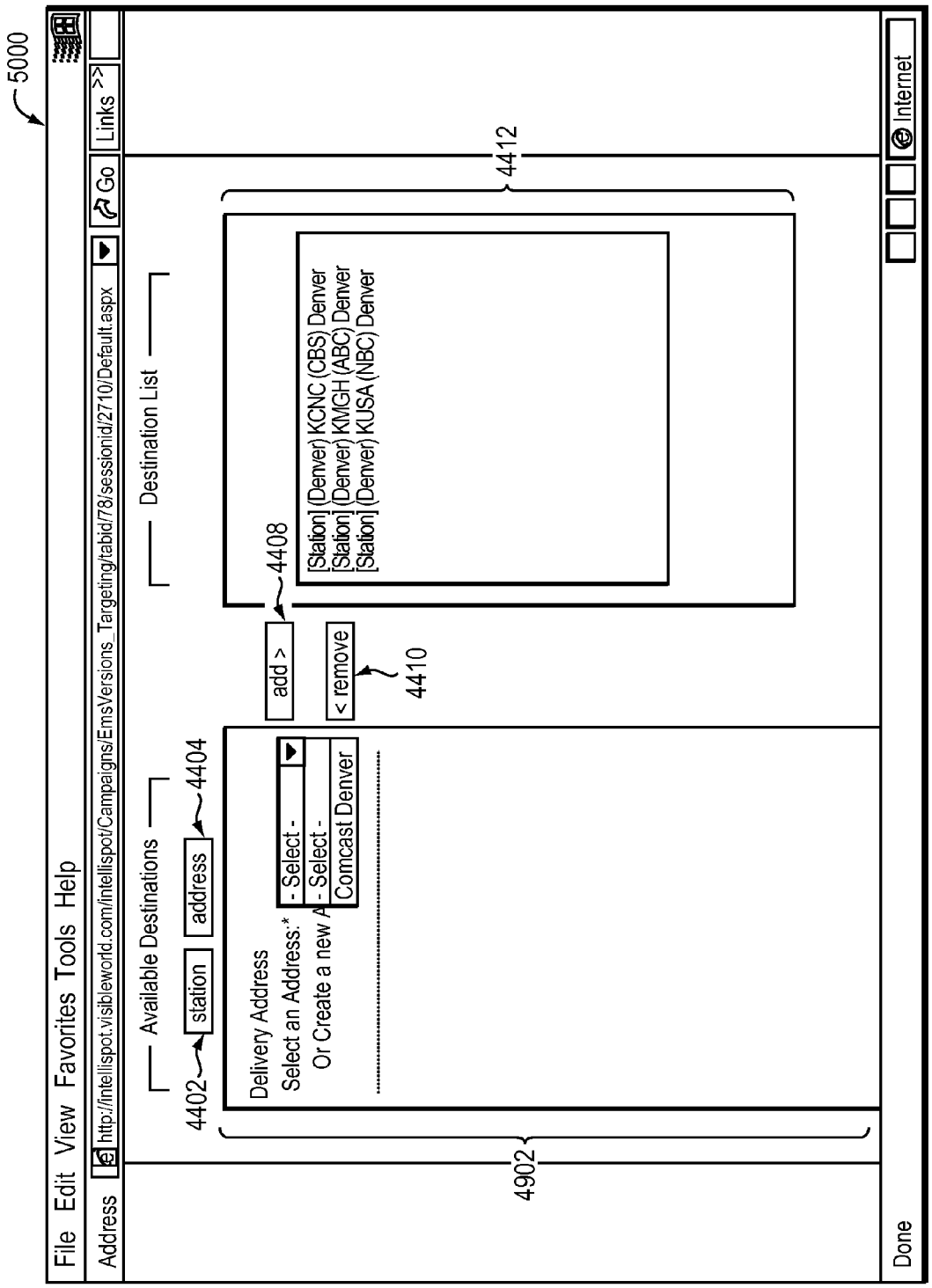
Figure 51:
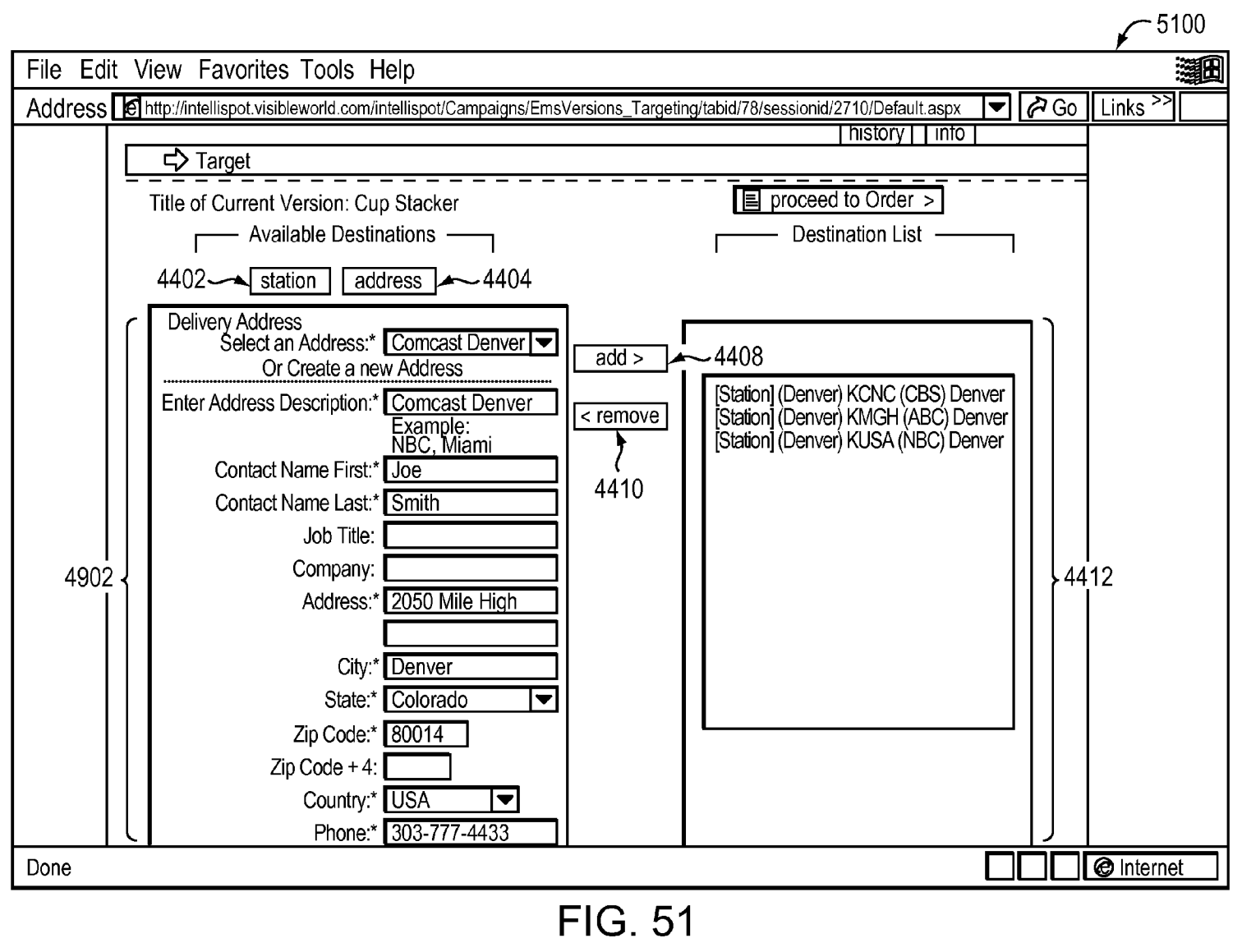
Figure 52:
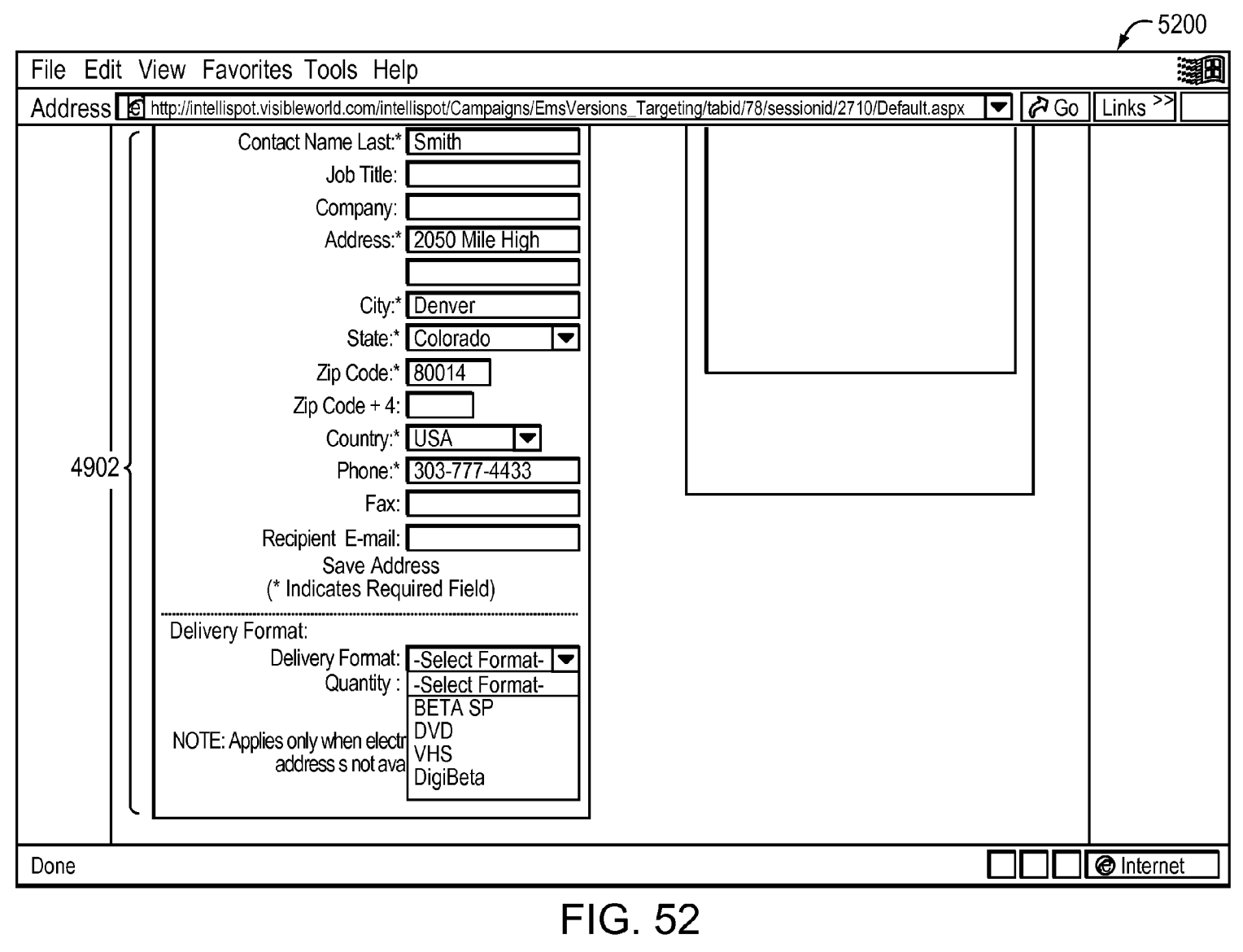
Figure 53:
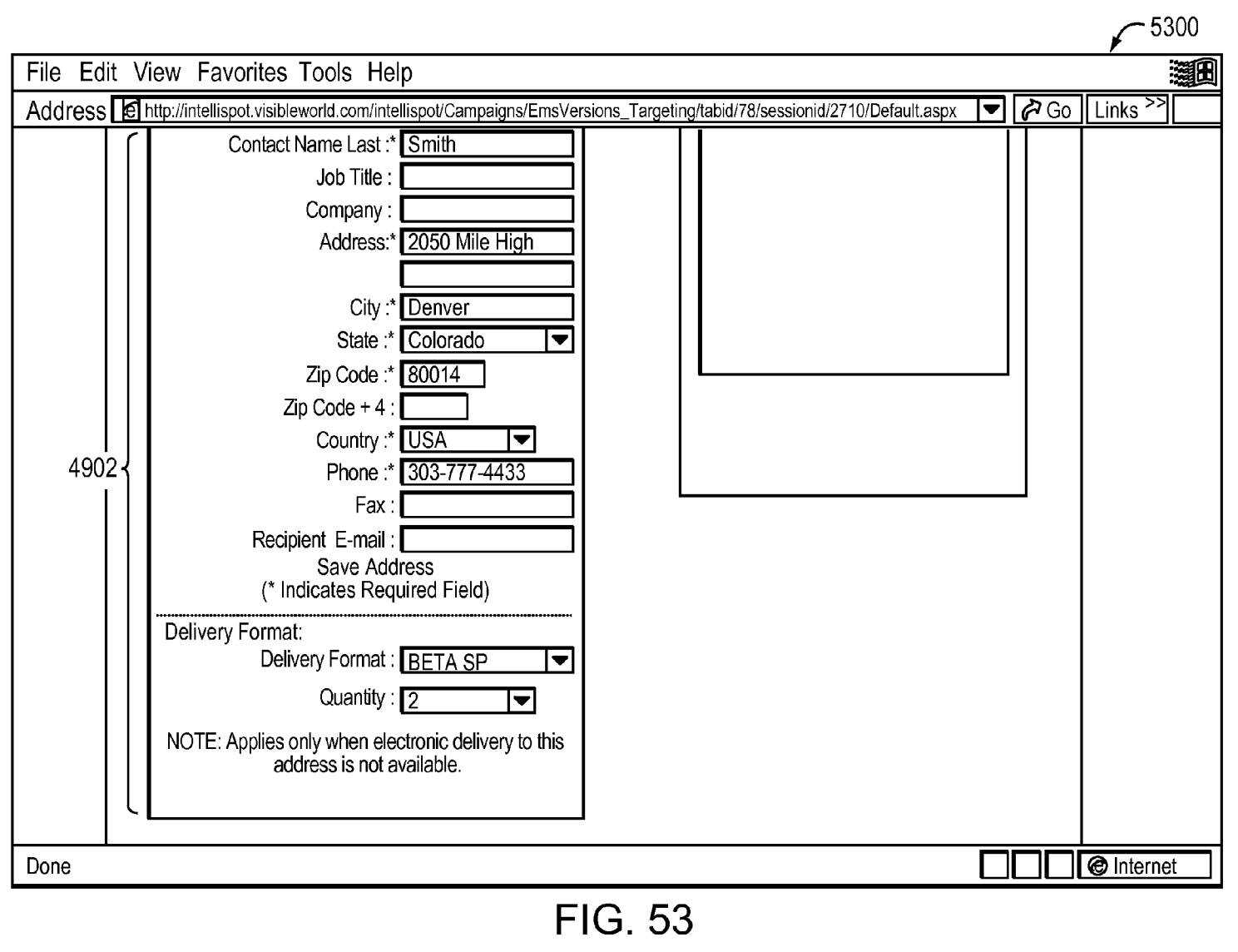
Figure 54:
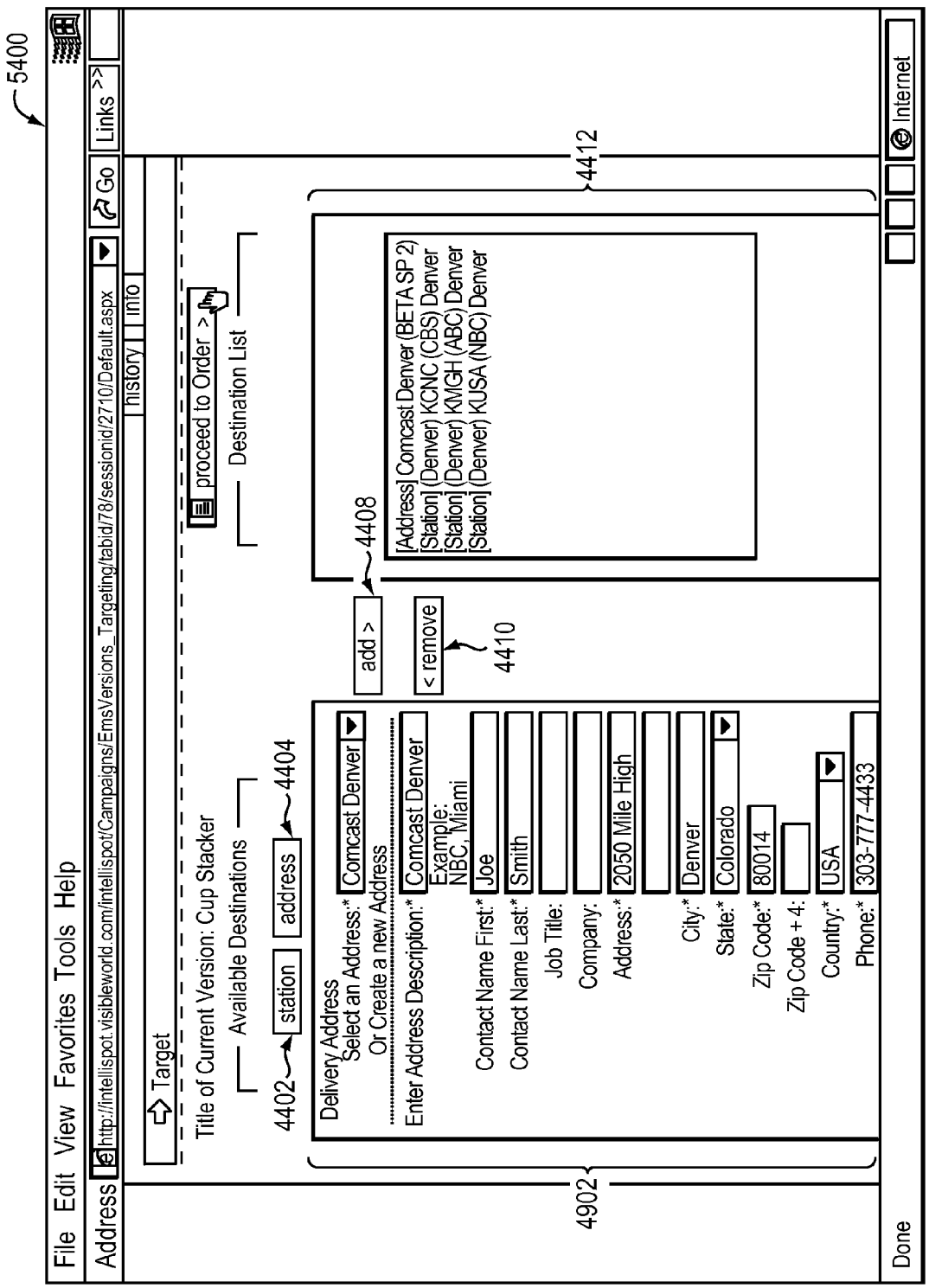

In some embodiments, the media content management application may allow the user to transmit the assembled version of the media content to a particular delivery address (e.g., an individual, a company, etc.). Referring to FIG. 49, in response to the user selecting address button 4404, the media content management application may allow the user to select an address or input an address in field 4902. In addition, the media content management application may populate the list with addresses associated with the user (e.g., addresses that the user has previously transmitted media content, addresses that the user has previously added to the application, addresses that are associated with the user from other applications (e.g., Microsoft Outlook), etc.). For example, as shown in FIG. 50, the media content management application has populated fields 4902 with an address for Comcast Denver. In response to the user selecting the address, the media content management application may populate the fields 4902 with information associated with the address for Comcast Denver (FIG. 51). The information may include, for example, the format that the media content is to be delivered to the delivery point (FIGS. 52 and 53). These formats may include, for example, MPEG-2, MPEG-4, videotape (VHS), DVD, standard definition media (DV, DVCPRO, DVCAM, Uncompressed SD, etc.), high definition media (e.g., HDV, XDCAM HD, DVCPRO HD, Uncompressed HD, etc.), other media formats, other media resolutions, etc. In response to selecting the address for Comcast Denver and the add button 4408, the media content management application adds the address to list 4412 (shown in FIG. 54).

In some embodiments, the media content management application may provide the user with a recommendation that includes which delivery points (e.g., stations, entities, etc.) should receive the version of the media content. For example, the media content management application may provide a listing of delivery points that have demographic information corresponding to the targeting information selected for the media content. In another example, the media content management application may use the previously inputted semantic criteria to generate an optimized list of delivery points.

In some embodiments, the media content management application may use the previously inputted semantic criteria to generate a list of delivery points (where metadata is associated with each delivery point), where the metadata from the listed delivery points matches the metadata characteristics associated with the previously inputted semantic criteria. For example, the media content management application may extract metadata characteristics from the previously inputted semantic criteria. The metadata characteristics may be used by the media content management application to filter a list of available delivery points (e.g., WABC New York or all delivery points in New York have the metadata characteristics of greater than 50% Male and a majority of households have an income of greater than $100,000).

In some embodiments, the media content management application may optimize the user's selections. For example, the media content management application may determine the media format preferences, requirements, and other information relating to the station that the user has selected to receive the version of media content. The media content management application may determine that WABC (ABC) New York requires that versions of media content be received in both standard definition and high definition. The media content management application may also determine that WABC (ABC) New York prefers that the versions of media content be provided in MPEG-2 format. The media content management application may also determine that WABC (ABC) New York requires that a videotape of the media content be sent to a particular address. In response to the determinations, the media content management application may pre-select the user's available selections for the particular delivery point (e.g., only standard definition and videotape). Alternatively, the media content management application may prohibit the user from selecting options that are not within the requirements of the delivery point (e.g., the user cannot select standard definition because the particular delivery point only accepts media content in high definition).

Figure 55:
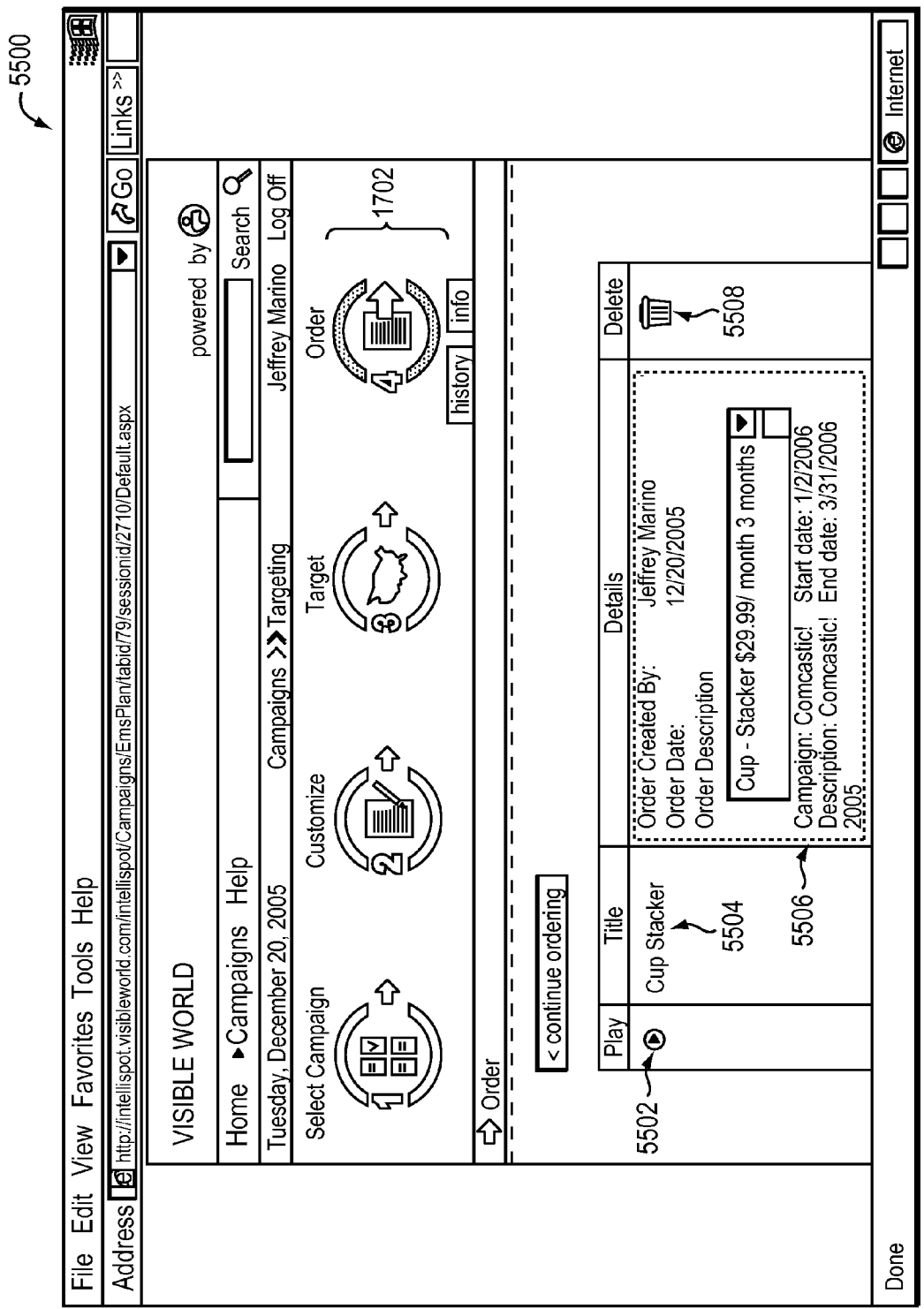

In some embodiments, the media content management application may allow the user to order one or more assembled versions of media content. As shown in FIG. 55, the "order" button of interface 1702 is currently highlighted.

Figure 56:
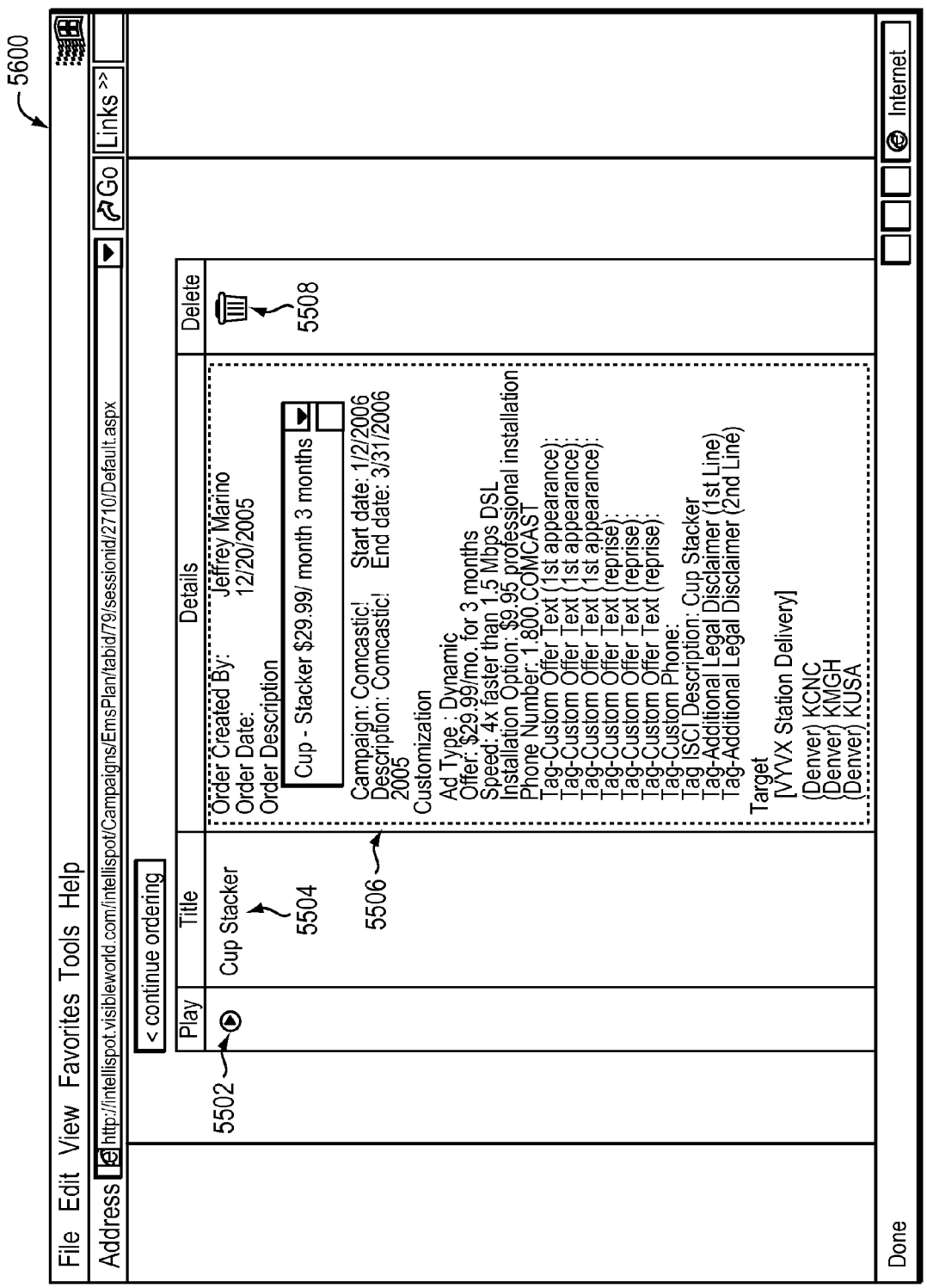
Figure 57:
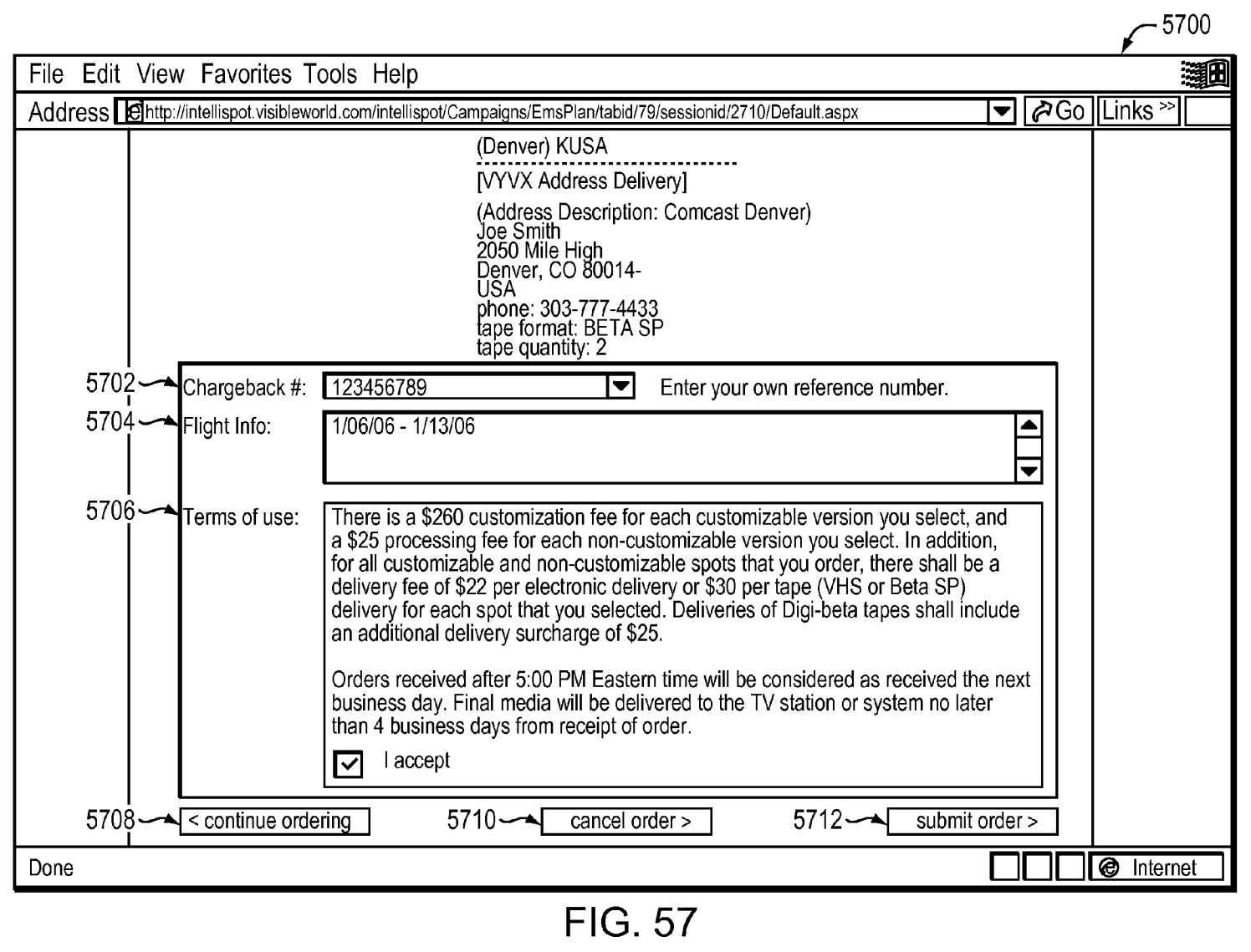

The media content management application may provide the user with ordering display 5500. As shown in FIGS. 55-57, the media content management application may allow the user add the assembled version of the media content to a shopping or ordering list. The list may include a play option 5502 for previewing the media content, a title 5504, a description of the version of media content 5506 (e.g., the name of the user that created the version of media content, the date that the version was added to the list, a description of the order, campaign information, product information, customization information, targeting information, delivery information, etc.) and a delete option 5508 for removing the version of media content from the shopping list.

In some embodiments, the media content management application may allow the user to input chargeback numbers 5702 (FIG. 57). In response to the user inputting a chargeback number, the media content management application may be used to automatically track which users are ordering media content.

In some embodiments, the media content management application may allow the user to input playback information 5704 (FIG. 57). Playback information may include, for example, a transmission time (e.g., PM only, primetime, etc.), a transmission date (e.g., January 6$^{th}$ through January 13$^{th}$), a delivery location, offers relating to the completed commercial, etc. For example, the media content management application may allow the user to create a first commercial that is to be distributed to the New York, N.Y. audience for playback between the hours of 9 AM and 5 PM and a second commercial that is to be distributed to the New York, N.Y. audience for playback between the hours of 6 PM and 12 AM.

In some embodiments, the media content management application may monitor the station or entity that receives the media content and determines whether the station or entity has distributed the version of media content in accordance with the playback information. If the station or entity has not complied with the playback information, the media content management application may prevent the station or entity from distributing media content. Alternatively, the media content management application may send the user a notification that the station or entity has not complied with the playback information.

Figure 58:
Figure 59:
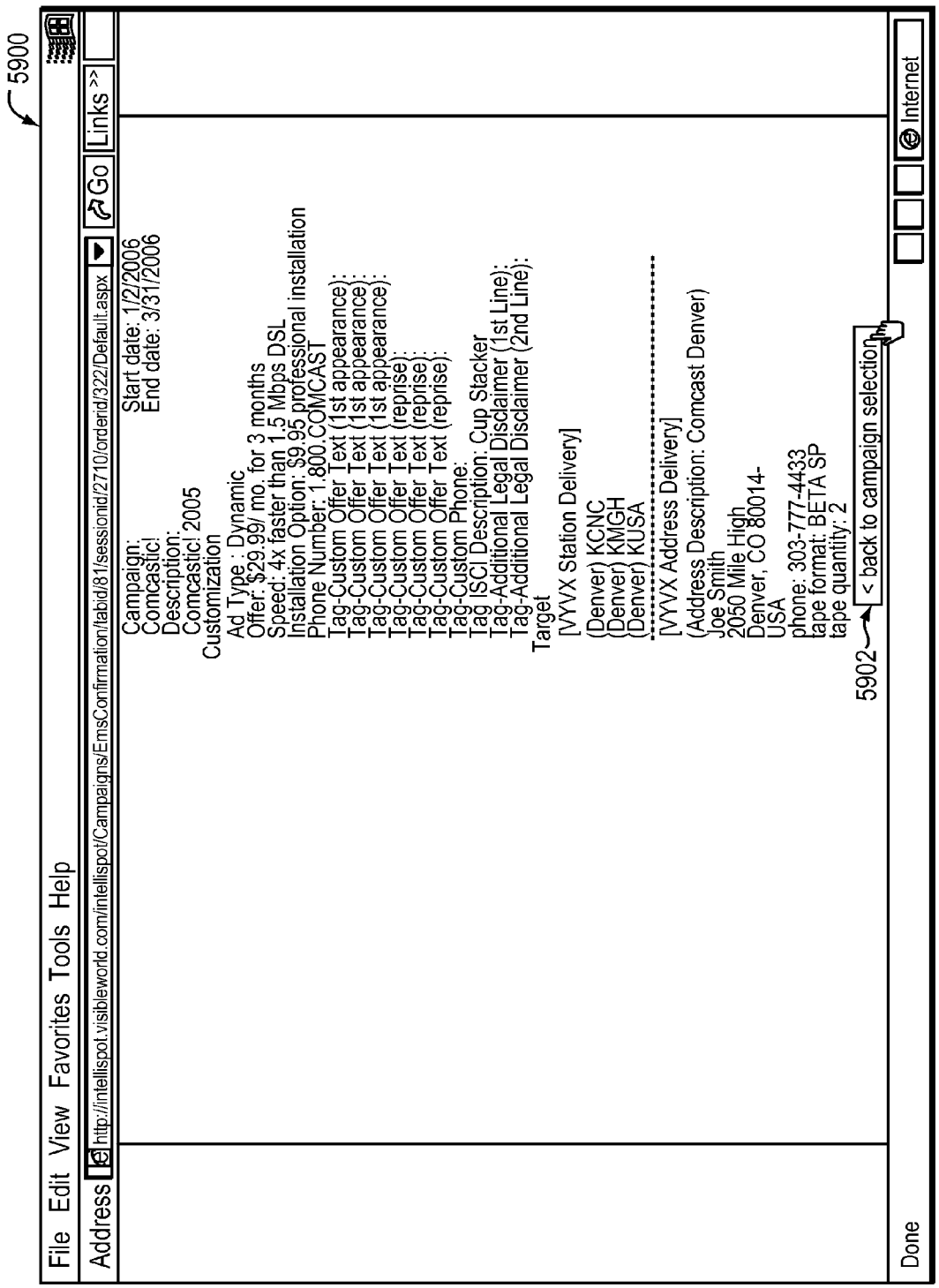

In response to reviewing the ordering information, the media content management application allows the user to submit the order by, for example, selecting a submit button 5712. In response to selecting submit button 5712, the media content management application may provide the user with a confirmation as shown in FIGS. 58 and 59. The confirmation display 5800 may include, for example, an order number, playback information, an Industry Standard Commercial Identifier (ISCI) code 5802, the title of the version of media content, the chargeback number associated with the user, and other information associated with the version of media content. It should be noted that ISCI code 5802 may be associated with the assembled version of media content (e.g., a version of a commercial) when the user has purchased or ordered the media content.

As shown in FIG. 59, the user may return to create additional versions of media content (e.g., another version of a commercial) by selecting return button 5902. Alternatively, the media content management application may allow the user to store versions of media content that are assembled by the user in a storage device (e.g., a cache, a hard drive, a database, etc.). At a later time, the media content management application may allow the user to retrieve the stored versions of media content, order some or all of the stored versions, and transmit some or all of the stored versions to stations, content providers, individuals, and the like.

Figure 60:
Figure 61:
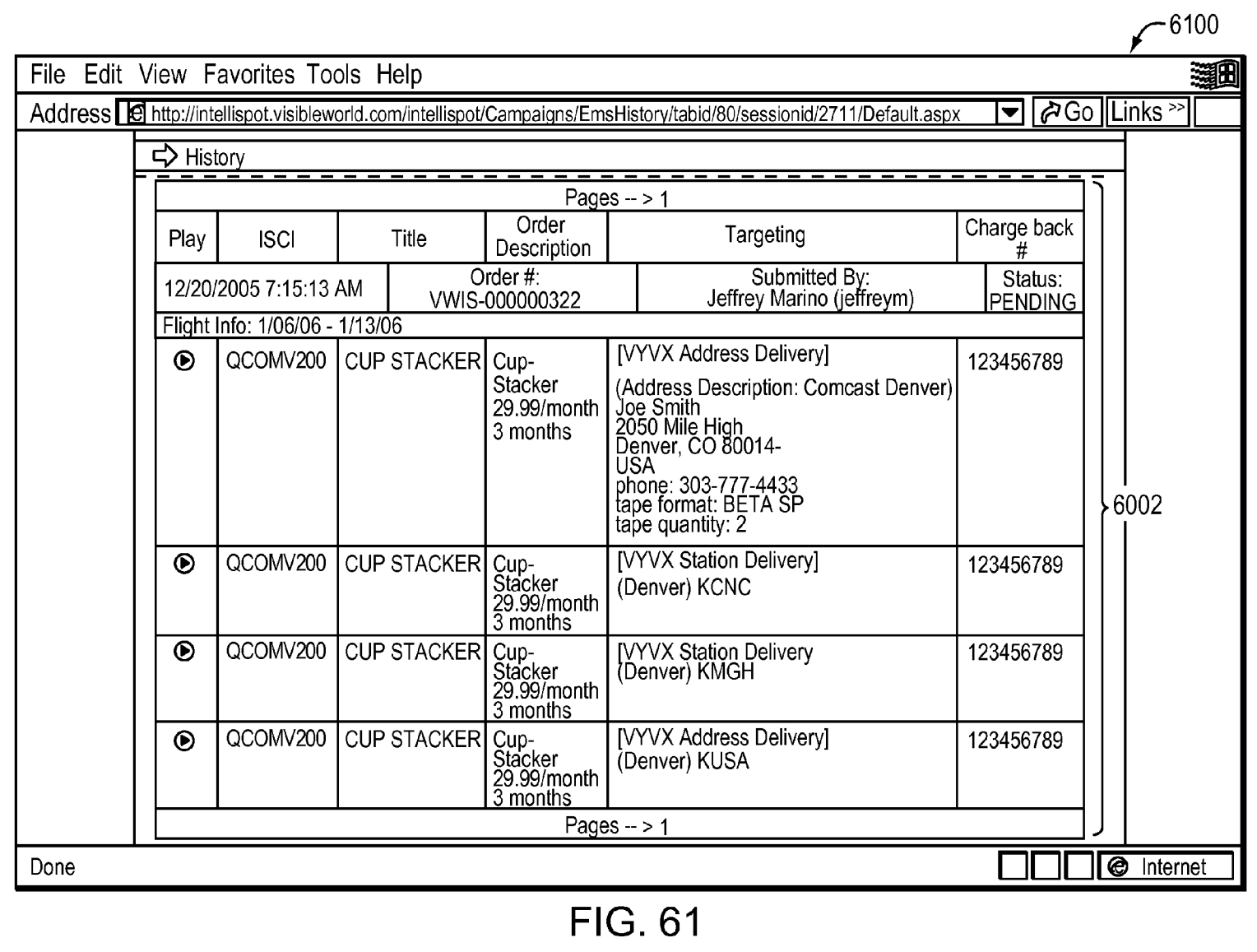
Figure 62:
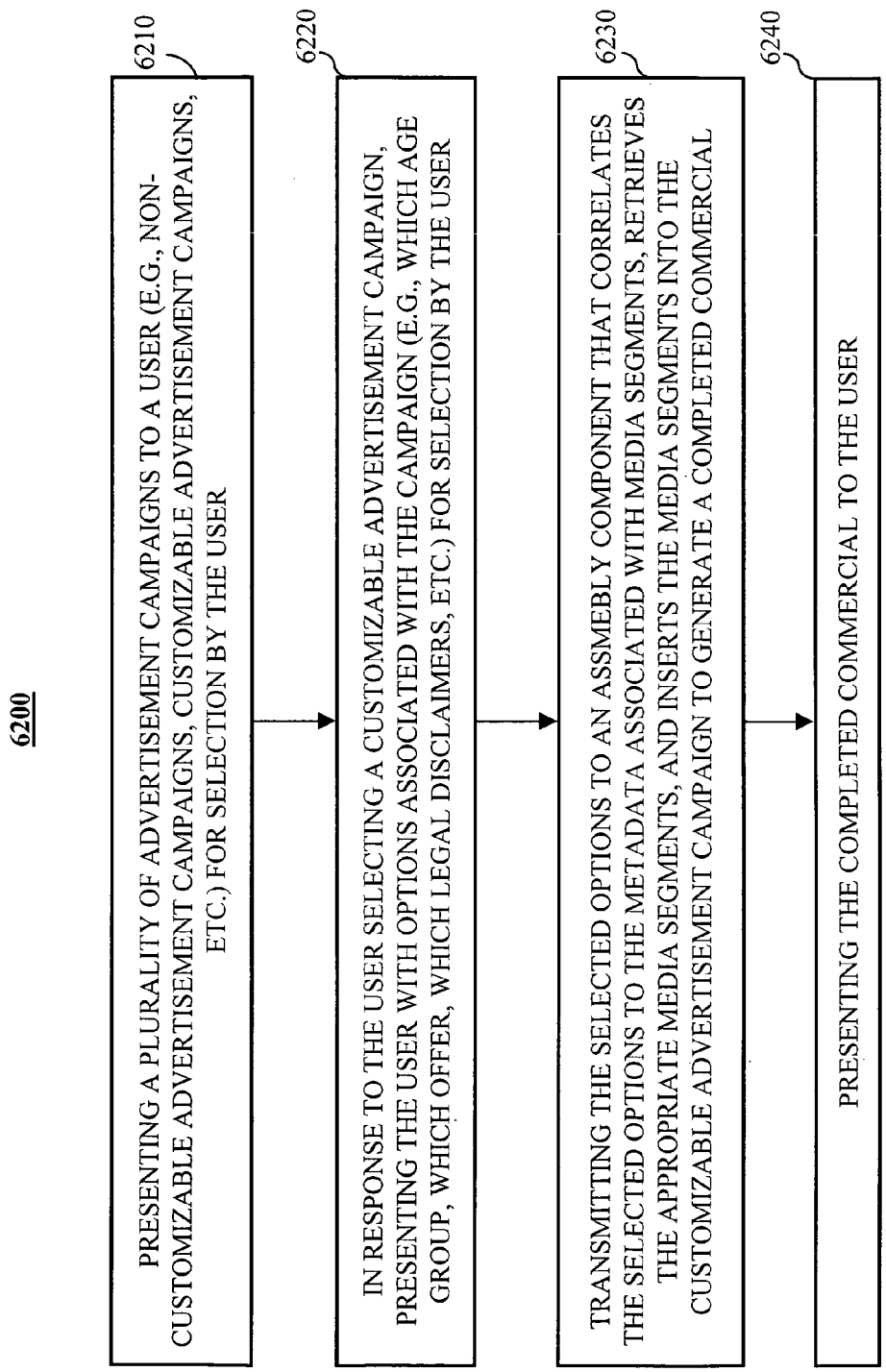
FIG. 62 is a flowchart illustrating the assembly of media content in accordance with some embodiments of the present invention.

As shown in FIGS. 60 and 61, the media content management application may provide the user with history information 6002. For example, in response to selecting a history button 6004, the media content management application may provide the user with a listing of orders placed by the user, versions of media content transmitted by the user, pending orders placed by the user, versions of media content that the user has not completed, versions of media content that the user has stored in a storage device, etc. As shown in FIGS. 60 and 61, screens 6000 and 6100 provide the user with the order placed by the user, each delivery point associated with the order, and other ordering information.

In some embodiments, the media content management application may provide the user with feedback. For example, the content management application may inform the user that particular media content is not effective for the targeted audience. In response, the media content management application may provide the user with recommendations for customizing the media content (e.g., adjust parameters). In another example, the media content management application may receive feedback from stations, individuals, or any other entity receiving the version of media content. In response, the media content management application may automatically assemble an updated version of the media content based on the feedback. Alternatively, the media content management application may inform the user of the received feedback.

In some embodiments, the media content management application may provide the user with asset management features. For example, the media content management application may allow the user to store a database of media content. The media content management application may recommend that the user reuse particular media content from the database in, for example, a television spot. In another example, based on feedback, the media content management application may determine which media segments (e.g., audio clips, video clips, static images, etc.) stored in a database should be retained (e.g., based on feedback, based on the number of times a media segment is used in media content, based on the number of times a media segment is retrieved from the database, based on the number of times a media segment is fast-forwarded by an audience member, based on the number of times an audience member tunes away from the media content that includes the media segment, based on the number of times an audience member rewinds media content that includes the media segment, etc.).

Turning to FIGS. 62-69, simplified flowcharts illustrating the steps performed in providing a media content management application in accordance with some embodiments of the present invention are provided. These are generalized flow charts. It will be understood that the steps shown in FIGS. 62-69 may be performed in any suitable order, some may be deleted, and others added.

Generally, process 6200 begins by presenting one or more advertisement campaigns to a user (step 6210). The advertisement campaigns may include customizable advertisement campaigns and non-customizable advertisement campaigns. The media content management application may prompt the user to select one of the advertisement campaigns. It should be noted that the media content management application may sort the advertisement campaigns by, for example, product or service, advertiser, marketer, etc.

In response to the user selecting a customizable advertisement campaign, the media content management application presents the user with semantic criteria and options associated with the advertisement campaign. The semantic criteria and options may include, for example, options relating to the product (e.g., a speed comparison option 2202 of FIG. 22), options relating to the offer (e.g., a pre-defined offer 2404 or a customized offer 2408 of FIG. 24), legal disclaimers, options relating to the style of the advertisement, options relating to the type of product or service, options relating to the gender of the target audience (e.g., male or female), options relating to the affluence of the target audience (e.g., an income greater than $70,000), options relating to the ethnicity of the target audience (e.g., Caucasian, African-American, etc.), options relating to the geography of the target audience (e.g., Northeast USA, New York City, Europe, Japan, etc.), etc. Any other suitable criteria may also be provided. For example, criteria relating to the target audience's likes and dislikes (e.g., the intended audience likes sports-related commercials, the intended audience likes advertisements with dogs in it, etc.) may be provided. The media content management application allows the user to response to each of the semantic criteria and/or options.

Using the user's responses to the semantic criteria, the media content management application provides the user with semantic editorial control. Based on the responses to each of the questions, the media content management application may transmit the responses to semantic criteria to an editing/assembly software package to determine which media segments are associated with the responses (step 6230). Each of the media segments has metadata associated with it. The responses are interpreted by the editing/assembly software package and correlated with the metadata. Using the metadata, the editing/assembly software package retrieves the corresponding media segments from a database or other storage device and inserts the media segments into the customizable advertisement campaign, thereby generating a completed version of a commercial.

The media content management application then presents the completed version of the commercial to the user (step 6240). For example, the media content management application may provide the user with a preview window to review the completed version of the commercial. In another example, the media content management application may transmit the completed version of the commercial to the user for review (e.g., by e-mail, by mail, etc.).

Figure 63:
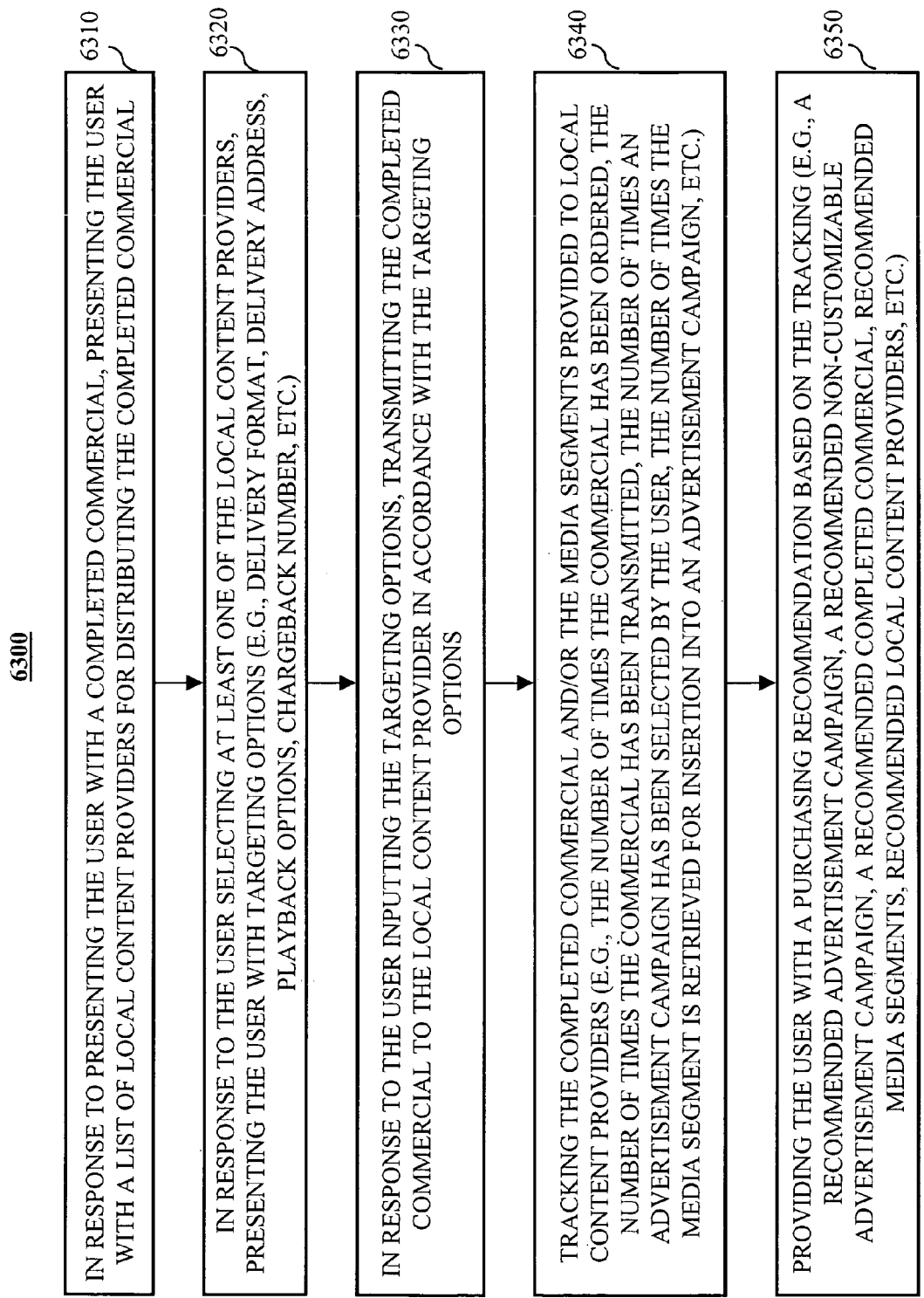
FIG. 63 is a flowchart illustrating the delivery of media content to recipients, tracking the delivered media content, and providing purchasing recommendations to the user in accordance with some embodiments of the present invention.
Figure 64:
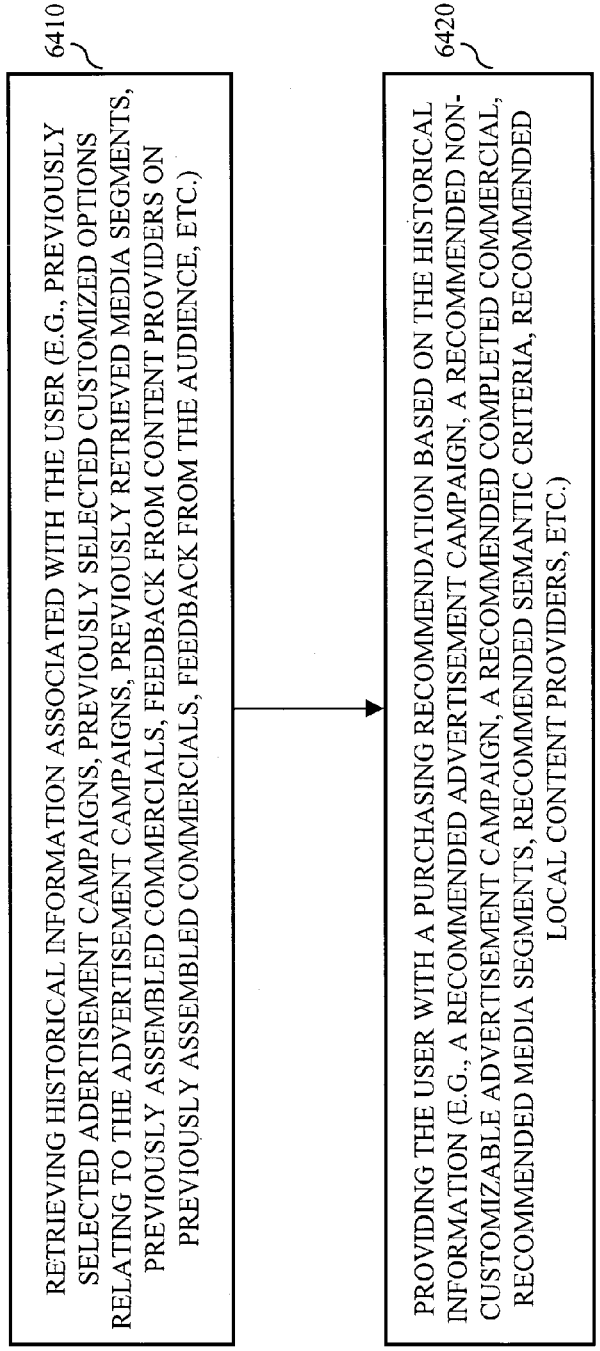
FIG. 64 is a flowchart illustrating the recommendation features of the media content management application in accordance with some embodiments of the present invention.
Figure 66:
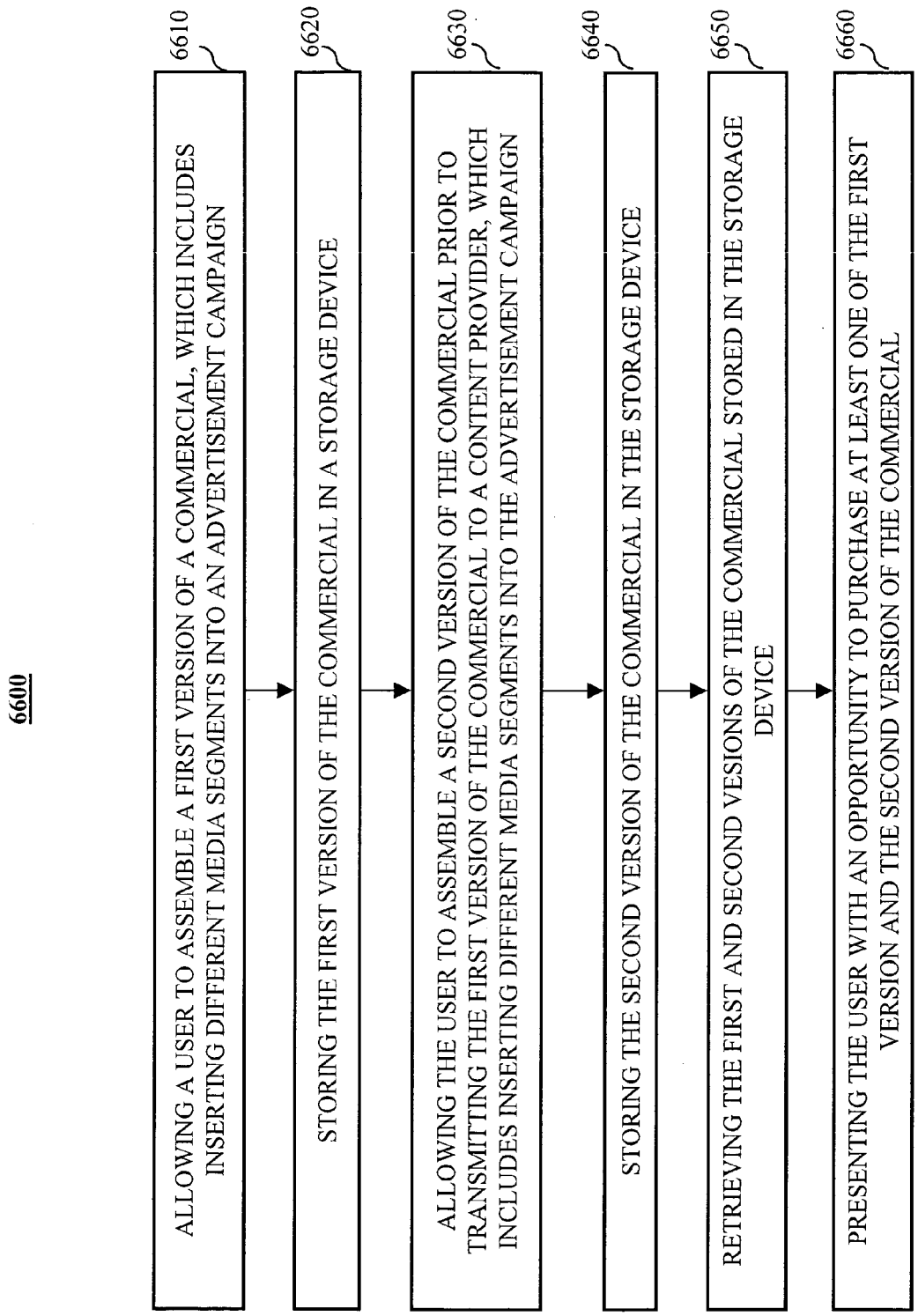
FIGS. 66-67 are flowcharts illustrating the ordering features of the media content management application in accordance with some embodiments of the present invention.
Figure 67:
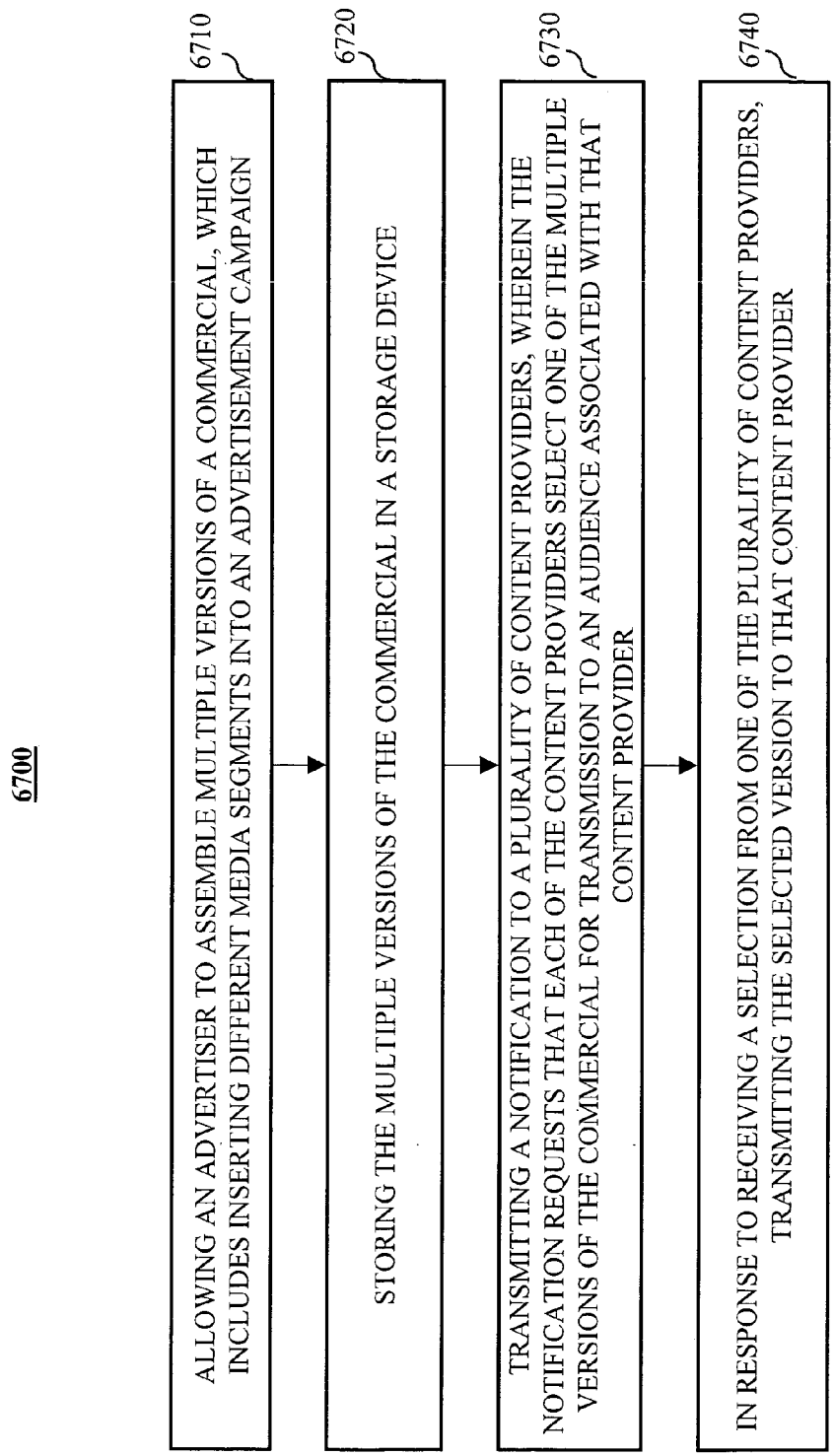
Figure 68:
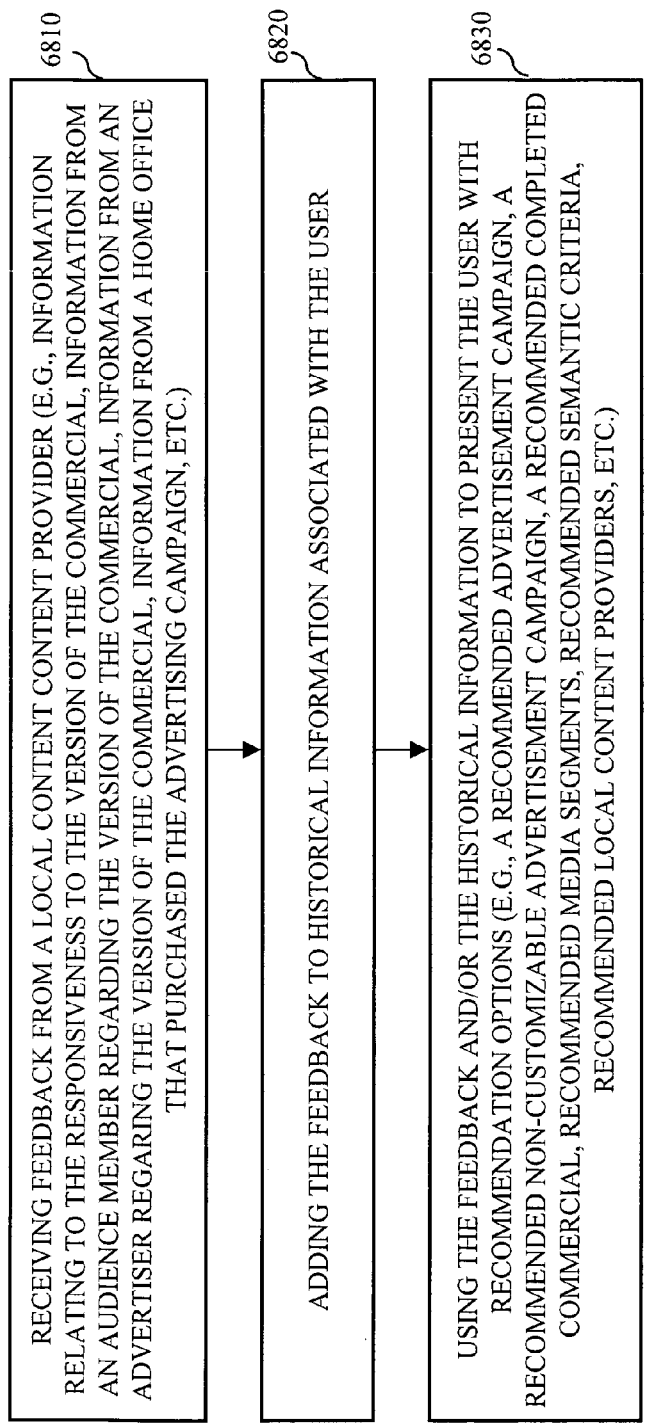
FIG. 68 is a flowchart illustrating the feedback features of the media content management application in accordance with some embodiments of the present invention.

In some embodiments, the media content management application may allow the user to transmit the completed version of the commercial to others (e.g., television stations, local content providers, other viewers, etc.). FIG. 63 is a simplified flowchart illustrating the steps performed in providing distribution and tracking features in accordance with some embodiments of the present invention. It should be noted that although FIG. 63 and the following embodiments of the present invention generally relate to providing a completed commercial, these embodiments are not limited only to providing a commercial. Rather, the invention may also be applied to any suitable media.

As shown in process 6300, in response to presenting the user with a completed commercial, the media content management application presents the user with a list of television stations, local content providers, and other entities for distributing the completed version of the commercial (step 6310). For example, the media content management application may provide the user with a list of available television stations, where each station has delivery information associated with it (e.g., desired format, delivery address, etc.). In another example, the media content management application may allow the user to enter an address to distribute the completed version of the commercial.

In some embodiments, in response to the user selecting one or more television stations, local content providers, or other entities, the media content management application may provide the user with targeting options (e.g., delivery format, delivery address, playback options, chargeback number, etc.) (step 6320). In some embodiments, the media content management application may allow the user to set targeting options for each content provider that receives the assembled commercial. For example, the user may transmit the assembled commercial to an address for Comcast Denver in MPEG-2 format, where the content is to be played back only between the hours of 9 AM and 12 PM. The user may transmit the same assembled commercial to a different television station in Denver in an uncompressed HD format (e.g., electronically) and a DVD format (e.g., by mail).

It should be noted that, in response to the user inputting a chargeback number, the media content management application may automatically track which users are ordering media content. For example, when a parent company purchases an advertisement campaign that is customized by its local offices, the media content management application may track the customizations and orders by each local office and bill each local office accordingly.

It should also be noted that playback information may include, for example, a transmission time (e.g., PM only, primetime, etc.), a transmission date (e.g., January $6^{th}$ through January $13^{th}$), a delivery location, offers relating to the completed commercial, etc. For example, the media content management application may allow the user to create a first commercial that is to be distributed to the New York, N.Y. audience for playback between the hours of 9 AM and 5 PM and a second commercial that is to be distributed to the New York, N.Y. audience for playback between the hours of 6 PM and 12 AM.

In response to receiving the targeting options from the user, the media content management application transmit the commercial to the one or more television stations, content providers, or other entities in accordance with the targeting options (step 6330). Using one or more of the targeting options and/or other semantic criteria, the media content management application tracks the completed commercial and its associated media segments provided to the content provider (step 6340). For example, the media content management application may record the number of times the commercial has been ordered, the number of times the commercial has been transmitted by the user, the number of times the commercial has been broadcast by the recipient, the number of times the commercial has been fast-forwarded or rewinded by an audience member, the number of times the advertisement campaign has been selected by the user, the number of times the media segment is retrieved for insertion into an advertisement campaign, etc.

In some embodiments, the media content management application may provide the user with a purchasing recommendation based on the tracking information retained by the application (step 6350). For example, the media content management application may provide the user with a recommended advertisement campaign, a recommended assembled commercial, recommended media segments, recommended recipients or delivery points, etc. In another example, the media content management application may preselect responses to semantic criteria based on the tracking information. When one version of a commercial has multiple audience members rewinding using a digital video recorder to replay the version of the commercial, the media content management application may interpret that to rank the offer provided in the commercial (e.g., $1 for the first month) higher than other available offers (e.g., free installation, 50% for the first two months, etc.).

In some embodiments, the media content management application may provide the user with a purchasing recommendation using other information. As shown in process 6400 of FIG. 64, the media content management application may retrieve historical information associated with the user (step 6410). The media content management application may perform this in response to, for example, the user logging into the media content management application, the user entering a chargeback number, etc. The media content management application may provide the user with a purchasing recommendation based on the retrieved historical information (step 6420). Again, the media content management application may provide the user with a recommended advertisement campaign, a recommended assembled commercial, recommended media segments, recommended semantic criteria, recommended recipients or delivery points, etc.

In some embodiments, the media content management application may monitor the station or entity that receives the media content. As shown in process 6500 of FIG. 65, the media content management application may determine whether the recipient has distributed the version of media content in accordance with the playback information or playback rules (step 6510). As described above, playback information may include, for example, a transmission time (e.g., PM only, primetime, etc.), a transmission date (e.g., January 6$^{th}$ through January 13$^{th}$), a delivery location, offers relating to the completed commercial, etc. If the station or entity has not complied with the playback information, the media content management application may prevent the station or entity from distributing media content (step 6520). Alternatively, the media content management application may send the user a notification that the station or entity has not complied with the playback information. In another suitable embodiment, the media content management application may prevent the user from transmitting other commercials or media content to the recipient.

In some embodiments, the media content management application may allow the user to simultaneous order multiple versions of a commercial using a shopping cart. At step 6610, the media content management application allows the user to assemble a first version of a commercial. As described previously, based on the responses to semantic criteria, the media content management application transmits the responses to an editing/assembly software package that determines which media segments are associated with the responses. Each of the media segments has metadata associated with it. The responses are interpreted by the editing/assembly software package and correlated with the metadata. Using the metadata, the editing/assembly software package retrieves the corresponding media segments from a database or other storage device and inserts the media segments into an advertisement campaign, thereby generating the first version of a commercial. Prior to ordering the first version of the commercial, the media content management application stores the first version in a storage device (step 6620). Similar to step 6610, the media content management application allows the user to assemble additional versions of the commercial or a version of a different commercial (step 6630). Prior to ordering the second version of the commercial, the media content management application also stores the second version in the storage device (step 6640).

In response to receiving an indication that the user is prepared to order one or more of the stored versions of commercials, the media content management application may retrieve the first and second versions of the commercial stored in the storage device (step 6650). It should be noted that the first and second versions may be created using the same advertisement campaign or different advertisement campaigns. It should also be noted that the media content management application may retrieve from the storage device any assembled commercials or media content that the user has not purchased.

The media content management application presents the user with an opportunity to purchase at least one of the first version and the second version of the commercial (step 6660). For example, the user may select one or more versions in the shopping cart or list for ordering. The media content management application may allow the user to provide delivery information and playback information for each version.

In some embodiments, the media content management application may allow the user to create versions of a commercial and request that the recipient (e.g., television stations, content providers, individuals, etc.) select which version to receive. As shown in process 6700 of FIG. 67, the media content management application allows an advertiser or another suitable user to assemble multiple versions of a commercial (step 6710). As described previously, based on responses to semantic criteria, the media content management application transmits the responses to an editing/assembly software package that determines which media segments are associated with the responses. Each of the media segments has metadata associated with it. The responses are interpreted by the editing/assembly software package and correlated with the metadata. Using the metadata, the editing/assembly software package retrieves the corresponding media segments from a database or other storage device and inserts the media segments into an advertisement campaign, thereby generating a version of a commercial. The user may repeat step 6710 to create multiple versions of a commercial. Each version of the commercial is stored in a storage device (step 6720).

The media content management application transmits a notification to a plurality of recipients (step 6730). The notification requests that the recipient selects one or more of the multiple versions of the commercial. For example, the media content management application may provide a recipient with access the media content management application and present the multiple versions of the commercial to the recipient. In response to receiving a selection from the recipient, the media content management application transmits the selected version or versions to the recipient. In turn, the recipient (e.g., a television station) may broadcast the selected version of the commercial to an intended audience.

In some embodiments, the media content management application may receive feedback from recipients of the media content. As shown in process 6800 of FIG. 68, the media content management application may use feedback to provide the user with a purchasing recommendation. At step 6810, the media content management application may receive feedback from a recipient (e.g., a local content provider, a television station, etc.). Feedback may include, for example, information relating to the responsiveness of the version of the commercial (e.g., ratings, rankings, statistical information, viewer comments), information from an audience members regarding the commercial, information from an advertiser regarding the version of the commercial (e.g., the version did not comply with the advertiser's rules), information from a home office that purchased the advertising campaign (e.g., comments the home office has received), etc. The media content management application adds the feedback to historical information that is associated with the user (step 6820). Using the feedback and/or historical information, the media content management may provide the user with a purchasing recommendation (step 6830). The media content management application may provide the user with a recommended advertisement campaign, a recommended assembled commercial, recommended media segments, recommended semantic criteria, recommended recipients or delivery points, etc.

Figure 69:
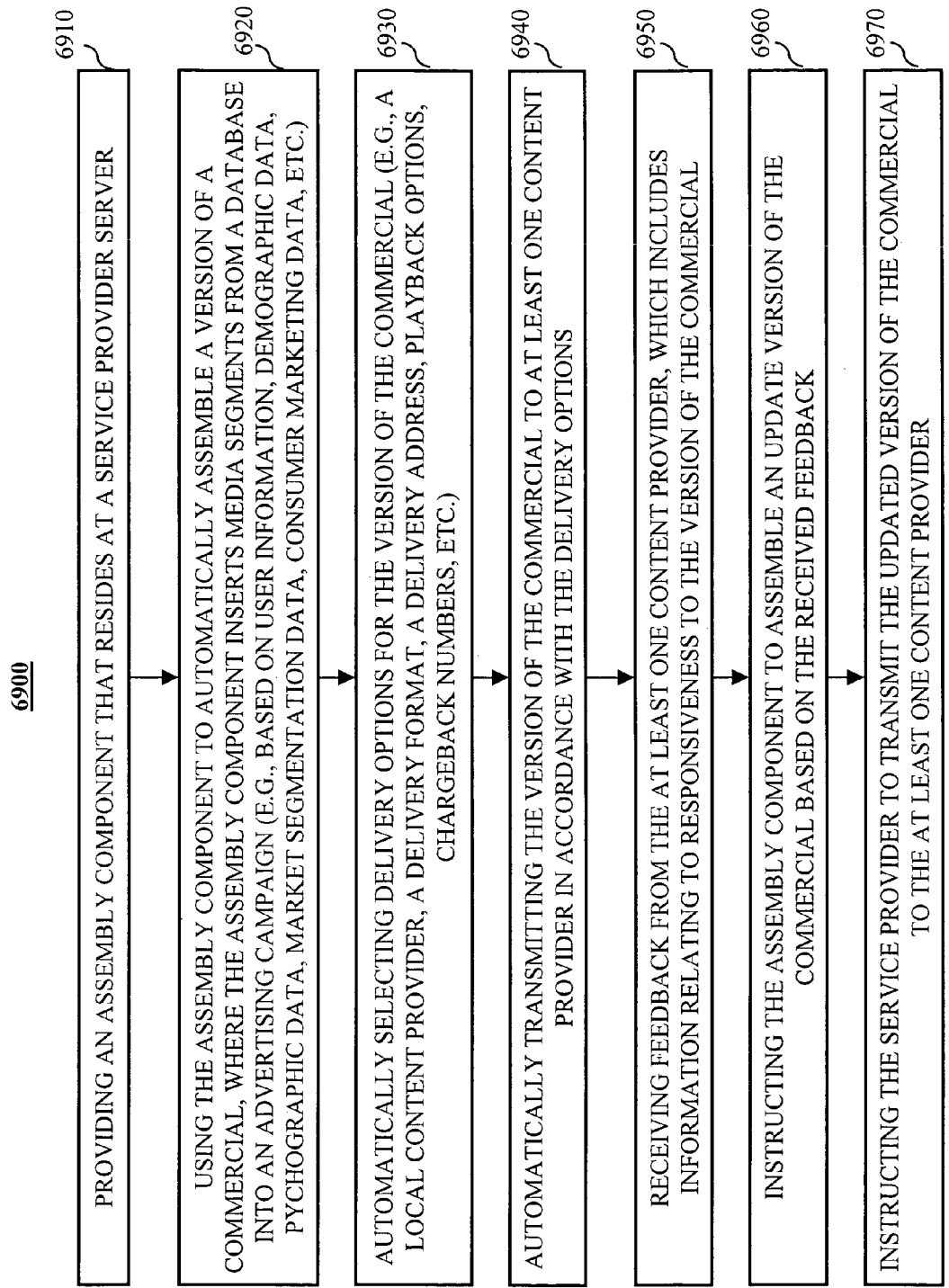
FIG. 69 is a flowchart illustrating the automatic updating features of the media content management application in accordance with some embodiments of the present invention.

In some embodiments, the media content management application may use the received feedback to automatically update commercials. FIG. 69 is a simplified flowchart illustrating the steps performed in providing automatic updating features in accordance with some embodiments of the present invention. It should be noted that although FIG. 69 and the following embodiments of the present invention generally relate to providing an assembly component that resides at a service provider, these embodiments are not limited only to a service provider. Rather, the invention may also be applied to any suitable computing device (e.g., a server at the television station, a headend, etc.).

Generally, process 6900 begins by providing an assembly component that resides at a service provider or any other suitable computing device that control media content to be broadcast (step 6910). At least a portion of the media content management application resides the assembly component. Using the media content management application of the assembly component, the media content management application automatically assembles a version of the commercial. The assembly component determines which media segments from a database are to be inserted into an advertisement campaign based on, for example, user information, demographic data, pychographic data, market segmentation data, consumer marketing data, census data, or any other suitable information (step 6920).

The media content management application automatically selects delivery options for the version of the commercial (step 6930). For example, the media content management application may select the recipient (e.g., CNBC television station in New York), the delivery format (e.g., MPEG-2 format), a delivery address, playback options (e.g., the commercial is to be played back on Saturday mornings), and other delivery options for the version of the commercial. In response, the media content management application automatically transmits the version of the commercial to the recipient is accordance with the delivery options (step 6940).

In response to receiving feedback (step 6950), the assembly component instructs the media content management application to assemble an updated version of the commercial based on the received feedback (step 6960). For example, the media content management application may receive feedback that the currently broadcasted version of the commercial is being fast-forwarded through eighty percent of the time. As a result, the media content management application may update the semantic criteria (e.g., select a new offer, use media segments having different actors, use media segments having different background music, etc.) and assemble an updated version of the commercial.

In response, the media content management application may instruct the service provider to transmit the updated version of the commercial to the recipient.

In some embodiments of the present invention, the media content management application may include features for determining which content should be provided to a particular users of a particular location. For example, the content management application may allow the user to create a prototype city for which certain media content may be provided. Media content that includes offers and products may be applied to a prototype city. In turn, the prototype cities may be applied to actual cities (e.g., apply the analysis of a Pleasantville prototype city to New York, N.Y.). Using these features, the media content management application may provide the user with recommendations (e.g., recommended commercials, recommended semantic criteria, etc.) or provide the user with an estimation of the effectiveness of an assembled version of a commercial. Alternatively, the media content management application may use the information to automatically retrieve media segments from a database, automatically transmit media content to particular recipients, etc.

Figure 70:
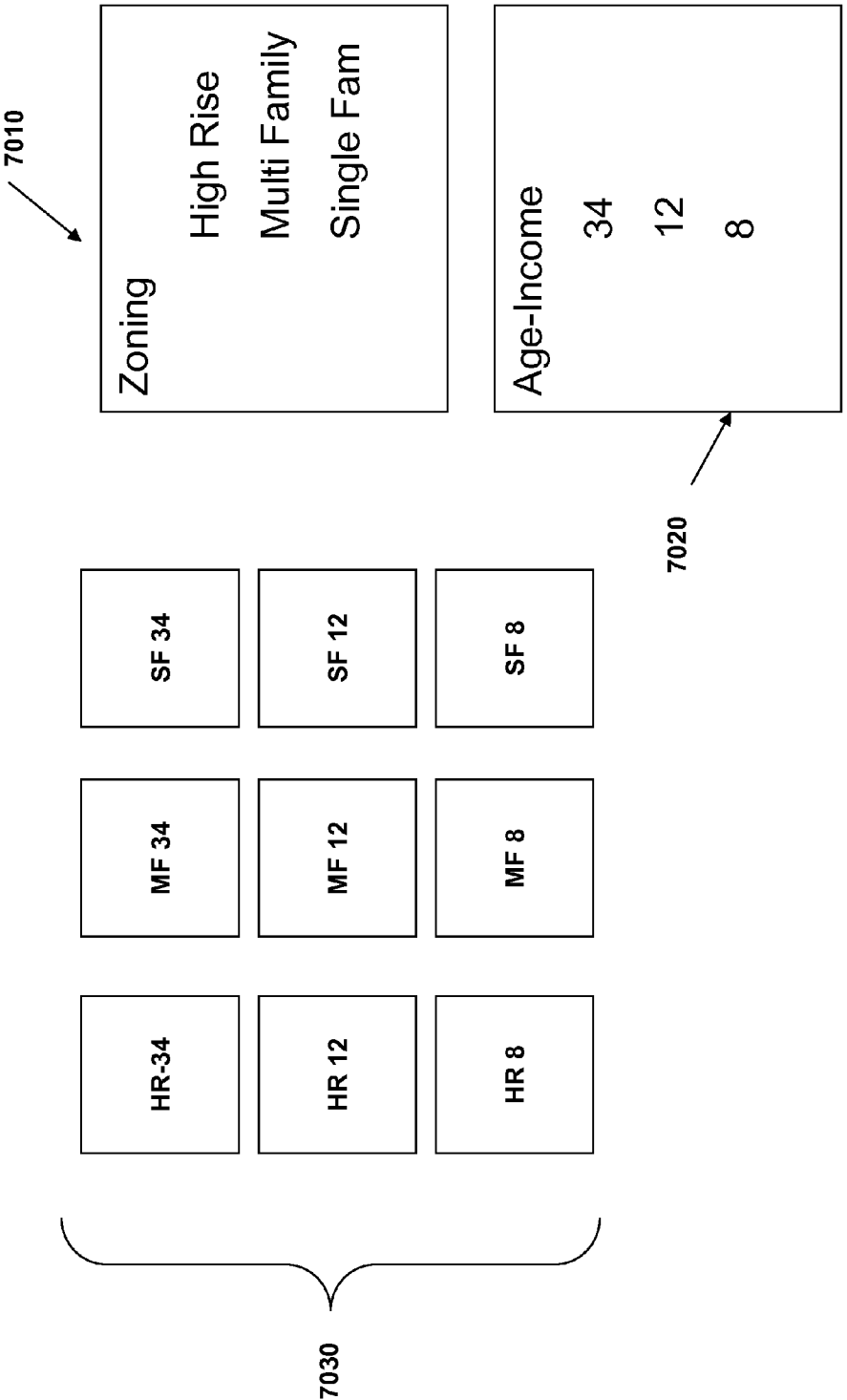
FIG. 70 is an illustrative description of creating and applying a prototype city to a real city that may be provided in accordance with some embodiments of the present invention.

In some embodiments, the media content management application may allow the user to create a prototype city. For example, as shown in FIG. 70, the media content management application allows a user to indicate different criteria (e.g., zoning criteria 7010 and age-income index 7020). Any suitable criteria may also be used (e.g., age, income level, ethnicity, vehicle propensity, number of children, housing, employment, zip code, address, etc.). It should also be noted that the criteria used for creating a prototype city may be similar to the semantic criteria used to generate versions of media content. In response to providing the media content management application with zoning criteria 7010 and age-income index 7020, the media content management application generates a matrix for the prototype city. As shown in FIG. 70, the prototype city is named "Pleasantville" and the matrix created for Pleasantville has nine segments.

Alternatively, the media content management application may have prototype cities stored in a database, where the user may customize the stored prototype city. For example, the media content management application may have sample prototype cities. The media content management application may allow the user to alter a sample prototype city (e.g., change the demographic information associated with the city, change the market assumptions associated with the city, etc.).

Figure 71:
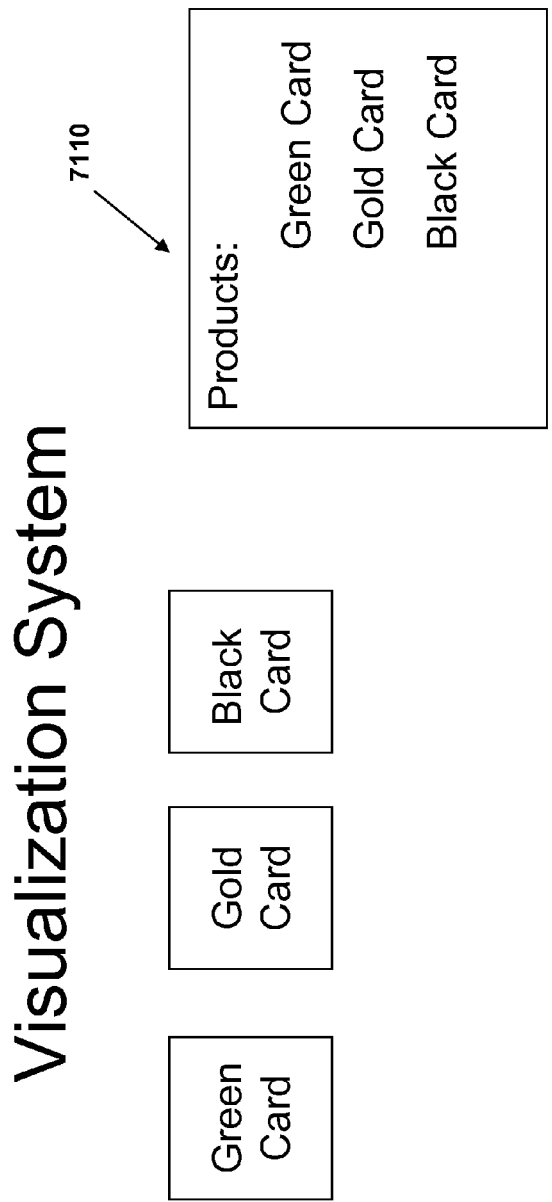
Figure 72:
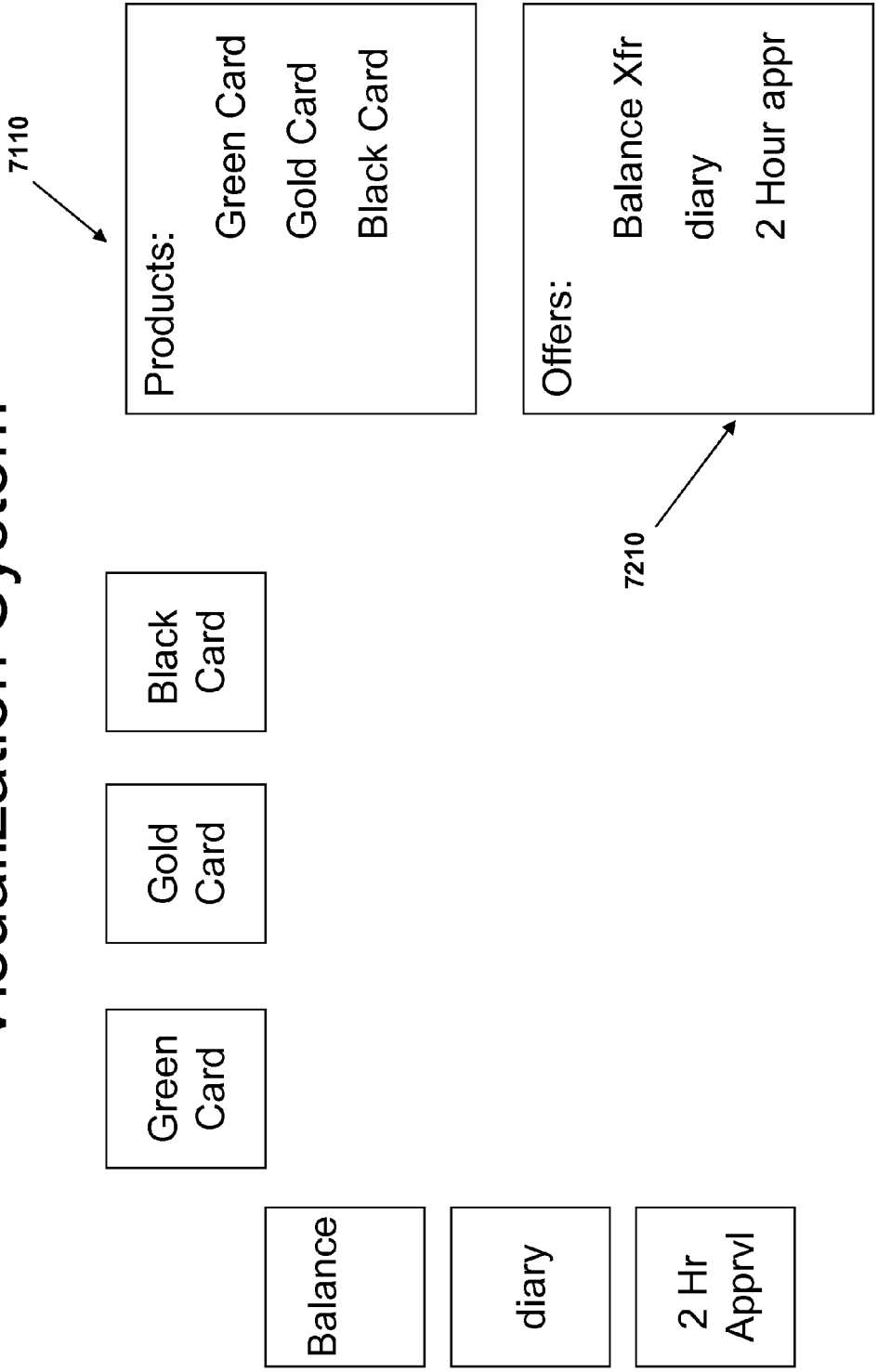
Figure 73:
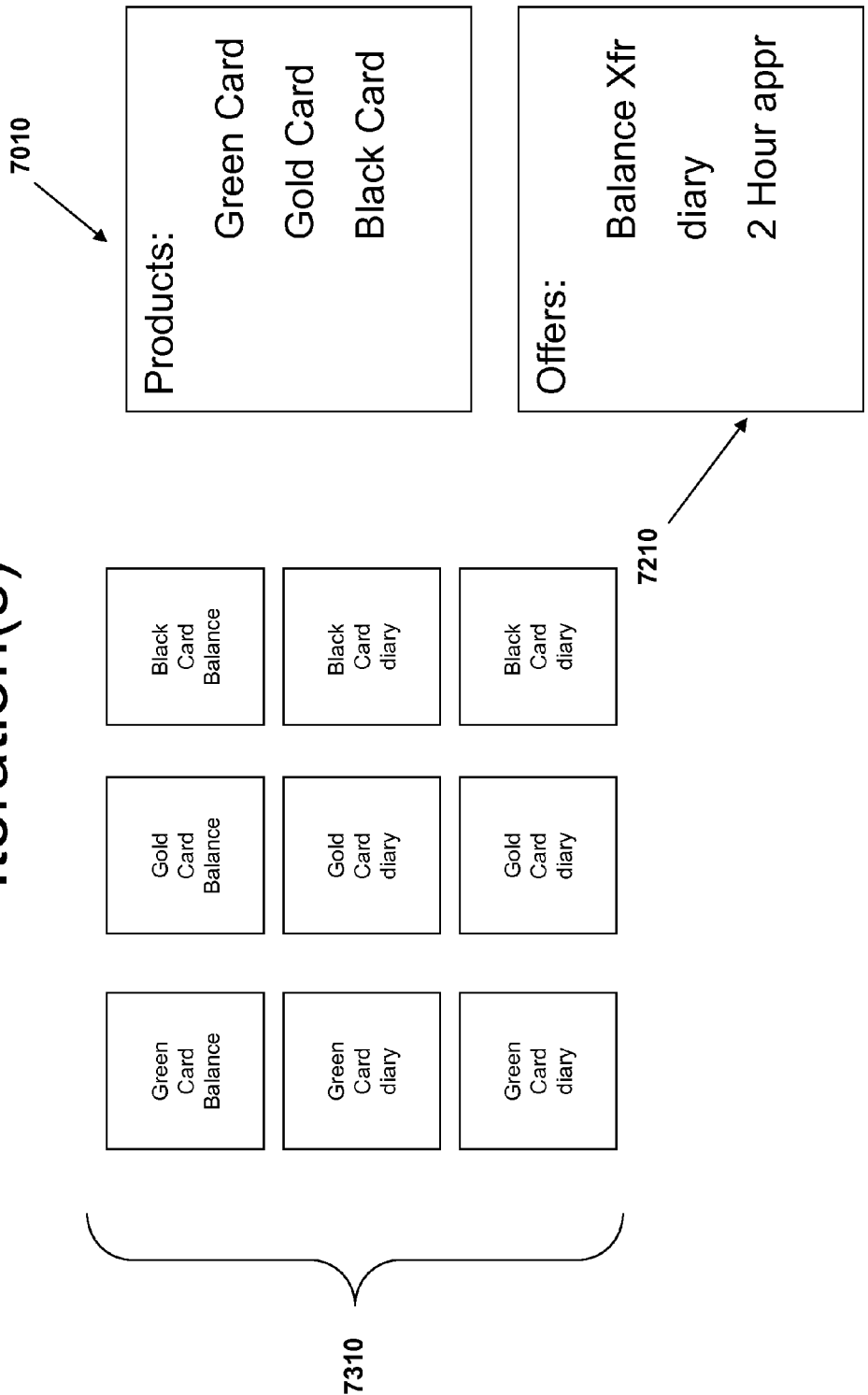

The media content management application allows the user to input, for example, the products and offers related to the media content. As shown in FIG. 71, the user has inputted three credit card products 7110: a green card, a gold card, and a black card. In FIG. 72, the user has inputted three offers for the three credit card product 7210: balance transfers, a diary, and two-hour approval. In response to inputting these products and offers, the media content management application creates a product-offer matrix 7310 as shown in FIG. 73.

Figure 74:
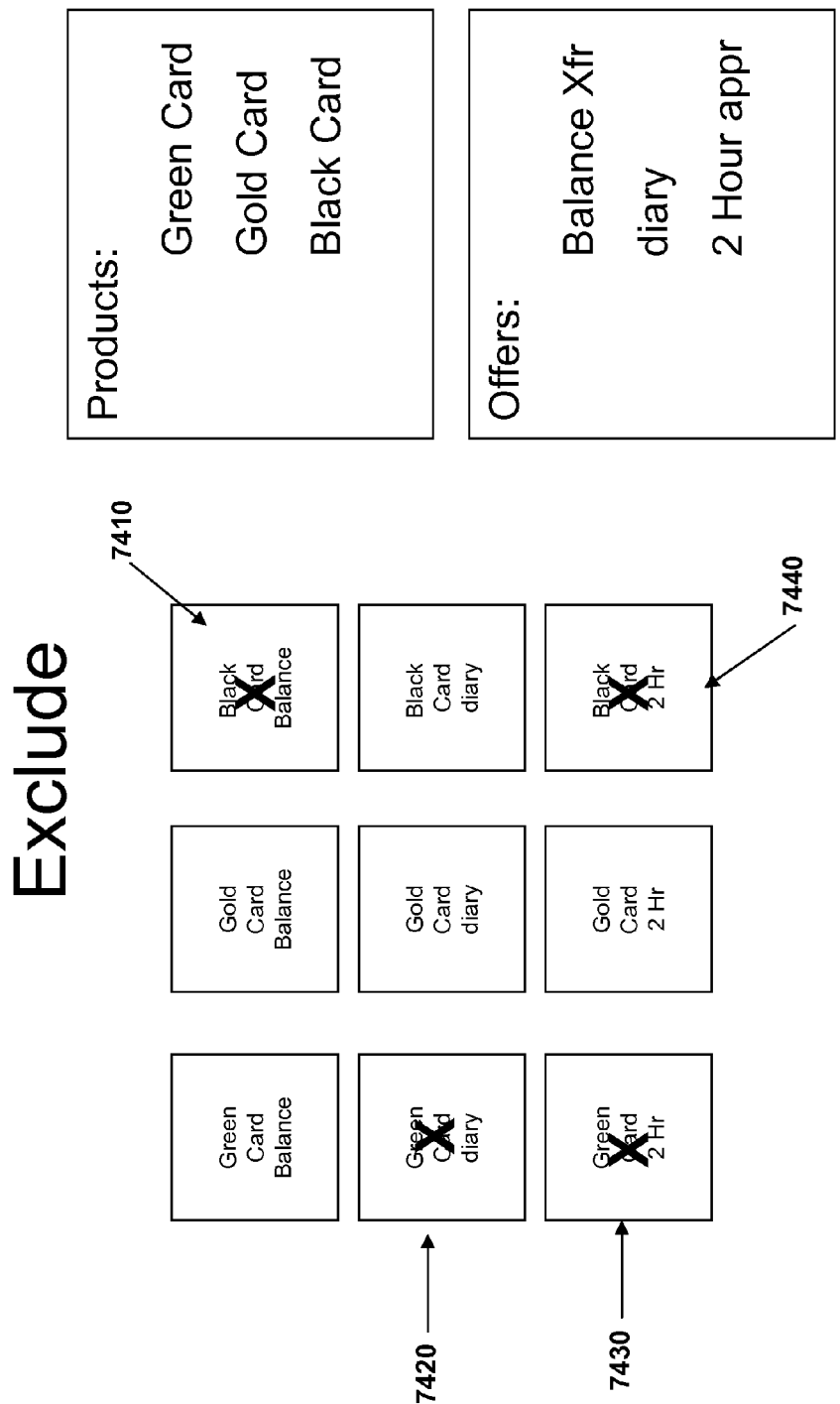
Figure 75:
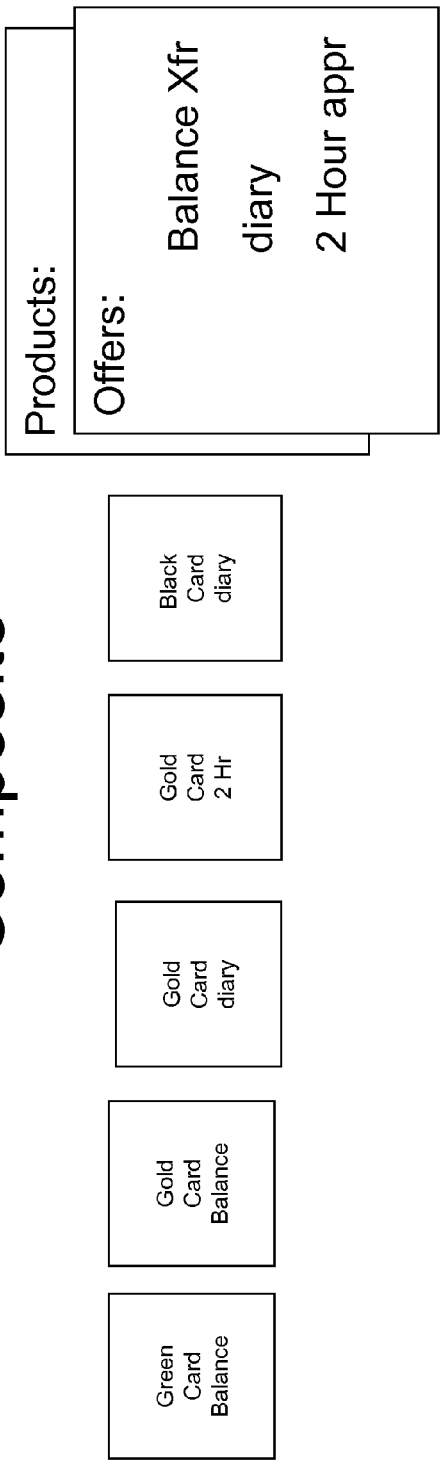

As shown in FIG. 74, the media content management application may allow the user to exclude particular product-offer combinations (e.g., segments 7410, 7420, 7430, and 7440). For example, the user may remove "Black Card Balance" to indicate that the user does not allow the balance transfer offer for the black card. In another example, the user may remove "Green Card 2 Hr" to indicate that the user does not allow the two-hour approval offer for the green card. In another suitable embodiment, the media content management application may automatically remove particular product-offer combinations based on historical information, user demographics, etc. For example, if the media content management application has data indicating that the balance transfer offer with the gold card has never been a popular offer, the media content management application may automatically remove that product-offer combination from the product-offer matrix. The remaining product-offer combinations may be compiled as shown in FIG. 75.

Figure 76:
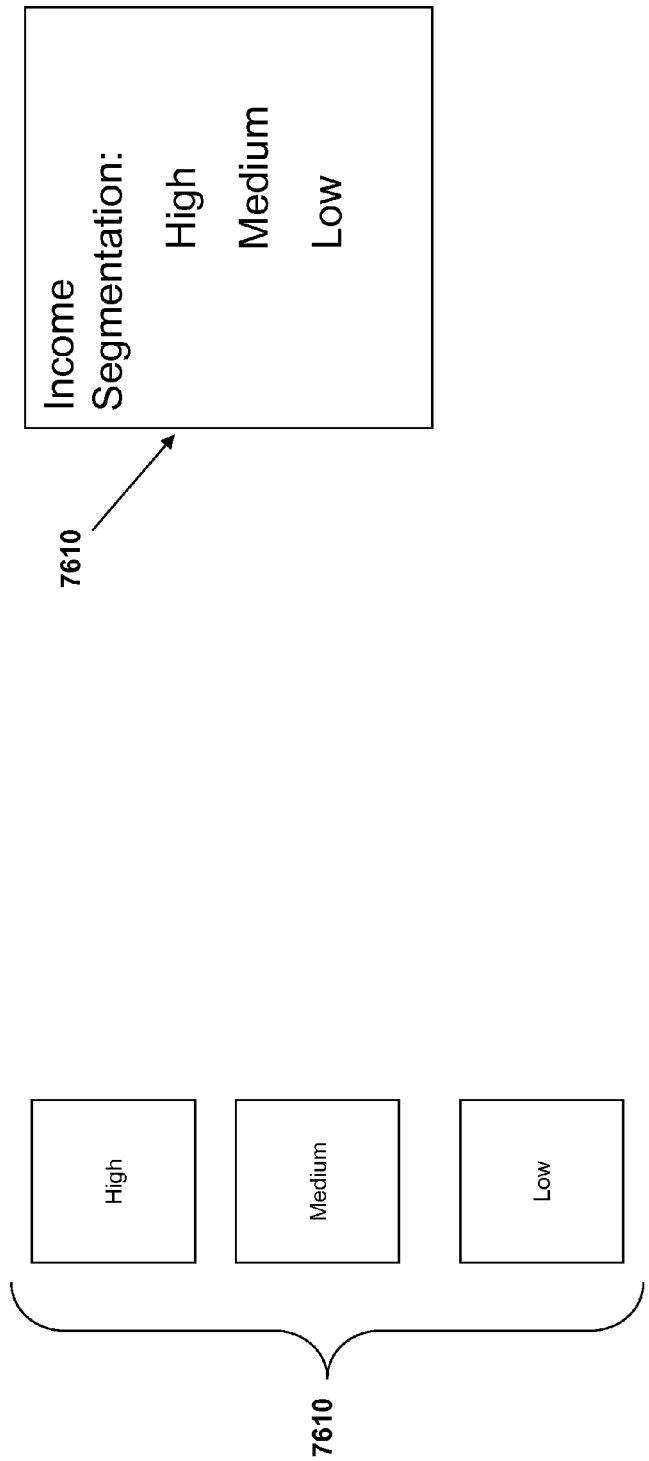
Figure 77:
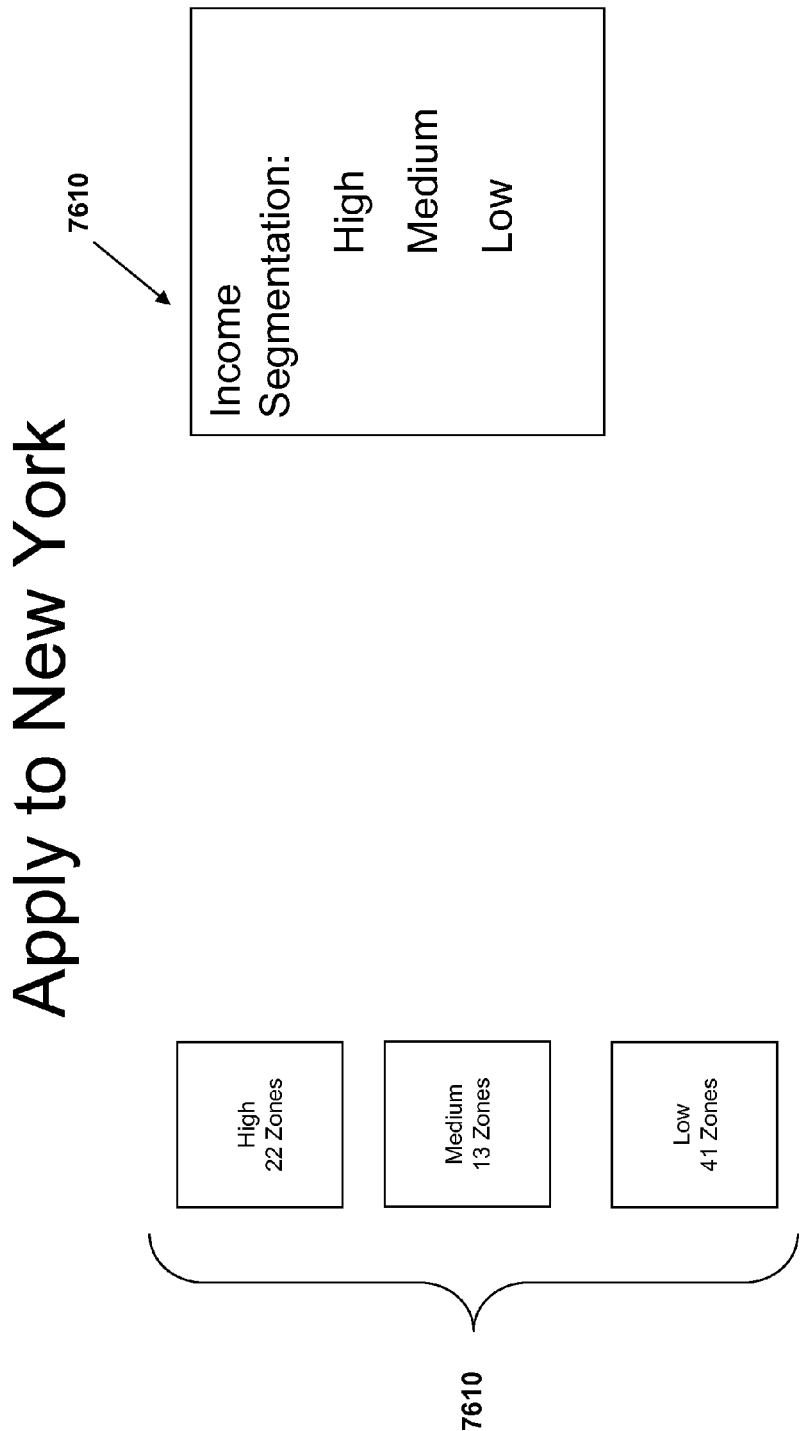
Figure 79:
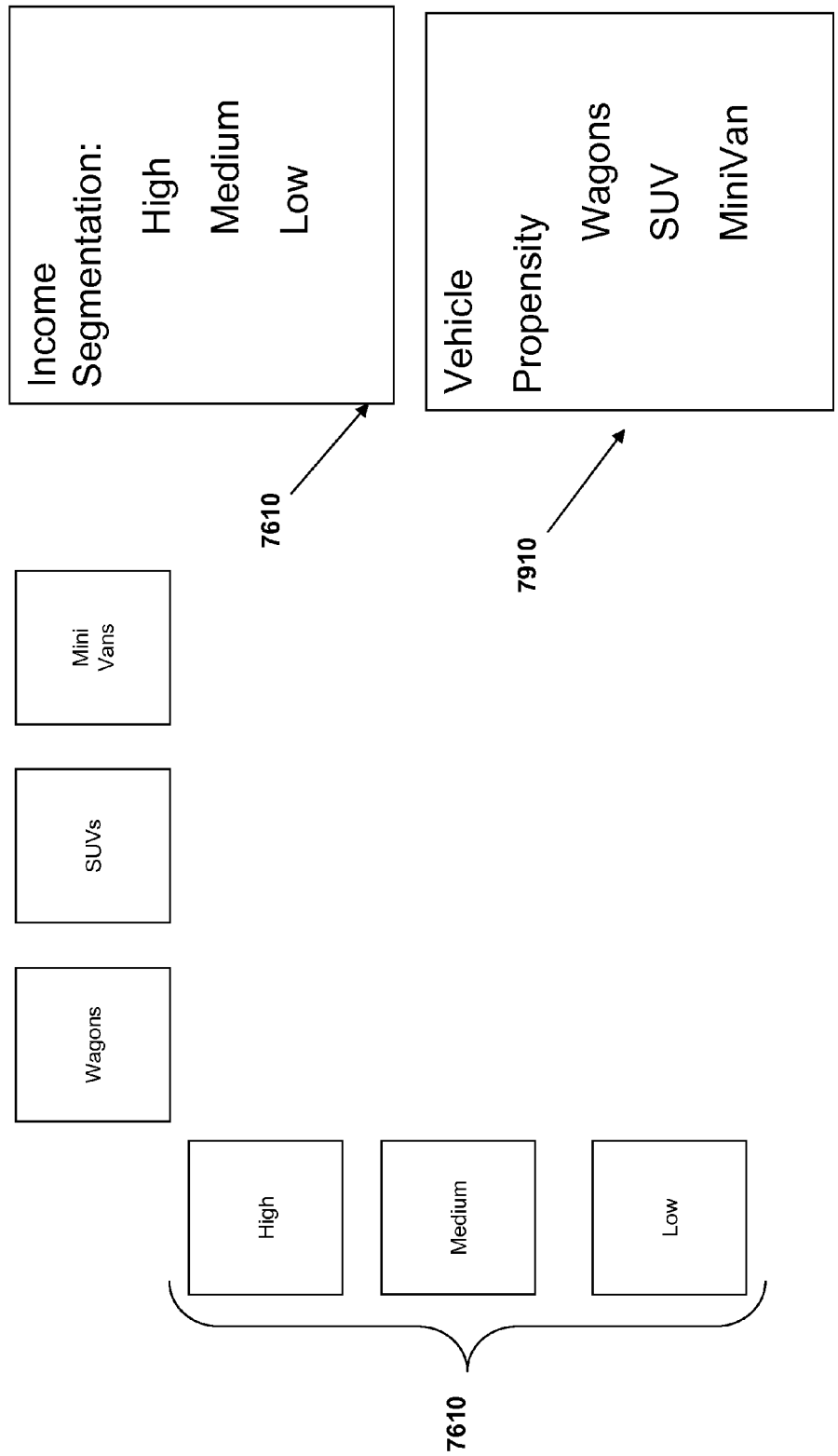
Figure 80:
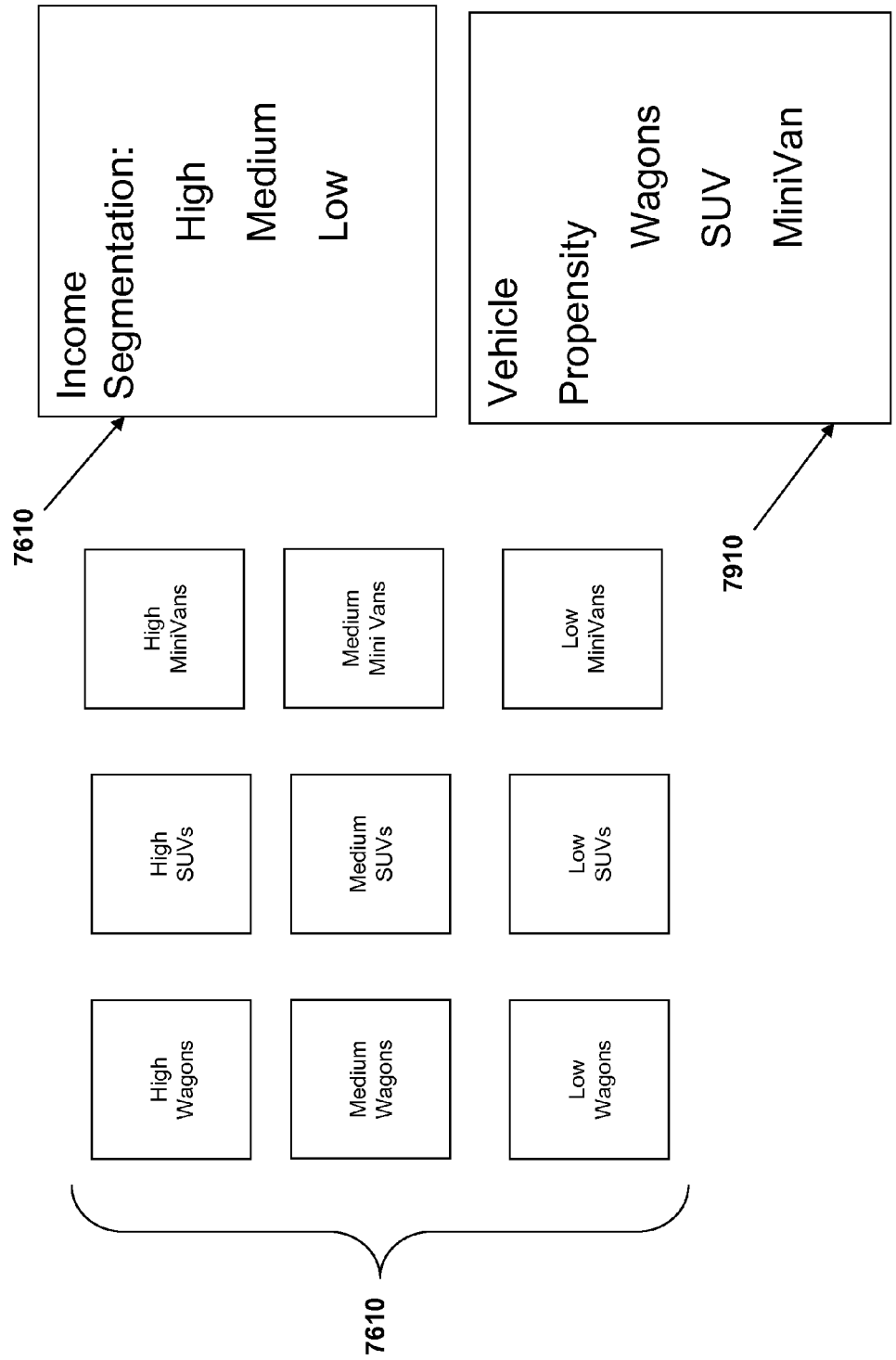

The media content management application may apply the products and offers in product-offer matrix 7310 against the prototype city (e.g., Pleasantville). As shown in FIG. 76, the user has segmented the prototype city of Pleasantville by income segmentation criteria 7610 (e.g., high, medium, and low) and car purchase behavior criteria 7910 (FIG. 79) (e.g., wagons, SUVs, and minivans), thereby creating a matrix 7610 (FIG. 80). In response to the user selecting a real city (e.g., New York, N.Y.), the media content management application may apply the prototype city against the selected real city. As shown in FIG. 77, for income segmentation criteria 7610, the prototype city applied against New York, N.Y. has yielded results of 22 zones of "High" income segmentation, 13 zones of "Medium" income segmentation, and 41 zones of "Low" income segmentation in matrix 7610.

Figure 78:
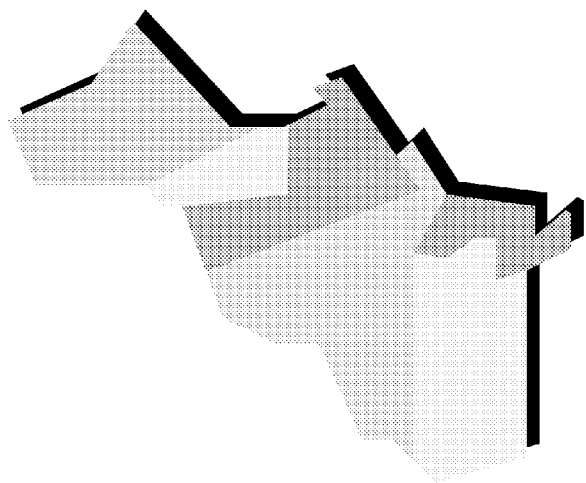

It should be noted that the media content management application may allow the user to select a region for application by the prototype city. For example, FIG. 78 shows that the user may be provided with image zones that allow the user to select one or more cities, states, or regions for applying against the prototype city.

Figure 81:
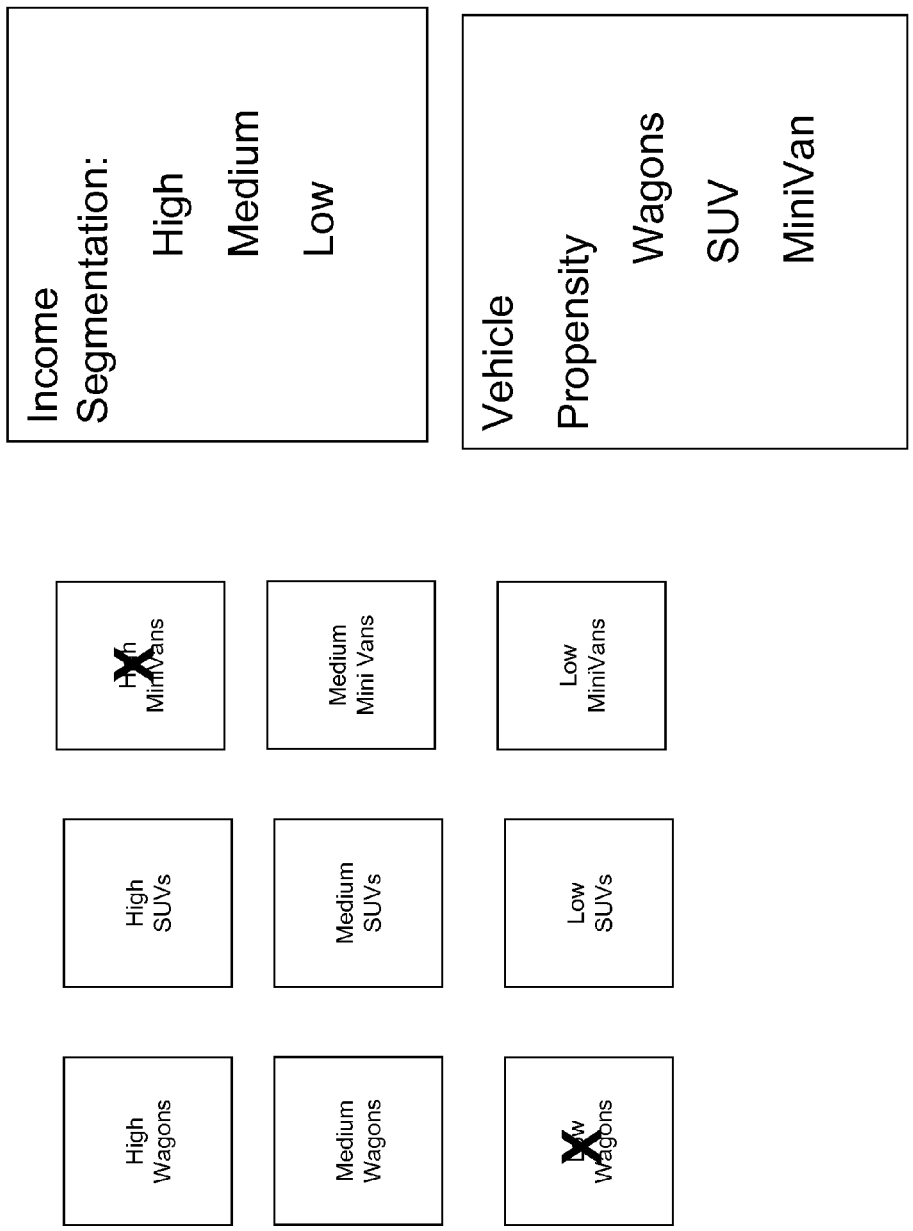

As described previously, the media content management application may exclude particular iterations or criteria combinations. For example, as shown in FIG. 81, the media content management application excluded two iterations—e.g., High Minivans and Low Wagons.

Figure 82:
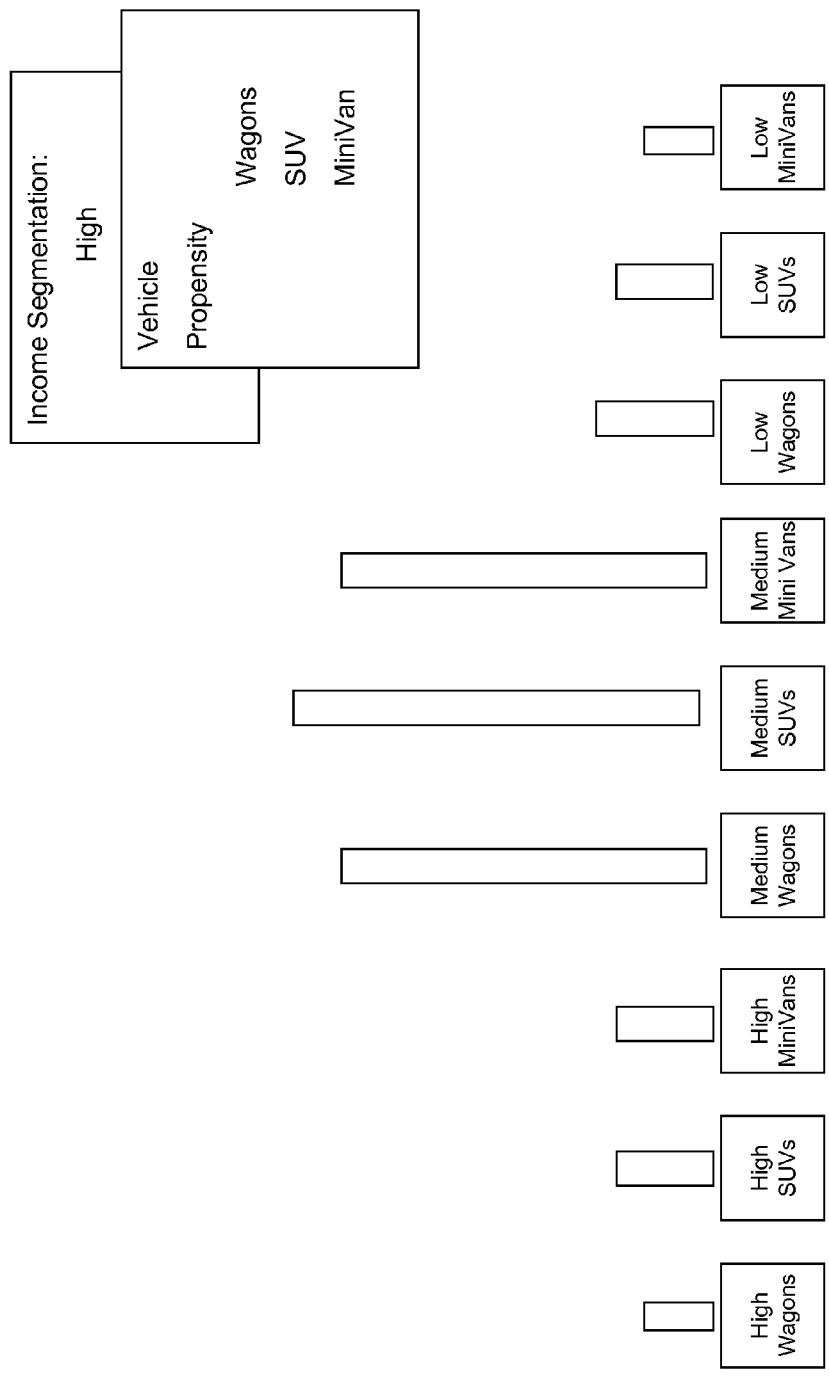
Figure 83:
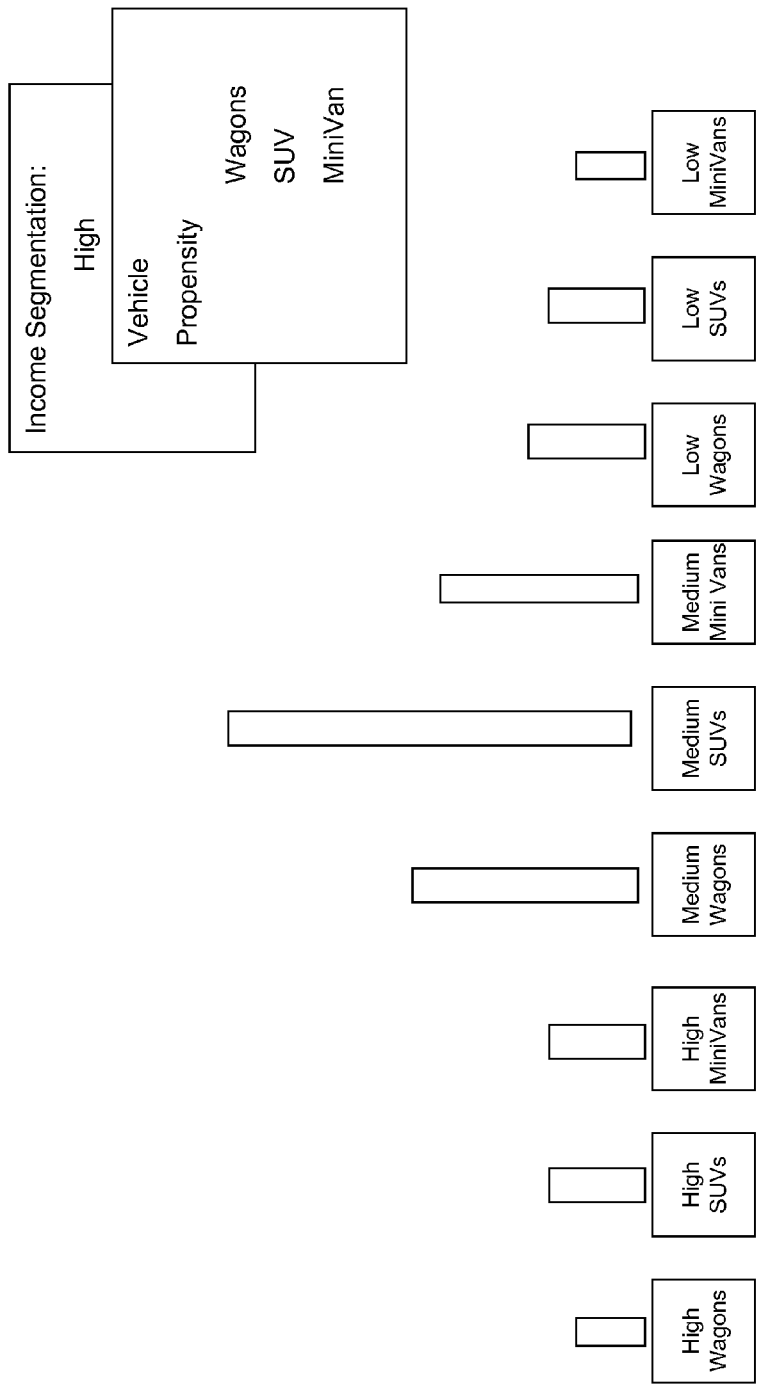

In some embodiments, the media content management application may perform a Pareto optimization analysis, as shown in FIG. 82. In addition, the media content management application may perform a Pareto optimization analysis on the media content purchased by the user (FIG. 83). The media content management application may compare the analyses to, for example, determine whether to alter the media content purchasing strategy or provide the user with a media segment purchasing recommendation. In another suitable embodiment, the media content management application may compare the consumer marketing data of the viewers in the particular region with the media segments purchased (e.g., 40% of the media segments purchased are used in commercials for SUVs in media income segments).

Figure 84:
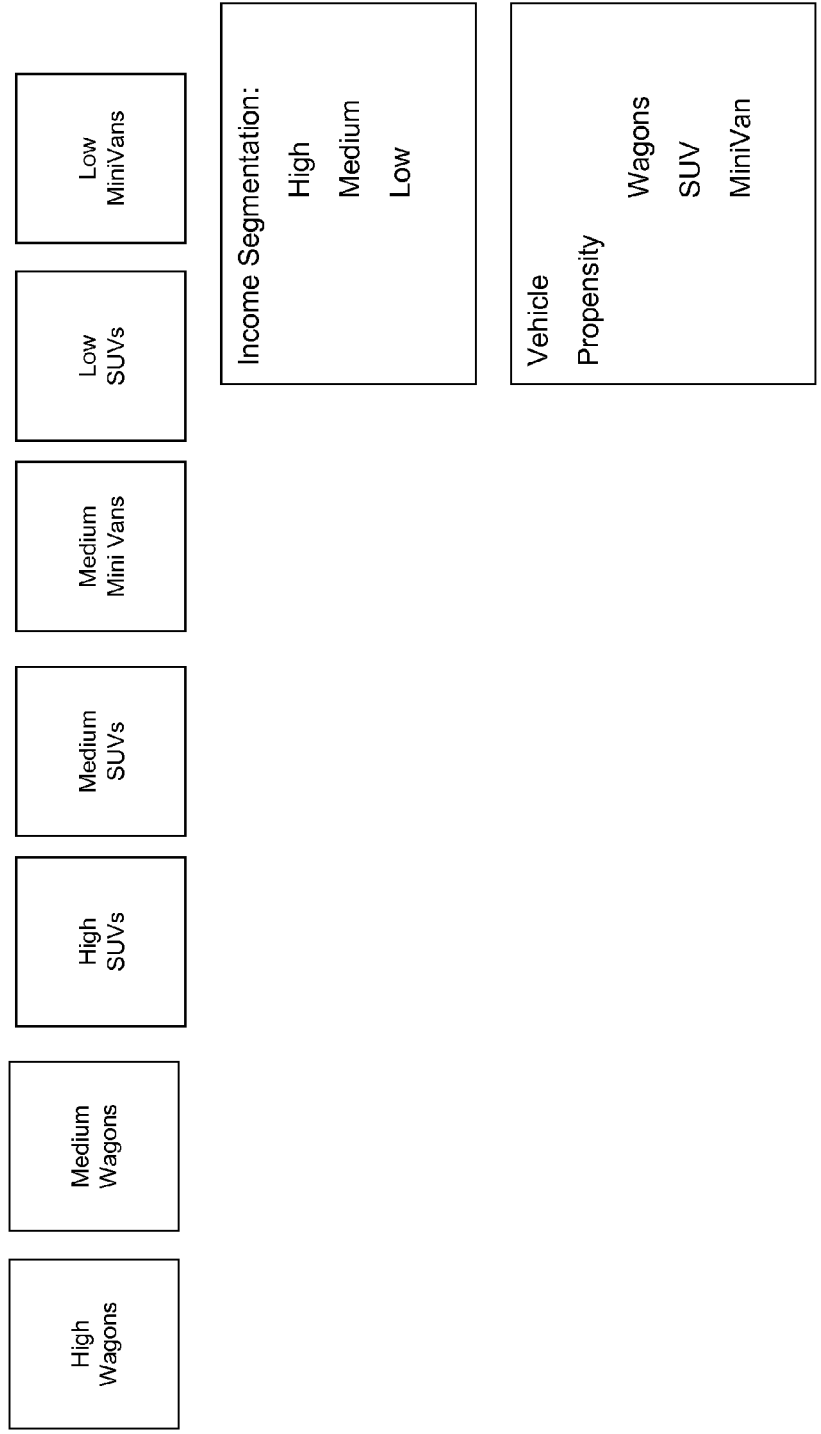
Figure 85:
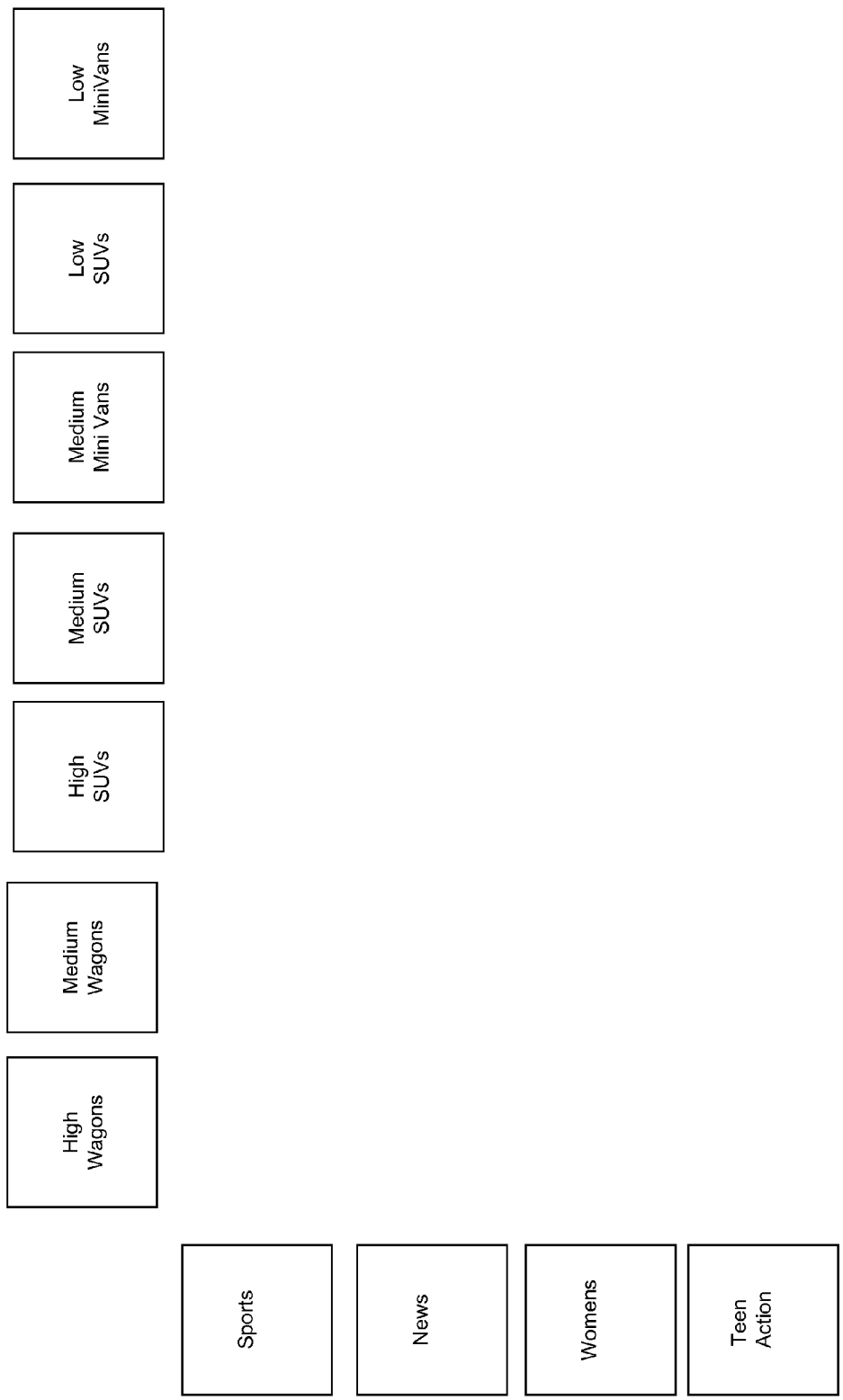
Figure 86:
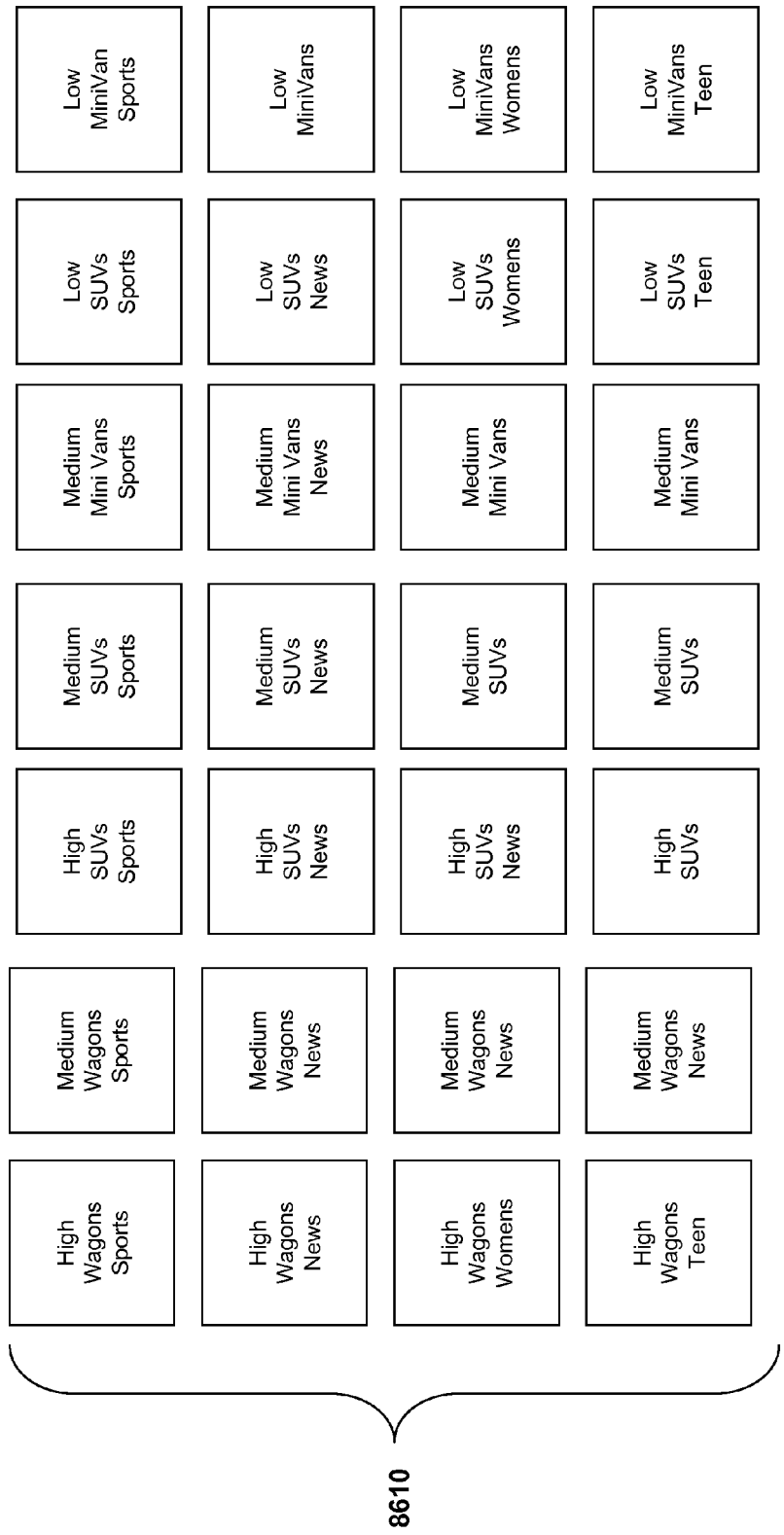
Figure 87:
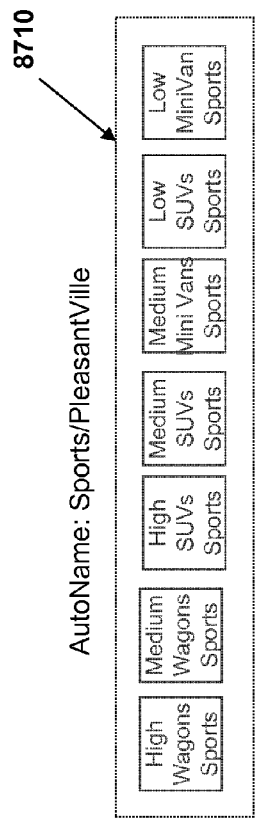
Figure 88:
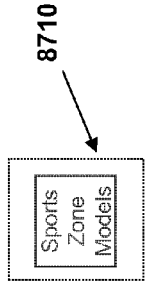

As shown in FIG. 84, the media content management application may compile the remaining iterations or combinations that have not been excluded. The media content management application may add television channels, genres, or any other suitable criteria to the analysis. As shown in FIG. 85, the media content management application has added sports channels, news channels, womens channels, and teen action channels. To perform this iteration, the media content management application creates a matrix 8610 shown in FIG. 86. As shown in FIG. 87, portions of matrix 8610 may be confined. For example, portion 8710 of matrix 8610 may be assigned a filename (e.g., Sports/Pleasantville). It should be noted that the media content management application may allow the user to confine any portion of matrix 8610. As shown in FIG. 88, in some embodiments, portion 8710 may also be collapsed into a file entitled "Sports Zone Models."

Figure 89:
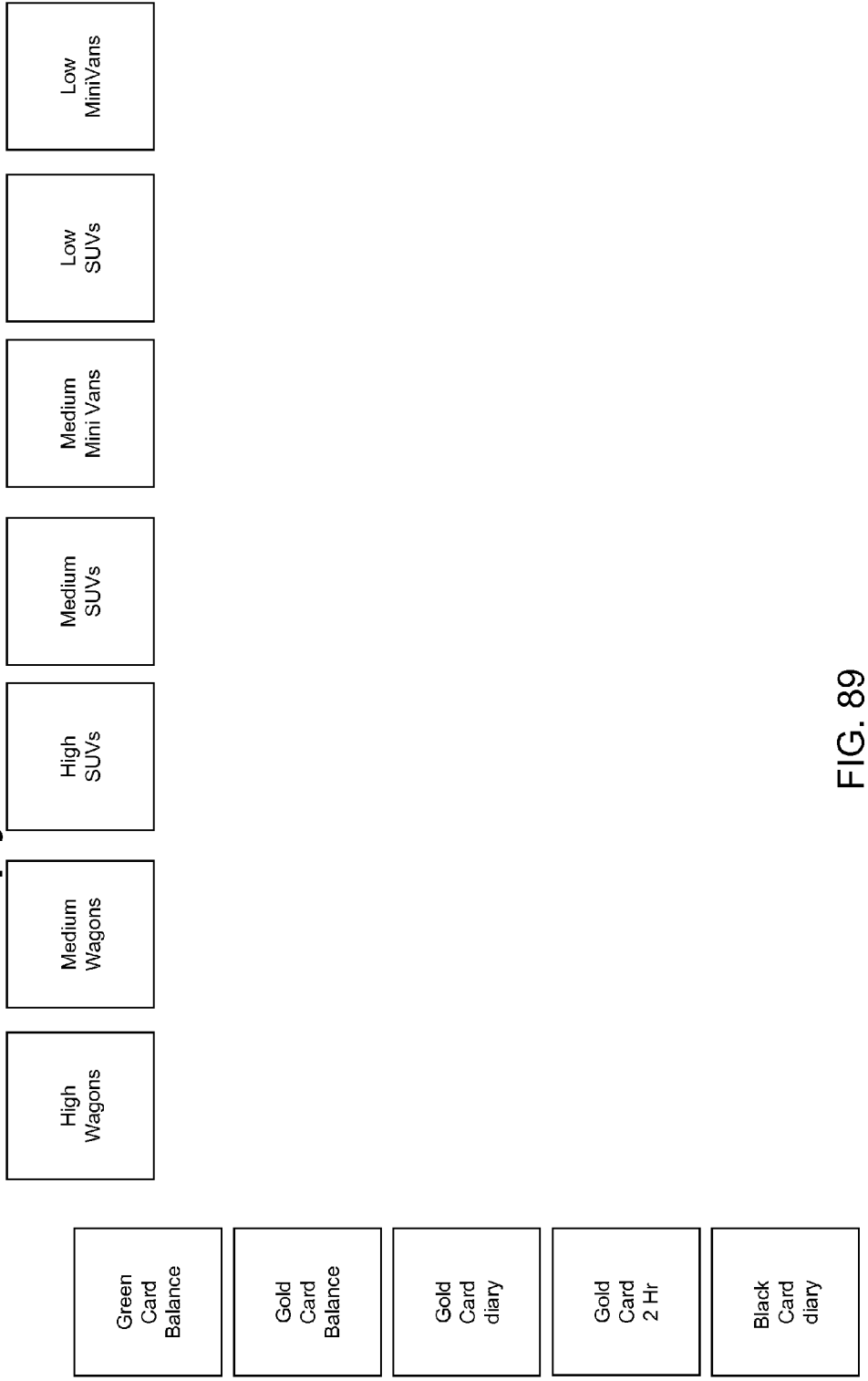
Figure 90:
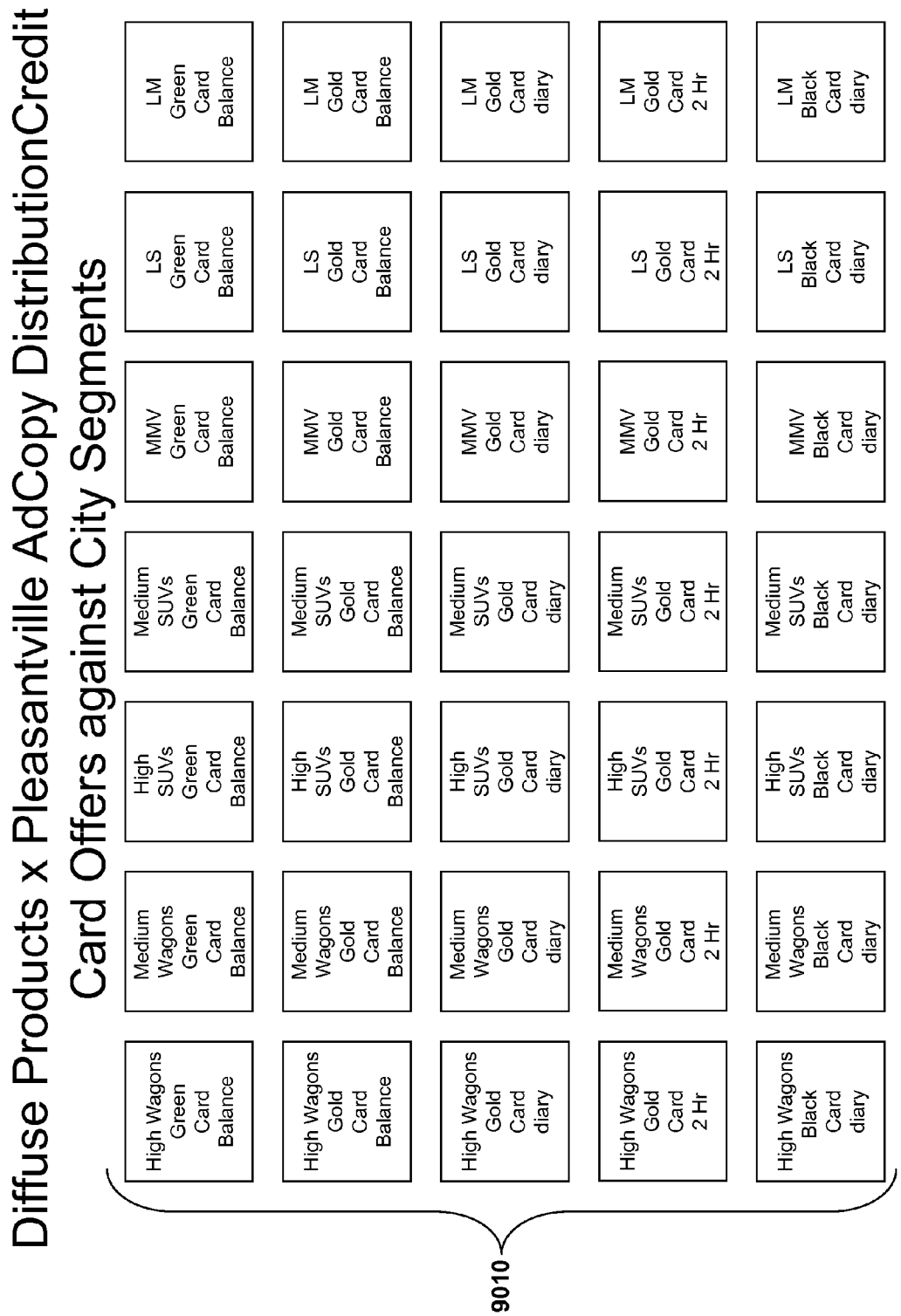

Next, the media content management application may diffuse the compiled product-offer combinations with the prototype city. As shown in FIG. 89, the media content management application is applying the three credit cards and three offers to Pleasantville, which is segmented by income segmentation and vehicle propensity. The resulting matrix 9000 is shown in FIG. 90. Again, certain combinations of matrix 9000 may be excluded. As shown in FIG. 91, certain combinations are excluded, such as "High, Wagons, Gold Card, Two-Hour Approval."

Figure 92:
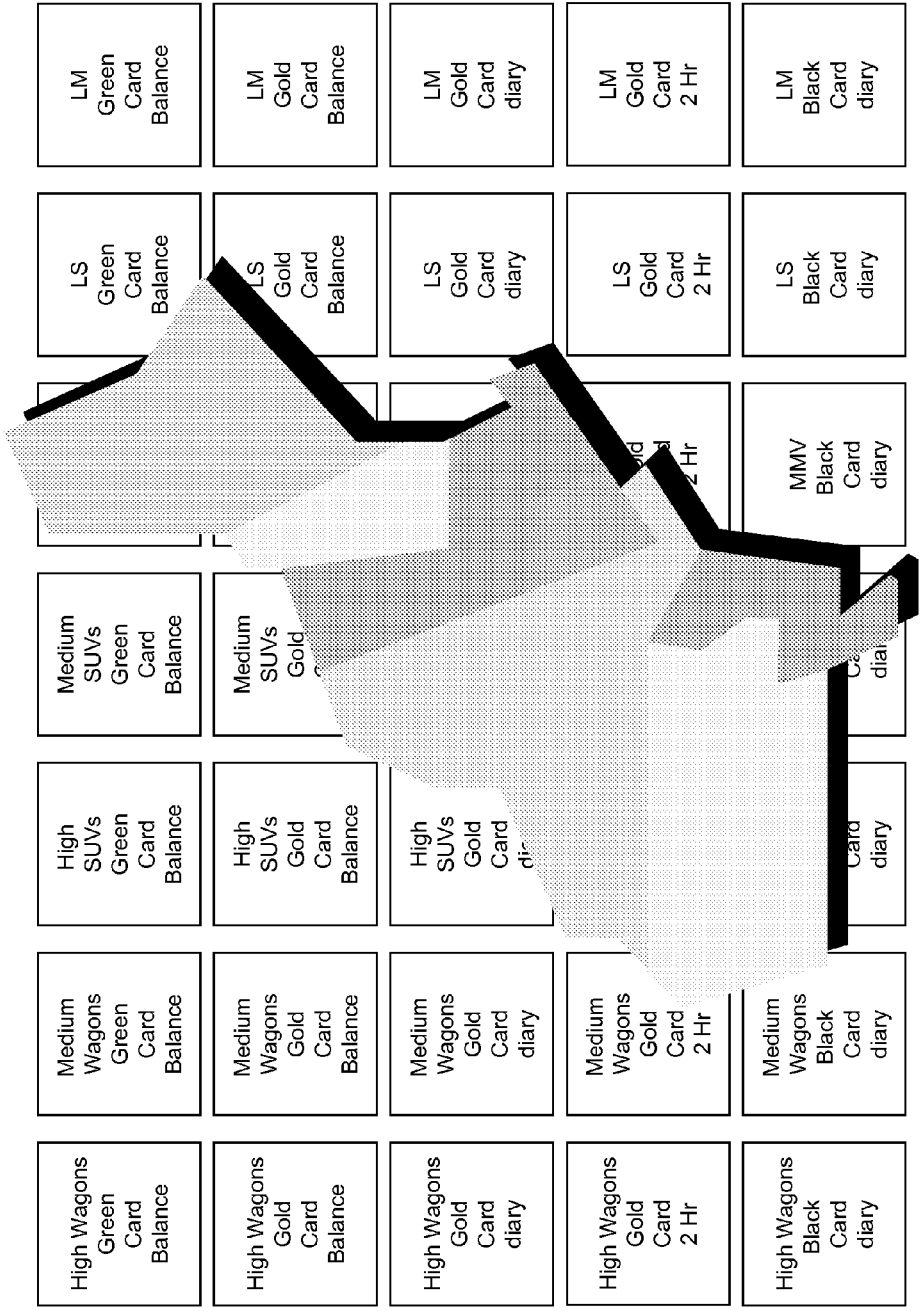

In response to applying the resulting matrix 9000 of the prototype city to a real city (FIG. 92) and iterating against channels (FIG. 93), the media content management application presents the user with map 9400. As shown in FIG. 94, the media content management application may analyze the combinations and provide the user with a map that indicates which combinations the user may want to focus their advertising efforts.

Based at least in part on the analysis, content may be provided for each segment. For example, an audience that has a "high income level," "high level sports utility vehicles," "gold cards," and "likes balance transfer offers," may receive content relating to these criteria. It should also be noted that the analysis may change based on channel type (e.g., VOD, digital cable, etc.).

As described hereinabove, the media content management application of the present invention may allow users to generate, customize, and/or distribute media content using semantic criteria. One of ordinary skill would know how to utilize standard algorithms to implement the processes of the present invention based on the information provided in this application.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A computer-implemented method for ordering commercials that are provided to an audience by a content provider, wherein all steps are performed by the computer, the computer comprising a processor, a memory device and control logic stored therein, the method comprising:
    presenting a plurality of advertisement campaigns to a user through a computer interface for selection by the user, each advertising campaign comprising a plurality of fillable video segment slots, each fillable segment slot arranged at a specific time point within said advertisement campaign,
    in response to receiving a campaign selection input, presenting the user with a first set of criteria associated with the selected advertisement campaign;
    receiving a first criteria selection from the user;
    accessing a library of media segments stored in the memory device, each of the media segments comprising a portion of an advertisement, each media segment associated with metadata defining the media segment;
    transmitting the first criteria selection to an assembly component;
    searching the memory device for media segments having metadata correlating with the first criteria selection;
    retrieving at least one correlating media segment from the memory device;
    inserting the correlating media segment into one of the fillable media slots into the advertisement campaign, thereby generating a first version of a completed commercial;
    receiving instructions by the assembly component from the user to assemble a second version of a completed commercial using a second set of criteria;
    receiving a second criteria selection from the user;
    accessing the library of media segments stored in the memory device;
    transmitting the second criteria selection to an assembly component;
    searching the memory device for media segments having metadata correlating with the second criteria selection;
    retrieving at least one correlating media segment from the memory device;
    inserting the correlating media segment into one of the fillable media slots into the advertisement campaign, thereby generating a second version of a completed commercial;
    presenting on the display a preview of the first and second versions of the completed commercial prior to transmitting at least one of the first and second versions of the completed commercial to the content provider;
    receiving ordering instructions from the user;
    transmitting at least one of the first and second versions of the completed commercial to one or more content providers in response to the ordering instructions.

2. The method of claim 1, wherein the preview is presented in a first format, and wherein the first and second versions of the completed commercial are transmitted to the one o more content providers in a second format.

3. The method of claim 2, wherein the first format is a media format capable of being transmitted over the Internet, and wherein the second format is one of: a videotape, a DVD, a CD, a high definition format, a standard definition format, an MPEG-2 format, an MPEG-4 format, a media format, and a media resolution.

4. The method of claim 1, wherein the preview is transmitted to the user over the Internet, and wherein the first and second versions of the completed commercial are physically delivered to the one or more content providers in a format selected from the group consisting of: a videotape, a DVD, a CD, a high definition format, a standard definition format, an MPEG-2 format, an MPEG-4 format, a media format, and a media resolution.

5. The method of claim 1, further comprising providing the user with a purchasing recommendation based on ordering information associated with the user, wherein the purchasing recommendation includes at least one of: a recommended advertisement campaign, a recommended non-customizable advertisement campaign, a recommended customizable advertisement campaign, a recommended completed commercial, and recommended media segments.

6. The method of claim 1, further comprising transmitting a notification to the user of the number of times that the first version and the second version of the completed commercial have been ordered.

7. A computer-implemented method for purchasing commercials for content providers, wherein all steps are performed by the computer, the computer comprising a processor, a memory device and control logic stored therein, the method comprising:
    presenting a plurality of advertisement campaigns to a user through a computer interface for selection by the user, each advertising campaign comprising a plurality of fillable video segment slots, each fillable segment slot arranged at a specific time point within said advertisement campaign,
    in response to receiving a campaign selection input, presenting the user with a first set of criteria associated with the selected advertisement campaign;
    receiving a first criteria selection from the user;
    accessing a library of media segments stored in the memory device, each of the media segments comprising a portion of an advertisement, each media segment associated with metadata defining the media segment;
    transmitting the criteria selection to an assembly component;
    searching the memory device for media segments having metadata correlating with the first criteria selection;
    retrieving at least one correlating media segment from the memory device;
    inserting the correlating media segment into one of the fillable media slots into the advertisement campaign, thereby generating a first version of a completed commercial;
    storing the first version of the commercial in a storage device;
    receiving instructions component from the user to assemble a second version of a completed commercial using a second set of criteria;
    receiving a second criteria selection from the user;
    accessing a library of media segments stored in the memory device;
    transmitting the second criteria selection to an assembly component;
    searching the memory device for media segments having metadata correlating with the second criteria selection;
    retrieving at least one correlating media segment from the memory device;
    inserting the correlating media segment into one of the fillable media slots into the advertisement campaign, thereby generating a second version of a completed commercial;

storing the second version of the completed commercial in the storage device;

retrieving the first version and the second version of the commercial stored in the storage device; and presenting the user with an opportunity to purchase at least one of the first version and the second version of the commercial.

8. The method of claim 7, further comprising storing a plurality of assembled commercials in the storage device until the user purchases at least one of the assembled commercials.

9. The method of claim 7, further comprising presenting the user with a preview of the first and second versions of the commercial prior to presenting the user with an opportunity to purchase the at least one version and the second version of the commercial.

10. The method of claim 9, further comprising:

presenting the preview in a media format capable of being transmitted over the Internet; and in response to receiving an instruction from the user to purchase the at least one of the first version and the second version of the commercial, delivering that version to a recipient in a different format than the preview presented to the user.

11. The method of claim 10, wherein the different format is one of: a videotape, a DVD, a CD, a high definition format, a standard definition format, an MPEG-2 format, an MPEG-4 format, a media format, and a media resolution.

12. A non-transitory computer-readable medium having computer-readable instructions stored therein which, when executed by the computer, causing the computer to implement a method for ordering commercials that are provided to an audience by a content provider, comprising:

presenting a plurality of advertisement campaigns to a user through a computer interface for selection by the user, each advertising campaign comprising a plurality of fillable video segment slots, each fillable segment slot arranged at a specific time point within said advertisement campaign, in response to receiving a campaign selection input, presenting the user with a first set of criteria associated with the selected advertisement campaign;

receiving a first criteria selection from the user;

accessing a library of media segments stored in the memory device, each of the media segments comprising a portion of an advertisement, each media segment associated with metadata defining the media segment;

transmitting the first criteria selection to an assembly component;

searching the memory device for media segments having metadata correlating with the first criteria selection;

retrieving at least one correlating media segment from the memory device;

inserting the correlating media segment into one of the fillable media slots into the advertisement campaign, thereby generating a first version of a completed commercial;

receiving instructions component from the user to assemble a second version of a completed commercial using a second set of criteria;

receiving a second criteria selection from the user;

accessing a library of media segments stored in the memory device;

transmitting the second criteria selection to the assembly component;

searching the memory device for media segments having metadata correlating with the second criteria selection;

retrieving at least one correlating media segment from the memory device;

inserting the correlating media segment into one of the fillable media slots into the advertisement campaign, thereby generating a second version of a completed commercial;

presenting on the display a preview of the first and second versions of the completed commercial prior to transmitting at least one of the first and second versions of the completed commercial to the content provider;

receiving ordering instructions from the user;

transmitting at least one of the first and second versions of the completed commercial to one or more content providers in response to the ordering instructions.

13. A non-transitory computer-readable medium having computer-readable instructions stored therein which, when executed by the computer, causing the computer to implement a method for purchasing commercials for content providers, comprising:

presenting a plurality of advertisement campaigns to a user through a computer interface for selection by the user, each advertising campaign comprising a plurality of fillable video segment slots, each fillable segment slot arranged at a specific time point within said advertisement campaign, in response to receiving a campaign selection input, presenting the user with a first set of criteria associated with the selected advertisement campaign;

receiving a first criteria selection from the user;

accessing a library of media segments stored in the memory device, each of the media segments comprising a portion of an advertisement, each media segment associated with metadata defining the media segment;

transmitting the first criteria selection to an assembly component;

searching the memory device for media segments having metadata correlating with the first criteria selection;

retrieving at least one correlating media segment from the memory device;

inserting the correlating media segment into one of the fillable media slots into the advertisement campaign, thereby generating a first version of a completed commercial;

storing the first version of the commercial in a storage device;

receiving instructions from the user to assemble a second version of a completed commercial using a second set of criteria;

receiving a second criteria selection from the user;

accessing a library of media segments stored in the memory device;

transmitting the second criteria selection to the assembly component;

searching the memory device for media segments having metadata correlating with the second criteria selection;

retrieving at least one correlating media segment from the memory device;

inserting the correlating media segment into one of the fillable media slots into the advertisement campaign, thereby generating a second version of a completed commercial;

storing the second version of the completed commercial in the storage device;

retrieving the first version and the second version of the commercial stored in the storage device; and presenting the user with an opportunity to purchase at least one of the first version and the second version of the commercial.

* * * * *